United States Patent
Yokoyama

(12) 
(10) Patent No.: US 6,304,602 B1
(45) Date of Patent: Oct. 16, 2001

(54) METHOD AND SYSTEM FOR PROCESSING DATA ON MOTION PICTURES BY MOTION COMPENSATION COMBINED WITH IMAGE SEGMENTATION

(75) Inventor: Yutaka Yokoyama, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/327,706

(22) Filed: Jun. 8, 1999

Related U.S. Application Data

(62) Division of application No. 08/517,815, filed on Aug. 22, 1995.

(30) Foreign Application Priority Data

Aug. 22, 1994 (JP) .................................................. 6-196562

(51) Int. Cl.[7] .................................................... H04N 7/18
(52) U.S. Cl. ................... 375/240.08; 375/240.09
(58) Field of Search .................................. 348/411, 412, 348/409, 415, 416, 699, 700, 240.08; 375/240.18

(56) References Cited

U.S. PATENT DOCUMENTS

| | | | |
|---|---|---|---|
| 5,572,258 | * 11/1996 | Yokoyama | 348/415 |
| 5,592,228 | * 1/1997 | Dachiku et al. | 348/416 |
| 5,872,604 | * 2/1999 | Ogura | 348/699 |
| 5,896,176 | * 4/1999 | Das et al. | 348/416 |
| 5,959,673 | * 9/1999 | Lee et al. | 348/416 |
| 6,037,988 | * 3/2000 | Gu et al. | 348/416 |

* cited by examiner

*Primary Examiner*—Andy Rao
(74) *Attorney, Agent, or Firm*—Ostrolenk, Faber, Gerb & Soffen, LLP

(57) ABSTRACT

Measures for a motion compensation are combined with an image segmentation in four modes. In a first mode, a current picture is image-segmented, before an estimation of a relative motion between a segmented region of the current picture and a corresponding region of a reference picture. In a second mode, a relative motion is estimated between a minute piece of a current picture and a corresponding minute piece of a reference picture, to be employed as a character parameter for an image segmentation. In a third mode, a relative motion is estimated between a sub-region of an image-segmented region and a corresponding small region, to be employed as a character parameter for a resegmentation. In a fourth mode, a relative motion between minute pieces is estimated to provide an additional character parameter for an image segmentation to be performed on a current picture, before a reestimation of a relative motion between an estimated region and a corresponding region.

20 Claims, 17 Drawing Sheets

METHOD AND SYSTEM FOR PROCESSING DATA ON MOTION PICTURES BY MOTION COMPENSATION COMBINED WITH IMAGE SEGMENTATION

This application is a division of Ser. No. 80/517,815 filed Aug. 22, 1995.

BACKGROUND OF THE INVENTION

1. Field of the Invention

The present invention relates generally to a method and a system for processing a set of data on motion pictures and particularly to a method and a system for processing a set of data on a temporal sequence of two or three dimensional pictures with a time-dependent motion intermittently picked up therein, by using measures for a compensation of the motion in combination with an image segmentation of the pictures.

2. Description of the Related Art

Recent years have observed an increasing interest in a processing of a set of digital data on motion pictures, in particular in a field of art relating to a compression coding of such data.

The motion pictures appear as a temporal sequence of pictures each having an image region associated with a transient state of a motion. The transient state in an arbitrary picture has a mathematically analyzable correlation to that in a previous picture, so that the former is predictable from the latter in combination with an estimated correlation therebetween or by compensating the latter therewith, subject to the adequacy of an employed model of the motion for analyzing the correlation.

A predicted current state is comparable with a sampled current state to determine a difference therebetween as a prediction error. The prediction error is encodable together with associated parameter values of the model to obtain a compressed code, which permits a current state of the motion to be calculated in combination with a past calculated state thereof at a decoding end.

An adequate model provides an effective prediction to achieve a significant reduction in redundancy of the code.

A typical modelling is based on a motion compensation interframe prediction, in which a motion is defined in terms of a displacement of a block of a picked up image between a pair of frames each corresponding to a picture. Typically, the picture is divided into a set of square blocks each having an area about an order of 16×16 pixels. A total number of blocks in any picture is identical for this purpose, and respective blocks in an arbitrary picture have a one-to-one correspondence to those blocks in any other picture. With respect to each block, a past decoded picture is compensated by an estimated motion, to predict a picture to be compared with a current input picture. Thus, motion compensation is made in blocks, together with associated pixel data as they are inherent.

FIG. 1 exemplarily shows an encoder of a conventional motion picture coding-decoding system using the motion compensation interframe prediction. This conventional system is well known by the ITU-T(CCITT) Recommendations H.261, as a video coded for audiovisual services at p×64 kbit/s.

In FIG. 1, designated at reference character 100 is an entirety of the conventional system, 100a is the encoder, 101 is an input terminal of the encoder 100a, and 102 and 109 are frame memories, respectively.

The input terminal 101 inputs a sequence of pixel data D101 of a current picture P101. The frame memory 102 stores therein the data D101 of the current input picture P101. besides a set of data D100 of a past input picture P100 it received from the input terminal 101 and stored therein in a last frame. The frame memory 109 has stored therein a set of data D102 of a local decoded picture P102 that is a matrix of restored pixel data of the past input picture P100.

The data D100 of the past input picture P100 is sequentially read from the frame memory 102, and the data D102 of the local decoded picture P102 from the frame memory 109. They are either selected by a switch 103a, as a sequence of data D103 representing a reference picture P103 (to be P100 or P102), and input to a motion estimator 103, which concurrently receives the data D101 of the current input picture P101.

Incidentally, as shown in FIG. 2, the conventional system 100 has, as a common field Fc to a variety of associated computations, an imaginary orthogonal coordinate system defined by a combination of an axis of abscissa X corresponding to a bottom side of a picture frame Fp and an axis of ordinate Y corresponding to a left lateral side of the picture frame Fp. The picture frame Fp, as well as any block B ($\beta/\alpha$) therein and a geometrical gravity center G ($\beta/\alpha$) thereof, is congruently mapped in the imaginary field Fc each time a set of associated data is processed in the system 100, where "$\alpha$" is a picture identification number and "$\beta$" is a block identification number.

As illustrated in FIG. 2, the motion estimator 103 estimates, by calculation for each block B(i/101) (i=an arbitary integer) of the current input picture P101, a motion as a displacement vector $Vd_i$ in terms of a combination of a sense and a magnitude of a displacement of a gravity center G(i/101) of an i-th block B(i/101) in the current input picture P101 relative to that G(i/103) of a corresponding i-th block B(i/103) in the reference picture P103, thereby obtaining a set of data D104 of a set Vm of motion vectors of which an i-th one $Vm_i$ consists of an X-component $Vx_i$ as a projection of the displacement vector $Vd_i$ to the axis X and a Y-component $Vy_i$ as that to the axis Y.

The data D104 of the motion vector set Vm is sequentially output from the motion estimator 103 to a motion compensator 104 and an encoding multiplexer 110.

The multiplexer 110 encodes the data D104 of the vector set Vm into a sequence of corresponding codes.

At the motion compensator 104 the data D104 of the motion vector set Vm are processed together with the data D102 of the local decoded picture P102 input from the frame memory 109 so that a gravity center B(i/102) of each block B(i/102) in the local decoded picture P102 has a position thereof displaced or coordinate-component wise compensated along the axes X and Y by equivalent distances to X- and Y-components $Vx_i$ and $Vy_i$ of a corresponding motion vector $Vm_i$, respectively, to thereby obtain a motion-compensated picture P104 as an interframe predicted one for the current input picture P101.

As a result, each pixel data in each displaced block in the motion-compensated picture P104 is updated by data that a corresponding pixel in that block in the local decoded picture P102 had been carrying.

The motion compensator 104 sequentially outputs a set of data D105 of the motion-compensated picture P104 to a subtractor 105 and an adder 108.

The subtractor 105 performs a pixel-mode subtraction of the motion-compensated picture P104 from the current input picture P101, obtaining a set of data D106 representative of a differential picture P105 therebetween, i.e. a picture having elementwise distributed thereon a matrix of prediction errors due to a motion compensation in a 16×16-pixel block mode by the compensator 104. Accordingly, the data D101 of the current input picture P101 is converted into a compressed set of data as the data D106 representing the prediction errors.

The prediction error data D106 of the differential picture P105 is sequentially input from the subtractor 105 to a unit 106 adapted for a discrete cosine transformation and quantization (hereafter "DCT-Q") process, i.e. for a data compression. The data is mapped in an 8×8-pixel block mode from a real measure space through a discrete cosine transform function into a related frequency field, to be expressed in terms of a combination of cosine coefficients of a corresponding cosine series to an associated 8×8-pixel block. The cosine coefficients are then quantized.

As a result, the error data D106 is further compressed into a set of combinations of data D107 each representative of a quantized coefficient, so that the set of data D107 represents the differential picture P105.

The compressed data D107 of the differential picture P105 is sequentially output from the DCT-Q unit 106 to the encoding multiplexer 110 and a unit 107 adapted for an inverse quantization and inverse discrete cosine transformation (hereafter "IQ-IDCT") process, i.e. for a data decompression.

The multiplexer 110 encodes the compressed data D107 of the differential picture P105 into a sequence of corresponding codes, and multiplexes them together with the codes of the the motion vector set Vm, into a sequence of multiplexed codes C101 to be output via an output terminal 111 of the encoder 100a.

At the IQ-IDCT unit 107, each input combination of data D107 is inverse quantized into a combination of corresponding cosine coefficients of a cosine series in a related frequency field, which coefficients are then inverse mapped from the frequency field through an inverse discrete cosine transform function into the real measure space. In this way, a corresponding 8×8-pixel block in a vacant picture frame Fp mapped in the X-Y coordinate system has pixel data thereof equivalent to corresponding ones in the differential picture P105.

In due course, the picture frame Fp becomes solid with a set of such pixel data D109, thus resulting in a restored differential picture P106 equivalent to the differential picture P105.

The data D109 of the restored differential picture P106 is sequentially output to the adder 108, where it is subjected to a pixel-mode addition with the data D105 of the motion-compensated picture P104 input from the motion compensator 104, to thereby obtain a set of data D110 representative of a local restored picture P107 equivalent to the current input picture P101.

The data D110 of the restored current picture P107 is sequentially input from the adder 108 to the frame memory 109, where it is stored at corresponding addressed locations, as a set of data representing a local decoded current picture to be employed, in a subsequent frame, as a subsequent local decoded picture of a subsequent past input picture.

Incidentally, the sequence of output codes C101 is transmitted through a transmission line 112 to a decoder side of the system 100.

FIG. 3 exemplarily shows a decoder of the conventional motion picture coding-decoding system 100.

In FIG. 3, designated at reference character 100b is the decoder of the system 100, 120 is a decoding demultiplexer, 121 is an input terminal of the decoder 100b, and 125 is a frame memory. The decoding demultiplexer 120 receives the multiplexed codes C110 representative of the differential picture P105 and the motion vector set Vm via the input terminal 121 connected to the transmission line 112. The frame memory has stored therein a set of data D120 representative of a past decoded picture P120 equivalent to the local decoded picture P102 in the encoder 100a.

The demultiplexer 120 demultiplexes the codes C110 into a code sequence representative of the differential picture P105 and a code sequence representative of the vector set Vm, and decodes the former into a sequence of data D121 equivalent to the compressed data D107 in the encoder 100a and the latter into a sequence of data D122 equivalent to the data D104 in the encoder 100a.

The data D121 is input to an IQ-IDCT unit 122, which functions in a similar manner to the IQ-IDCT unit 107 in the encoder 100a, thus sequentially outputting a set of data D123 representative of a differential picture P121 equivalent to the restored differential picture P106.

The data D122 is input to a motion compensator 123, which concurrently receives the data D120 of the past decoded picture P120 from the frame memory 125 and compensates this data D120 by data D122 in a similar manner to the motion compensator 104 in the encoder 100a motion compensator 123 outputs a set of data D124 representative of a motion-compensated picture P122 as a predicted current picture equivalent to the motion-compensated picture P104.

The data D123 of the differential picture P121 and the data D124 of the motion-compensated picture P122 are input to an adder 124, where they are added to each other in a similar manner to the adder 108 in the encoder 100a, to thereby obtain a set of data D125 representative of a current decoded picture P123 equivalent to the local decoded picture P107. This data is output as a datastream via an output terminal 126 of the decoder 100b. This datastream is branched to be input to the frame memory 125, where it is stored as a set of data representative of the current decoded picture P123 to be employed as a subsequent past decoded picture in the subsequent frame.

The motion compensation interframe prediction permits an effective data compression of a motion picture even in the conventional coding-decoding system 100.

In the conventional system 100, however, a single motion is estimated to determine a single vector for each of all square blocks having a 16×16-pixel size. Such a restriction constitutes some drawbacks.

For example, in a block, some pixels may represent an image of an object moving in a certain direction, and other blocks, that of another object moving in a different direction. An estimated motion of such a block may provide an erroneous motion vector, causing an associated prediction error to be increased, thus resulting in a reduced coding efficiency.

Additionally, in a picture, one block may represent an image of a certain portion of a moving object, and another block, that of a neighboring portion thereof. An estimated motion of the former may be different from that of the latter, giving rise to an erroneous contour or discontinuity across a continuous image region of the object, thus resulting in a degraded picture quality.

Recent years have further observed an increasing interest in a processing of data on motion pictures, in relation to an image segmentation.

Image segmentation is a growing technique for reducing a redundancy in a stream of data on a set of pictures that may be a sequence of colored motion pictures each consisting of a matrix of picture elements or pixels.

An arbitrary pixel Px in such a picture sequence is identifiable by a location Lc thereof in an associated picture Pc identified by a frame number Nf thereof, such that Px=Px (Lc; Pc(Nf))=Px(Lc; Nf). The location Lc may be defined by a combination (x, y) of coordinates x and y in an x-y coordinate system fixed to the picture Pc or by an address defined in a pixel matrix. The frame number Nf may be defined by a measure $t_0$ from an initial time to on a real time axis, such that Nf=Nf(t)=Gs $[(t-t_0)/Tf]$, where Tf is a frame period and Gs [ ] is a Gauss step function.

In general, the pixel Px(Lc; Nf) is characterized by character information or data associated therewith in terms of a set $\phi$ of character parameters $\phi_a$ such as a combination of variants representative of coordinates in an R-G-B color coordinate system and/or an associated luminance, where "a" is an arbitrary one of a plurality of character identification numbers.

Accordingly, an arbitrary pixel Px in an arbitrary picture Pc may be defined such that Px=Px(Lc, $\phi$; Nf)=Px(x, y, $\{\phi_a\}$; t). Thus, letting x and y also be character parameters $\phi_x$ and $\phi_y$, respectively, the pixel Px may be defined by Px=Px($\phi'$; t), where $\phi'$ is an extended character parameter set such that $\phi'=\{\phi_x, \phi_y, \{\phi_a\}\}=\{\phi_b\}$, where "b" is an extended character identification number so that "b" may be "x", "y" or "a".

At a particular time point t=$t_c$, therefore, an associated picture Pc may be defined such that Pc=Ψ, where Ψ is a union of extended character parameter sets $\phi'$ of the picture Pc so that Ψ={U $\phi'$; t=$t_c$ (i.e. parameters) $\phi_b$ in each set $\phi'$ are valued)}.

The image segmentation dissolves the union set Ψ of the valued parameter sets $\phi'$ (at t=$t_c$) to a predetermined number of subsets $\Psi_d$ (d=subset identification number) thereof each consisting of a variable number of parameter sets $\phi'$, so that no parameter set $\phi'$ is shared between any pair of subsets $\Psi_d$ and that each parameter $\phi_b$ has an arbitrary pair of values thereof both in a subset $\Psi_d$, as they are alike or relatively vicinal to each other, and either in both of a pair of subsets $\Psi_d$, as they are relatively distant from each other.

The dissolving may comprise a clustering, as discussed in a paper "Combining Color and Spatial Information for Segmentation" by Nobuaki IZUMI et al., the Proceedings of the 1991 Spring Term National Conference of the Institute of the Electronics, Intelligence and Communication Engineers of Japan, D680, p. 7–392.

FIG. 4 illustrates a basic concept of the clustering, as it has an exemplarily reduced number of parameter dimensions to permit an intuitive comprehension. Like items to FIG. 2 are designated by like reference characters. For brevity, notations of parameter sets or elements thereof will be commonly applied to all spaces, permitting scales of associated coordinate axes to be varied, providing that x=X and y=Y.

As shown at the left side of FIG. 4, a common field Fc defined in an imaginary X-Y coordinate system has mapped therein from an unshown real space a matrix as a union set Ψ of valued parameter sets $\phi'$ each consisting of five character parameters $\phi_x=X(\gamma/\alpha)$, $\phi_y=Y(\gamma/\alpha)$, $\phi_2=R(\gamma/\alpha)$ (data on a red color), $\phi_3=G(\gamma/\alpha)$ (data on a green color) and $\phi_4=B(\gamma/\alpha)$ (data on a blue color) and of a corresponding pixel Px($\gamma/\alpha$) in a picture Pc with an identification number $\alpha$ (i.e. t=$t_c$=$t_0$+Tf×$\alpha$), where "γ" is a pixel identification number.

In the common field Fc, therefore, a set $\phi$ of color parameters $\phi_a$ (a=2, 3, 4) of each pixel Px($\gamma/\alpha$) is degenerated at a corresponding coordinate (X, Y). In place of the color parameters, there may be employed a set of luminance and chrominance parameters valued as Y($\gamma/\alpha$), Cb($\gamma/\alpha$) and Cr($\gamma/\alpha$).

The parameter values R($\gamma/\alpha$) G($\gamma/\alpha$) and B($\gamma/\alpha$) of any pixel Px($\gamma/\alpha$) represent in combination a chromatic color that is identical or vicinal to, for example, a first color illustrated by a white circle, a second color illustrated by a shadowed circle or a third color illustrated by a black circle.

As shown in the middle of FIG. 4, the union set Ψ={$\phi'$} is elementwise mapped into a three-dimensional parameter space defined by an R-G-B coordinate system with an R-axis, a G-axis and a B-axis representative of character parameters $\phi_2$, $\phi_3$ and $\phi_4$, respectively, while the remaining parameters $\phi_x$ and $\phi_y$ are degenerated therein.

Accordingly, those pixels illustrated by the white circle are all mapped in a connected region ①, as their colors are identical or vicinal to each other. They constitute a set of vicinal points called a "cluster (in the parameter space)" corresponding to a subset $\Psi_d$ which also is called a "cluster (in the common field Fc)". Each pixel-representative point (R, G, B) in the cluster is labelled as a element thereof, with a cluster identification number equivalent to the subset identification number d (to be ① in this case).

Likewise, those illustrated by the shadowed circle are mapped to be clustered in a connected region ②, and those illustrated by the black circle in a connected region ③.

There are thus constituted three clusters ①, ② and ③ in the regions ①, ② and ③ disconnected from each other in the parameter space.

Then, as shown at the right side of FIG. 4, the clusters ①, ② and ③ are elementwise inverse mapped into the common field Fc, so that their elements are each mapped in a form of a pixel Px($\gamma/\alpha$) with a corresponding label d (①, ② or ③) representative of a cluster (as the subset $\Psi_d$) it belongs in this field Fc.

As a result, an image segmentation is performed by a clustering.

In the case of FIG. 4, however, the parameter space has two degenerated parameters $\phi_x$ and $\phi_y$ for the convenience of illustration, so that the clustering is performed of three parameters $\phi_2$, $\phi_3$ and $\phi_4$, thus resulting in three clusters ①, ② and ③ separated from each other by a dashed line in the field Fc. The cluster ① in Fc is provided as a combination of a right lower region and a left upper region distant from each other.

In a practical clustering, therefore, there is employed a five-dimensional parameter space including X and Y axes for the parameters $\phi_x$ and $\phi_y$, so that the right lower and left upper regions of the cluster ① may have a significant distance detected therebetween in the parameter space and may thus be clustered in the field Fc either with a label ① and the other with a label ④.

Another practical clustering may employ a common field Fc with a set of luminance and chrominance parameters $\phi_a$, i.e. a five-dimensional parameter space including Y, Cb and Cr axes for the parameters $\phi_a$.

Incidentally, for a comprehensive classification of various fields and spaces, there will sometimes be employed herein three notations "S" representing a real or imaginary spatial field, "ST" representing a real or imaginary spatiotemporal field, and "[e]" representing a measure "e" of dimension, where "e" is an arbitrary integer. For example. the common field Fc is an ST[3] class, and the parameter space defined by the R-G-B coordinate system is an S[3] class.

FIG. 5 shows an exemplary motion picture processing system for describing a conventional image segmentation using a five-dimensional clustering.

In FIG. 5, designated at reference character 200 is an entirety of the processing system. Like terms will be designated by like characters between the foregoing description and the following description.

The system 200 comprises a frame memory 210, an address generator 220 and a clustering circuit 230.

The frame memory 210 receives for storing therein three sequences of parallel color data D200 of a current input picture P200 from an unshown input port, in synchronism with a sequence of write address data D221w output thereto from the address generator 220. The frame memory outputs therefrom a three of sequences of parallel color data D210 of a certain picture P210 in concern (that may be a past input picture or the current input picture), in synchronism with a sequence of read address data D221r output thereto from the address generator 220. The picture P210 is now assumed to be equivalent to the picture Pc at $t=t_c$ in FIG. 4, for an intuitive comprehension.

The frame memory 210 is composed of a three of parallel memories, i.e. an R-memory 211, a G-memory 212 and a B-memory 213.

The color data D200 includes a set of R-data on a red color, a set of G-data on a green color and a set of B-data on a blue color respectively of the picture P200. The color data D210 also includes a set $\{\phi_2\}$ of R-data D211=R($\gamma/\alpha$) on a red color, a set $\{\phi_3\}$ of G-data D212=G($\gamma/\alpha$) on a green color and a set $\{\phi_4\}$ of B-data D213=B($\gamma/\alpha$) on a blue color respectively of the picture P210.

The write address data D221w as well as the read address data D221r each consist of a pair of address data. The address data pair in the data D221w defines a write location in each of the R-, G- and B memories 211, 212 and 213, which location corresponds to a pixel position in the picture P200. The address data pair in the data D221r defines a read location in each of the R-, G- and B memories 211, 212 and 213, which location corresponds to a two-dimensional coordinate (x, y) of a position that a pixel Px has in the picture P210.

The R-, G- and B-data of the picture P200 as input to the frame memory 210 are written in the R-, G- and B-memories 211, 212 and 213, respectively, at write locations therein defined by the address data D221w. The R-, G and B-data of the picture P210 to be output from the frame memory 210 are read from the R-, G- and B-memories 211, 212 and 213, respectively, and more specifically, from read locations therein defined by the address data D221r.

The address generator 220 further outputs a sequence of location data D222 in synchronism with the read address data D221r. Each location data D222 represents (or consists of) a corresponding one of the read address data D221r, and comprises a pair of data D223 and D224 representing, either D223, an x-coordinate $\phi_x$ and, the other D224, a y-coordinate $\phi_y$ respectively of the afore-mentioned coordinate (x, y).

The clustering circuit 230 processes a synchronized combination $\{\phi'\}$ of the color data D210=$\{\phi_2, \phi_3, \phi_4\}$ of the picture P210 and the location data D222=$\{\phi_x, \phi_y\}$ so that, in a frame Nf (=$\alpha$) of time, the picture P210 as a union set $\Psi$ of valued character parameter sets $\phi'$ is congruently mapped in a common field Fc of an ST[3] class. In this mapping the union set $\Psi=\{X(\gamma/\alpha), Y(\gamma/\alpha), R(\gamma/\alpha), G(\gamma/\alpha), B(\gamma/\alpha)\}$ is mapped to a practical five-dimensional parameter space of an S[5] class consisting of a set of spatial points each defined by a coordinate (X, Y, R, G, B) or by a coordinate (R, G, B, X, Y), while the latter is employed in this case for an intuitive consistency with FIG. 4.

In the parameter space, the union set $\Psi$ is elementwise clustered in a set $\{Ci\}$ of n clusters Ci, where "n" is a predetermined arbitrary integer and "i" is an arbitrary integer such that $1 \leq i \leq n$. In this case, $\{Ci\}=\{①, ②, ③, ④\}=\{C_1, C_2, C_3, C_4\}$ and n=4.

Then, the n clusters Ci[5] in the S[5] field are inverse mapped to the ST[3] field Fc. As a result, in the frame $\alpha$, the picture Pc as a two-dimensional set of pixels Px($\gamma/\alpha$) in this field Fc is grouped or clustered into n clusters Ci[2] in terms of valued subsets $\Psi_d$ labelled ① to ④ in this case, i.e., it is apparently segmented into n regions RS each connected therein and labelled with a number "i" (corresponding to i of Ci and d of $\Psi_d$) such that RSi.

The clustering circuit 230 sequentially outputs a set of data D230 on such the result of image segmentation, each including clock-dependent or valued information on a combination of a pixel identification number $\gamma$ and an associated label i as a cluster or region identification number.

The clustering and hence the segmentation is a result of a mapping to or from an imaginary space, based on a real computation according to an algorithm.

The algorithm will be described below for an arbitrary integer n (not limited to 4), providing that a number of scales are determined as color and location parameter weighting factors $k_0$ and $k_1$ in the mapping between the ST[3] class field Fc and the parameter field of S[5] class, such that:

$$R[5]=k_0^{1/2} \times R[2] \qquad (1),$$

$$G[5]=k_0^{1/2} \times G[2] \qquad (2),$$

$$B[5]=k_0^{1/2} \times B[2] \qquad (3),$$

$$X[5]=k_1^{1/2} \times X[2] \qquad (4), \text{ and}$$

$$Y[5]=k_1^{1/2} \times Y[2] \qquad (5),$$

In the conventional system 200, the picture Pc is initially equi-divided into n square blocks $Ci_0$ each having a geometrically central pixel $Pg_{i0}$ therein as a representative pixel $Pr_{i0}$ thereof with a set $\phi'$ of associated parameter values componentwise representative of a five-dimensional parameter vector $Vp_{i0}$ defined in the S[5] field, such that:

$$Vp_{i0} = (R(\gamma(Pr_{i0})/\alpha), G(\gamma(Pr_{i0})/\alpha), \qquad (6)$$
$$B(\gamma(Pr_{i0})/\alpha), X(\gamma(Pr_{i0})/\alpha),$$
$$Y(\gamma(Pr_{i0})/\alpha)).$$

Thus, each block $C_{i0}$ is represented by the vector $Vp_{i0}$ as a representative vector thereof in the S[5] field.

Likewise, every pixel Px($\gamma(x, y)/\alpha$) in the picture Pc is represented in the S[5] field by a corresponding five-dimensional parameter vector $Vp_{xy}$, such that:

$$Vp_{xy} = (R(\gamma(x, y)/\alpha), G(\gamma(x, y)/\alpha), \qquad (7)$$
$$B(\gamma(x, y)/\alpha), X(\gamma(x, y)/\alpha),$$
$$Y(\gamma(x, y)/\alpha)).$$

Then, each parameter vector $Vp_{xy}$ has a euclidean relative distance $D_{i0}$ thereof determined to the representative vector $Vp_{i0}$ of each block $C_{i0}$, such that:

$$D_{i0} = D(Vp_{xy}, Vp_{i0}) \quad (8)$$

$$= |Vp_{xy} - Vp_{i0}|$$

$$= \{(R(\gamma(x, y)/\alpha) - R(\gamma(Pr_{i0})/\alpha))^2 +$$

$$(G(\gamma(x, y)/\alpha) - G(\gamma(Pr_{i0})/\alpha))^2 +$$

$$(B(\gamma(x, y)/\alpha) - B(\gamma(Pr_{i0})/\alpha))^2 +$$

$$(X(\gamma(x, y)/\alpha) - X(\gamma(Pr_{i0})/\alpha))^2 +$$

$$(Y(\gamma(x, y)/\alpha) - Y(\gamma(Pr_{i0})/\alpha))^2\}^{1/2}.$$

Each pixel $Px(\gamma(x, y)/\alpha)$ represented by the parameter vector $Vp_{xy}$ thus has n relative distances $D_{i0}$ determined therefor, including a minimum one $D_{min-0}$, and is labelled with an identification number $i_0$ (or an incremented number $i_1$) of a block $C_{i0}$ associated with the minimum distance $D_{min-0}$.

Accordingly, all pixels Px of the picture Pc in the field Fc are each labelled with a corresponding one of n identification numbers $i_0$ (or $i_1$) (i=1 to n), so that the picture Pc is re-segmented into n first-order clusters $C_{i1}$ (i=1 to n) each consisting of $N_{i1}$ pixels $Px_{i1}$ labelled with an identical number $i_0$ (or $i_1$), while the number $N_{i1}$ of pixels $Px_{i1}$ is variable.

The $N_{i1}$ pixels $Px_{i1}$ in each first-order cluster $C_{i1}$ have their parameter values $R(\gamma(x, y)/\alpha)$, $G(\gamma(x, y)/\alpha)$, $B(\gamma(x, y)/\alpha)$, $X(\gamma(x, y)/\alpha)$ and $Y(\gamma(x, y)/\alpha)$ arithmetically averaged thereamong to obtain a set of representative parameter values $R_{ci1}$, $G_{ci1}$, $B_{ci1}$, $X_{ci1}$ and $Y_{ci1}$ of the first-order cluster $C_{i1}$, such that:

$$R_{ci1} = (\Sigma R(\gamma(x, y)/\alpha))/N_{i1} \quad (9),$$

$$G_{ci1} = (\Sigma G(\gamma(x, y)/\alpha))/N_{i1} \quad (10),$$

$$B_{ci1} = (\Sigma B(\gamma(x, y)/\alpha))/N_{i1} \quad (11),$$

$$X_{ci1} = (\Sigma X(\gamma(x, y)/\alpha))/N_{i1} \quad (12), \text{ and}$$

$$Y_{ci1} = (\Sigma Y(\gamma(x, y)/\alpha))/N_{i1} \quad (13),$$

where the sum $\Sigma$ is taken of the $N_{i1}$ pixels $Px_{i1}$.

The cluster $C_{i1}$ is represented by a representative vector $Vp_{i1}$ defined in the S[5] field, such that:

$$Vp_{i1} = (R_{ci1}, G_{ci1}, B_{ci1}, X_{ci1}, Y_{ci1}) \quad (14).$$

In any cluster $C_{i1}$, a geometrically central pixel $Pg_{ci1}$ thereof may have its parameter set $\phi'$ different from the set of representative parameter values $R_{ci1}$, $G_{ci1}$, $B_{ci1}$, $X_{ci1}$ and $Y_{ci1}$.

Then, each parameter vector $Vp_{xy}$ has a euclidean relative distance $D_{i1}$ thereof determined to the representative vector $Vp_{i1}$ of each cluster $C_{i1}$, such that:

$$D_{i1} = D(Vp_{xy}, Vp_{i1}) \quad (15)$$

$$= |Vp_{xy} - Vp_{i1}|$$

$$= \{(R(\gamma(x, y)/\alpha) - R_{ci1})^2 +$$

-continued $$(G(\gamma(x, y)/\alpha) - G_{ci1})^2 +$$

$$(B(\gamma(x, y)/\alpha) - B_{ci1})^2 +$$

$$(X(\gamma(x, y)/\alpha) - X_{ci1})^2 +$$

$$(Y(\gamma(x, y)/\alpha) - Y_{ci1})^2\}^{1/2}.$$

Each pixel $Px(\gamma(x, y)/\alpha)$ thus has n relative distances $D_{i1}$ determined therefor, including a minimum one $D_{min-1}$, and is labelled with an identification number $i_1$ (or an incremented number $i_2$) of a cluster $C_{i1}$ associated with the minimum distance $D_{min-1}$.

Accordingly, all pixels Px of the picture Pc in the field Fc are each labelled with a corresponding one of n identification numbers $i_1$ (or $i_2$) (i=1 to n), so that the picture Pc is re-segmented into n second-order clusters $C_{i2}$ (i=1 to n) each consisting of $N_{i2}$ pixels $Px_{i2}$ labelled with an identical number $i_1$ (or $i_2$). Also the number $N_{i2}$ of pixels $Px_{i2}$ is variable.

Like operation is repeated, as necessary. In due course, the picture Pc is re-segmented from a set $\{C_{ij}\}$ of j-th order clusters $C_{ij}$ (i=1 to n; j=arbitrary integer) each represented by a representative vector $Vp_{ij}$ in the S[5] field, to a set $\{C_{i(j+1)}\}$ of j+1-th order clusters $C_{i(j+1)}$ each represented by a representative vector $Vp_{i(j+1)}$ in the S[5] field.

At j+1=k, if the representative vector $Vp_{ik}$ of the k-th order cluster $C_{ik}$ is equivalent to that $Vp_{ij}$ of the j-th order cluster for each i, the clustering is converged and hence, when relabelled after the set $\{C_{ik}\}$, each pixel Px is kept labelled with a previous cluster number $i_{j-1}$ (or an incremented number $i_j$). An image segmentation is completed with the set $\{C_{ij}\}$, so that each cluster of pixels with an identical number $i_{j-1}$ (or $i_j$) constitutes a final connected region.

For the clustering to be repeated a necessary number of times until a convergence, the frame memory 210 and the address generator 220 of FIG. 5 are adapted to repeat sequentially outputting a synchronized parallel combination of the color data D210 and the location data D222 of the picture P210. Further, for an initial setting of blocks $C_{i0}$, the address generator 220 is adapted to sequentially output a set of data on addresses of the central pixels $Pg_{i0}$ ($=Pr_{i0}$) to the frame memory 210 and the clustering circuit 230.

FIG. 6 is an exemplarily detailed block diagram of the clustering circuit 230 in the conventional system 200 of FIG. 5. This example employs an incremented cluster identification number.

In FIG. 6, designated at reference character 235 is a cluster number memory, 236 is a cluster number generator, and 238 is a cluster memory.

The cluster number memory 235 stores therein for each j an identification number $i_j$ (i=1 to n) of each cluster $C_{ij}$, at respective addresses $Ap_{xy}$ corresponding to coordinates (X, Y) of all of $N_{ij}$ pixels $Px(\gamma/\alpha)$ as $Px_{ij}$ labelled with the cluster number $i_j$, to thereby update a previous identification number $i_{j-1}$. In place of the initial identification number $i_0$ for any block $C_{i0}$, there is employed a particular integer, such as −1, that will never be found in a value range of $i_j$ for $1 \leq j$.

The cluster number generator 236 generates to output for each j a sequence of cluster numbers $1_j$ to $n_j$, as necessary.

The cluster memory 238 stores therein at least for each j, at each cluster address $Ac_{ij}$ corresponding to one cluster number $i_j$, a set of representative parameter values $R_{cij}$, $G_{cij}$, $B_{cij}$, $X_{cij}$ and $Y_{cij}$ as components of a representative vector $Vp_{ij}$ of an associated cluster $C_{ij}$, such that:

$$R_{cij} = (\Sigma R(\gamma(x, y)/\alpha))/N_{ij} \quad (16),$$

$$G_{cij} = (\Sigma G(\gamma(x, y)/\alpha))/N_{ij} \quad (17),$$

$$B_{cij} = (\Sigma B(\gamma(x, y)/\alpha))/N_{ij} \quad (18),$$

$$X_{cij} = (\Sigma X(\gamma(x, y)/\alpha))/N_{ij} \quad (19), \text{ and}$$

$$Y_{cij} = (\Sigma Y(\gamma(x, y)/\alpha))/N_{ij} \quad (20),$$

where the sum $\Sigma$ is taken of the $N_{ij}$ pixels $Px_{ij}$. Each address $Ac_{ij}$ is representative of an associated cluster number $i_j$, and vice versa.

As shown in FIG. 6, the clustering circuit 230 comprises a distance calculator 231, a minimum distance estimator 232, a convergence estimator 234, the cluster number memory 235, the cluster number generator 236, an average calculator 237 and the cluster memory 238.

The distance calculator 231 sequentially calculates, for each pixel Px each j, a set $\{D_{ij}\}$ of euclidean relative distances $D_{ij}$ between a parameter vector $Vp_{xy}$ of the pixel $Px(\gamma(x, y)/\alpha)$ and respective representative vectors $Vp_{ij}$ of clusters $C_{ij}$, such that:

$$\begin{aligned}
D_{ij} &= D(Vp_{xy}, Vp_{ij}) \quad (21) \\
&= |Vp_{xy} - Vp_{ij}| \\
&= \{(R(\gamma(x, y)/\alpha) - R_{cij})^2 + \\
&\quad (G(\gamma(x, y)/\alpha) - G_{cij})^2 + \\
&\quad (B(\gamma(x, y)/\alpha) - B_{cij})^2 + \\
&\quad (X(\gamma(x, y)/\alpha) - X_{cij})^2 + \\
&\quad (Y(\gamma(x, y)/\alpha) - Y_{cij})^2\}^{1/2}.
\end{aligned}$$

The distance calculation for any pixel Px is made of all the n clusters $C_{ij}$ in an order in which the cluster number $i_j$ is output from the generator 236, while the order is common to each j. Calculated distances $D_{ij}$ are output in the same order as the calculation.

The minimum distance estimator 232 functions for each pixel Px each j so that, upon reception of an m-th distance $D_{ij}$, where "m" is an arbitrary integer such that $1 \leq m \leq n$, it has a minimum distance held therein as a distance criterion $CD_{m-1}$ from among m−1 distances $D_{ij}$ it has received till then, and compares the m-th distance $D_{ij}$ with the criterion $CD_{m-1}$ to thereby select from therebetween a smaller one to be held therein as a subsequent criterion $CD_m$. An initial criterion $CD_0$ is predetermined to be a maximum permissible value. A final criterion $CD_n$ should be a minimum distance $D_{min-j}$ in the set $\{D_{ij}\}$, so that an identification number $i_j$ of a cluster $C_{ij}$ associated therewith should be output as a label for the pixel Px in concern.

The convergence estimator 234 functions for each pixel Px each j to compare the current cluster number $i_j$ output from the estimator 232 for the pixel Px in concern with a previous cluster number $i_{j-1}$ stored at a corresponding location in the memory 235, to thereby check for a difference or detect a coincidence therebetween. At j=k, if the coincidence is detected of all pixels Px, an associated clustering is converged, permitting the data 230 on a result of the clustering to be output.

The average calculator 237 sequentially calculates for each j the set of representative parameter values $R_{cij}$, $G_{cij}$, $B_{cij}$, $X_{cij}$ and $Y_{cij}$ of each cluster $C_{ij}$, in accordance with the expressions (16) to (20).

For each frame Nf in which a single picture Pc is processed, the clustering circuit 230 functions as follows.

In an initial phase of the frame Nf=$\alpha$, the cluster number memory 235, the cluster memory 238, the minimum distance estimator 232 and the convergence estimator 234 are initialized, and the cluster number generator 236 sequentially outputs to the cluster memory 238 a set of data D236a on addresses $Ac_{i0}$ of the blocks (as initial clusters) $C_{i0}$ in the memory 238.

In a synchronized manner therewith, the color data D210 and the location data D222 of representative pixels $Pr_{i0}$ (=$Pg_{i0}$) of the blocks $C_{i0}$ are sequentially input from the frame memory 210 (FIG. 5) and the address generator 220 (FIG. 5), respectively, to the cluster memory 238, where they are written at the addresses $Ac_{i0}$ designated by the address data D236a, so that each address $Ac_{i0}$ has stored therein a set $\phi'$ of data D210 and D222 on parameter values $R(\gamma(Pr_{i0})/\alpha)$, $G(\gamma(Pr_{i0})/\alpha)$, $B(\gamma(Pr_{i0})/\alpha)$, $X(\gamma(Pr_{i0})/\alpha)$ and $Y(\gamma(Pr_{i0})/\alpha)$) as components of an associated representative vector $Vp_{i0}$.

Then, the cluster number generator 236 outputs the address data D236a in the order of the cluster number $i_0$ ($i_0$=$i_j$=1 to n) to the cluster memory 238, where the written data D210 and D222 on parameter values $\{\phi'\}$ are sequentially read from their addresses $Ac_{i0}$ in the order of the cluster number $i_0$, to be output as a sequence of data D238 to the distance calculator 231.

In a synchronized manner therewith, the calculator 231 receives a combination of data D210 and D222 on parameter values $R(\gamma(x, y)/\alpha)$, $G(\gamma(x, y)/\alpha)$, $B(\gamma(x, y)/\alpha)$, $X(\gamma(x, y)/\alpha)$ and $Y(\gamma(x, y)/\alpha)$) of a pixel $Px(\gamma(x, y)/\alpha)$.

In the calculator 231, the data 238 is sequentially processed by using the combination of data D210 and D222 for a calculation in accordance with the expression (8), to thereby obtain the n relative distances $D_{i0}$ to be output as a sequence of data D231 to the minimum distance estimator 232. In synchronism therewith, a set of data D236b each representative of one cluster number $i_0$ is sequentially output to the estimator 232.

The estimator 232 processes the data D231 together with the data D236b to hold therein the minimum distance $D_{min-0}$ in combination with a number $i_0$ of a corresponding cluster $C_{i0}$, which cluster number $i_0$ is output as a data D232 to the cluster number memory 235.

In synchronism therewith, the data D222 on the parameter values $X(\gamma(x, y)/\alpha)$ and $Y(\gamma(x, y)/\alpha)$) of the pixel $Px(\gamma(x, y)/\alpha)$ are input to the memory 235, where an initial cluster number (e.g. −1) set at an address $Ap_{xy}$ designated by the input data D222 is read and updated by writing the cluster number $i_0$ represented by the data 232.

The read cluster number is output to the convergence estimator 234, where it is compared with the cluster number io represented by the data 232. A result $R_0$ of the comparison is stored.

The foregoing process after the initial setting of representative parameter values of blocks $C_{i0}$ is repeated for each pixel Px.

Then, the cluster number generator 236 sequentially outputs a set of data D236c representative of cluster numbers $i_0$, in the order of the numbers $i_0$, to the average calculator 237.

In a synchronized manner therewith, the calculator 237 receives a sequence of combinations of the color data D210 and the location data D222 of respective pixels $Px(\gamma(x, y)/\alpha)$ in the picture Pc, in a preset scan order thereof. Concurrently therewith, the same data as the location data D222 in that sequence are input in the preset scan order to the cluster number memory 235, where the clusters numbers $i_0$ stored therein are sequentially read in the same scan order.

Read cluster numbers $i_0$ are input in the read order to the average calculator 237, where they are each respectively compared with a certain cluster number $i_0$ represented then by one of the data 236c, to thereby detect a coincidence therebetween. Each time when the coincidence is detected, a corresponding combination of data D210 and D222 representative of a parameter vector $Vp_{xy}$ of a pixel Px is processed to be counted and vector-componentwise cumulated.

When the scan of the picture Pc is over for the cluster number $i_0$, respective cumulated values are divided by a final count number $N_{i1}$ in accordance with the expressions (9) to (13) to thereby determine the representative parameter values $R_{ci1}$, $G_{ci1}$, $B_{ci1}$, $X_{ci1}$ and $Y_{ci1}$ of the first-order cluster $C_{i1}$, which are output as a set of data D237 to the cluster memory 238.

In synchronism therewith, an address data D236a corresponding to the data D236c in concern is output from the cluster number generator 236 to the cluster memory 238, where a set of representative parameter values $R(\gamma(Pr_{i0})/\alpha)$, $G(\gamma(Pr_{i0})/\alpha)$, $G(\gamma(Pr_{i0})/\alpha)$, $X(\gamma(Pr_{i0})/\alpha)$ and $Y(\gamma(Pr_{i0})/\alpha)$ of a corresponding block $C_{i0}$ are updated by the representative parameter values $R_{ci1}$, $G_{ci1}$, $B_{ci1}$, $X_{ci1}$ and $Y_{ci1}$ of the first-order cluster $C_{i1}$, respectively.

Like update operation is repeated for each cluster number $i_0$ designated by any of the data D236c, so that in the cluster memory 238 respective parameter values of all blocks $C_{i0}$ are updated by corresponding parameter values of first-order clusters $C_{i1}$, i.e. n $Vp_{i0}$ are updated to n $Vp_{i1}$.

Then, similar operations to the block representative vectors $\{Vp_{i0}\}$ are repeated for the first-order cluster representative vectors $\{Vp_{i1}\}$, so that for each pixel Px the relative distances $\{D_{i1}\}$ are calculated in accordance with the expression (15) to determine the minimum distance $D_{min-1}$, whereby for each pixel Px a current cluster number $i_1$ is provided and compared with a previous cluster number $i_0$. Unless $i_1=i_0$ for each pixel Px, $\{Vp_{i2}\}$ is calculated in accordance with the expressions (16) to (20), to thereby update $\{Vp_{i1}\}$.

Likewise, unless $i_j=i_{j-1}$ for each pixel Px, $\{Vp_{i(j-1)}\}$ are updated by $\{Vp_{ij}\}$.

If $i_k=i_{k-1}$ for each pixel Px, a clustering of the picture Pc is completed so the cluster numbers $i_k$ are sequentially read from the cluster number memory 235 in synchronism with the location data D222 and output as the data D230 of segmented regions RS from the clustering circuit 230.

In the motion picture processing system 200, an image segmentation of each picture Pc is performed by element-wise clustering a union set $\Psi$ of character parameter sets $\phi'$ each consisting of color data D210 and location data D222 of a pixel Px therein. For a stationary picture of each frame, therefore, a competent segmentation is expectable with a favorable preciseness.

However, the system 200 employs no information on time-dependent variations between frames for the clustering, in which no consideration is taken of any motion that an object might exhibit between pictures. As such, a number of pixels differentiated by motion might be undesirably connected with each other and that an image region with a uniform motion might be unnecessarily divided.

In other words, on the one hand, a number of pixels may be inseparably connected with each other, if their locations, colors and/or luminances are vicinal to each other, even when their motions are quite different from each other, thus resulting in an incompetent representation. More specifically, for example, when a picture contains a pair of neighboring objects resemblant in color but different in motion, if the resemblance of color is significant enough for the conventional image segmentation to cluster them together, they will be found in a single region and will not be distributed between a pair of separated regions.

On the other hand, an image region substantially uniform in motion but uneven in color and/or luminance may be unconnectably divided, causing an unnecessary local increase in number of regions, resulting in an undesirably biased segmentation due to a restriction from a total number of regions. For example, when a picture contains a sufficiently small set of pixels representing a single object colored with a pair of different colors and moving without revolution, if the difference between those colors is significant enough for the conventional image segmentation to cluster a subset of the pixel set with either color separately from another subset with the other color, the former subset will be found in a region disconnected from a region including the latter subset.

The present invention has been achieved with such problems of conventional data processing methods and systems in mind.

SUMMARY OF THE INVENTION

It is a first object of the present invention to provide a method and a system for processing a set of data on a temporal sequence of two or three dimensional pictures with a time-dependent motion intermittently picked up therein, by using measures for a compensation of the motion in combination with an image segmentation of the pictures, so that a current picture is segmented into a number of regions as clusters of pixels, and a relative motion is estimated between a respective one of the segmented regions in the current picture and a corresponding region of a previous picture to thereby determine a motion vector.

To achieve the first object, a genus of the present invention provides a motion picture processing method for processing a sequence of motion pictures. The method comprises three steps. In a first step, a current picture in the sequence of motion pictures is image-segmented into a number of first regions. In a second step, for a respective one of the first regions, a corresponding second region is determined in a previous picture to the current picture in the sequence of motion pictures. In a third step, a relative motion is estimated between the respective first region and the corresponding second region to determine a motion vector representative of the relative motion.

According to a species of the genus of the invention, the motion picture processing method further comprises the steps of motion-compensating a local decoded picture of the previous picture in dependence on the motion vector to obtain a predicted picture of the current picture, subtracting the predicted picture from the current picture to obtain a prediction error picture, coding the prediction error picture in a compressing manner into a set of coded data, decoding the set of coded data in a decompressing manner into a local decoded error picture, and adding the local decoded error picture to the predicted picture to obtain a local decoded picture of the current picture.

According to another species of the genus of the invention, the current picture comprises an arbitrary picture in the sequence of motion pictures, and the previous picture comprises a local decoded picture of a picture previous to the arbitrary picture in the sequence of motion pictures.

To achieve the first object another genus of the present invention provides a motion picture coding-decoding method for processing a sequence of motion pictures to obtain a sequence of decoded pictures. The method comprises thirteen steps. A first step image-segments a current picture in the sequence of motion pictures into a number of first regions. A second step determines for a respective one of the first regions a corresponding second region in a previous picture to the current picture in the sequence of motion pictures. A third step estimates a relative motion between the respective first region and the corresponding second region to determine a motion vector representative of the relative motion. A fourth step motion-compensates a local decoded picture of the previous picture in dependence on the motion vector to obtain a predicted picture of the current picture. A fifth step subtracts the predicted picture from the current picture to obtain a prediction error picture. A sixth step encodes the motion vector into a sequence of first codes. A seventh step encodes the prediction error picture in a compressing manner into a sequence of second codes. An eighth step multiplexes the sequence of first codes and the sequence of second codes to obtain a multiplexed signal. A ninth step demultiplexes the multiplexed signal into a combination of a sequence of third codes corresponding to the sequence of first codes and a sequence of fourth codes corresponding to the sequence of second codes. A tenth step decodes the sequence of third codes to obtain a decoded vector corresponding to the motion vector. An eleventh step decodes the sequence of fourth codes in a decompressing manner to obtain a decoded error picture. A twelfth step responds to the decoded vector to motion-compensate a previous decoded picture in the sequence of decoded pictures to obtain a decoded prediction picture. A thirteenth step adds the decoded error picture to the decoded prediction picture to obtain a picture subsequent to the previous decoded picture in the sequence of decoded pictures.

To achieve the first object, another genus of the present invention provides a picture data processing method for processing a set of data on a temporal sequence of two or three dimensional pictures with a time-dependent motion intermittently picked up therein, the set of data including a set of current data on a current picture in the sequence of pictures and a set of previous data on a previous picture to the current picture in the sequence of pictures, the current picture consisting of a set of current pixels each respectively defined by a combination of current image data associated therewith and a combination of current address data representing an address thereof in the current picture, the previous picture consisting of a set of previous pixels each respectively defined by a combination of previous image data associated therewith and a combination of previous address data representing an address thereof in the previous picture. The method comprises five steps. A first step has the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data. A second step has the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. A third step segments the first picture into a number of first regions each respectively composed of a cluster of a variable number of elements (i.e. first pixels) of the set of first pixels, so that the first character vectors of the variable number of elements are relatively vicinal to each other in terms of a distance defined in the spatiotemporal field and have the first location parameter vectors thereof averaged to obtain a first location representative vector representative of a location of a correspondent one of the first regions in the spatiotemporal field. A fourth step determines for a respective one of the first regions a corresponding second region in the second picture, the corresponding second region being composed of an identical number of elements (i.e. second pixels) of the set of second pixels to the variable number of elements of the set of first pixels, so that the second character vectors of the identical number of elements have the second image parameter vectors thereof each respectively relatively vicinal to a representative vector of the first image parameter vectors of the first character vectors in terms of the distance and the second location parameter vectors thereof averaged to obtain a second location representative vector representative of a location of a correspondent one of the second regions in the spatiotemporal field. A fifth step estimates a relative motion as part of the time-dependent motion between the respective first region and the corresponding second region, by subtracting the second location representative vector of the latter from the first location representative vector of the former to determine a motion vector representive of the relative motion in the spatiotemporal field.

Moreover, to achieve the first object, another genus of the present invention provides a motion picture processing system for processing a sequence of motion pictures. The system comprises an image segmentor and a motion estimator. The image segmentor image-segments a current picture in the sequence of motion pictures into a number of first regions. The motion estimator determines for a respective one of the first regions a corresponding second region in a previous picture to the current picture in the sequence of motion pictures, and estimates a relative motion between the respective first region and the corresponding second region to determine a motion vector representative of the relative motion.

Acoording to a species of this genus of the invention, the motion picture processing system further comprises a motion compensator for motion-compensating a local decoded picture of the previous picture in dependence on the motion vector to obtain a predicted picture of the current picture, a subtractor for subtracting the predicted picture from the current picture to obtain a prediction error picture, a compressing coder for coding the prediction error picture in a compressing manner into a set of coded data, a decompressing decoder for decoding the set of coded data in a decompressing manner into a local decoded error picture, and an adder for adding the restored error picture to the predicted picture to obtain a local decoded picture of the current picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the first object, another genus of the present invention provides a motion picture coding-decoding system for processing a sequence of motion pictures to obtain a sequence of decoded pictures. The system comprises an image segmentor for image-segmenting a current picture in the sequence of motion pictures into a number of first regions, a motion estimator for determining for a respective one of the first regions a corresponding second region in a previous picture to the current picture in the sequence of motion pictures and estimating a relative motion between the respective first region and the corresponding second region to determine a motion vector representative of the relative motion, a first motion compensator for motion-compensating a local decoded picture of the previous picture in dependence on the motion vector to obtain a predicted picture of the current picture, a subtractor for subtracting the predicted picture from the current picture to obtain a prediction error picture, a multiplexing encoder for coding the motion vector into a sequence of first codes, for coding the prediction error picture in a compressing manner into a sequence of second codes, and for multiplexing the sequence of first codes and the sequence of second codes to obtain a multiplexed signal, a demultiplexing decoder for demultiplexing the multiplexed signal into a combination of a sequence of third codes corresponding to the sequence of first codes and a sequence of fourth codes corresponding to the sequence of second codes, for decoding the sequence of third codes to obtain a decoded vector corresponding to the motion vector. and for decoding the sequence of fourth codes in a decompressing manner to obtain a decoded error picture, a second motion compensator for responding to the decoded vector to motion-compensate a previous decoded picture in the sequence of decoded pictures to obtain a decoded prediction picture, and an adder for adding the decoded error picture to the decoded prediction picture to obtain a picture subsequent to the previous decoded picture in the sequence of decoded pictures.

To achieve the first object, another genus of the present invention provides a picture data processing system for processing a set of data on a temporal sequence of two or three dimensional pictures with a time-dependent motion intermittently picked up therein, the set of data including a set of current data on a current picture in the sequence of pictures and a set of previous data on a previous picture to the current picture in the sequence of pictures, the current picture consisting of a set of current pixels each respectively defined by a combination of current image data associated therewith and a combination of current address data representing an address thereof in the current picture, the previous picture consisting of a set of previous pixels each respectively defined by a combination of previous image data associated therewith and a combination of previous address data representing an address thereof in the previous picture. The system comprises a set of data processing measures such as a set of programs in a controller, an image segmentor and a motion estimator. The data processing measures cooperate with each other to have the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data, and to have the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. The image segmentor segments the first picture into a number of first regions each respectively composed of a cluster of a variable number of elements of the set of first pixels, so that the first character vectors of the variable number of elements are relatively vicinal to each other in terms of a distance defined in the spatiotemporal field and have the first location parameter vectors thereof averaged to obtain a first location representative vector representative of a location of a correspondent one of the first regions in the spatiotemporal field. The motion estimator determines for a respective one of the first regions a corresponding second region in the second picture, the corresponding second region being composed of an identical number of elements of the set of second pixels to the variable number of elements of the set of first pixels, so that the second character vectors of the identical number of elements have the second image parameter vectors thereof each respectively relatively vicinal to a representative vector of the first image parameter vectors of the first character vectors in terms of the distance and the second location parameter vectors thereof averaged to obtain a second location representative vector representative of a location of a correspondent one of the second regions in the spatiotemporal field, and estimates a relative motion as part of the time-dependent motion between the respective first region and the corresponding second region, by subtracting the second location representative vector of the latter from the first location representative vector of the former to determine a motion vector representive of the relative motion in the spatiotemporal field.

Therefore, according to any genus of the invention for the first object, a motion vector represents a relative motion estimated between a cluster of pixels in a current picture, which pixels have their character parameter sets component-wise vicinal to each other, and a corresponding region of a previous picture, so that a significant portion of a moving object picked up in the cluster may be picked up in the corresponding region, with a higher probability than the case of equi-divided blocks, and hence with an increased tendency to faithfully or naturally represent a picked-up motion, thus resulting in an improved motion compensation.

It is a second object of the present invention to provide a method and a system for processing a set of data on a temporal sequence of two or three dimensional pictures with a time-dependent motion intermittently picked up therein, by using measures for a compensation of the motion in combination with an image segmentation of the pictures, so that a relative motion is estimated between a respective one of minute-divided pieces of a current picture and a corresponding minute piece in a previous picture to thereby determine a parameter representative of the relative motion, while any piece may comprise one or more pixels, and the current picture is segmented into a number of regions consisting of pixels clustered with respect to a set of character parameters including the motion-representative parameter.

To achieve the second object, a genus of the present invention provides a motion picture processing method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing method comprises five or six steps. A first step divides the current picture into a predetermined number of current minute pieces each respectively consisting of one or more elements (i.e. pixels) of the set of current pixels. A second step may divide the previous picture into a number of previous minute pieces identical to the predetermined number. The previous minute pieces may each respectively consist of one or more elements (i.e. pixels) of the set of previous pixels. A third step determines, for a respective one of the predetermined number of current minute pieces, a corresponding previous minute piece. A fourth step estimates a relative motion between the respective current minute piece and the corresponding previous minute piece. A fifth step additionally defines each element of the set of current pixels in the respective current minute piece, by a combination of motion data representative of the relative motion. A sixth step serves for image-segmenting the current picture into a number of first regions with respect to the combination of image data, the combination of address data and the combination of motion data. The first regions are smaller in number than the current minute pieces.

According to a species of this genus of the invention, the motion picture processing method further comprises the steps of image-mosaicking the current picture to obtain a predicted picture thereof so that respective elements of a subset of the set of current pixels associated with a respective one of the first regions have a combination of region-representative image data in place of the respective combinations of image data thereof, subtracting the predicted picture from the current picture to obtain a prediction error picture, coding the predicted picture and the prediction error in a compressing manner into a first set of coded data and a second set of coded data, respectively, decoding the first set of coded data and the second set of coded data in a decompressing manner into a local decoded prediction picture and a local decoded error picture, respectively, and adding the local decoded error picture to the local decoded prediction picture to obtain a local decoded picture.

According to another species of this genus of the invention, the current picture comprises an arbitrary picture in the sequence of motion pictures, and the previous picture comprises a local decoded picture of a picture previous to that arbitrary picture in the sequence of motion pictures.

To achieve the second object, another genus of the present invention provides a motion picture coding-decoding method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The coding-decoding method comprises fourteen or fifteen steps. A first step divides the current picture into a predetermined number of current minute pieces each respectively consisting of one or more elements of the set of current pixels. A second step may divide the previous picture into an identical number of previous minute pieces to the predetermined number, which previous minute pieces may each respectively consist of one or more elements of the set of previous pixels. A third step determines for a respective one of the current minute pieces a corresponding previous minute piece. A fourth step estimates a relative motion between the respective current minute piece and the corresponding previous minute piece. A fifth step additionally defines each element of the set of current pixels in the respective current minute piece, by a combination of motion data representative of the relative motion. A sixth step serves for image-segmenting the current picture into a number of first regions with respect to the combination of image data, the combination of address data and the combination of motion data, while the first regions are smaller in number than the current minute pieces. A seventh step serves for image-mosaicking the current picture to obtain a predicted picture thereof so that respective elements of a subset of the set of current pixels associated with a respective one of the first regions have a combination of region-representative image data in place of the combinations of image data thereof. An eighth step subtracts the predicted picture from the current picture to obtain a prediction error picture. A ninth step encodes the predicted picture in a compressing manner into a sequence of first codes. A tenth step encodes the prediction error picture in a compressing manner into a sequence of second codes. An eleventh step multiplexes the sequence of first codes and the sequence of second codes to obtain a multiplexed signal. A twelfth step demultiplexes the multiplexed signal into a combination of a sequence of third codes corresponding to the sequence of first codes and a seqeunce of fourth codes corresponding to the sequence of second codes. A thirteenth step decodes the sequence of third codes in a decompressing manner into a decoded prediction picture. A fourteenth step decodes the sequence of fourth codes in a decompressing manner into a decoded error picture. A fifteenth step adds the decoded error picture to the decoded prediction picture to obtain a decoded picture corresponding to the current picture.

To achieve the second object, another genus of the present invention provides a picture data processing method for processing a set of data on a temporal sequence of two or three dimensional pictures with a time-dependent motion intermittently picked up therein. The set of data includes a set of current data on a current picture in the sequence of pictures and a set of previous data on a previous picture to the current picture therein. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture. The picture data processing method comprises six or seven steps. A first step has the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data. A second step has the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. A third step divides the first picture into a predetermined number of first minute pieces each respectively consisting of one or more elements (i.e. pixels) of the set of first pixels having the first location parameter vectors thereof averaged to obtain a first location representative vector representative of a location of a correspondent one of the first minute pieces in the spatiotemporal field. A fourth step may divide the second picture into an identical number of second minute pieces to the predetermined number. The second minute pieces may each respectively consist of one or more elements (i.e. pixels) of the set of second pixels having the second location parameter vectors thereof averaged to obtain a second location representative vector representative of a location of a corresponding one of the second minute pieces in the spatiotemporal field. A fifth step determines, for a respective one of the first minute pieces, a corresponding second minute piece. A sixth step estimates a relative motion as part of the time-dependent motion between the respective one of the first minute pieces and the corresponding second minute piece, by subtracting a second location representative vector of the latter from the first location representative vector of the former to determine a motion vector representative of the relative motion in the spatiotemporal field. A seventh step adds the motion vector to the first character vector of each element of the set of first pixels in the respective one of the first minute pieces to obtain a dimension-increased character vector. An eighth step segments the first picture into a number of first regions each respectively composed of a cluster of a variable number of elements of the set of first pixels, so that the dimension-increased character vectors of the variable number of elements are relatively vicinal to each other in terms of a distance defined in the spatiotemporal field.

Moreover, to achieve the second object, another genus of the present invention provides a motion picture processing system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing system comprises a motion estimator and an image segmentor. The motion estimator divides the current picture into a predetermined number of current minute pieces each respectively consisting of one or more elements (i.e. pixels) of the set of current pixels, and may divide the previous picture into an identical number of previous minute pieces to the predetermined number of current minute pieces. The previous minute pieces may each respectively consist of one or more elements (i.e. pixels) of the set of previous pixels. The motion estimator then determines for a respective one of the current minute pieces a corresponding previous minute piece, estimates a relative motion between the respective one of the current minute pieces and the corresponding previous minute piece, and additionally defines each element of the set of current pixels in the respective one of the current minute pieces, by a combination of motion data representative of the relative motion. The image segmentor serves for image-segmenting the current picture into a number of first regions with respect to the combination of image data, the combination of address data and the combination of motion data, while the number of first regions is smaller than the predetermined number of current minute pieces.

According to a species of this genus of the invention, the image segmentor further serves for image-mosaicking the current picture to obtain a predicted picture thereof so that respective elements (i.e. pixels) of a subset (i.e. in a region) of the set of current pixels associated with a respective one of the first regions have a combination of region-representative image data in place of the combinations of image data thereof, and the motion picture processing system further comprises a subtractor for subtracting the predicted picture from the current picture to obtain a prediction error picture, a compressing coder for coding the predicted picture and the prediction error picture in a compressing manner into a first set of coded data and a second set of coded data, respectively, a decompressing decoder for decoding the first set of coded data and the second set of coded data in a decompressing manner into a local decoded prediction picture and a local decoded error picture, respectively, and an adder for adding the local decoded error picture to the local decoded prediction picture to obtain a local decoded picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the second object, another genus of the present invention provides a motion picture coding-decoding system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture coding-decoding system comprises a motion estimator, an image segmentor, a subtractor, a multiplexing encoder, a demultiplexing decoder and an adder. The motion estimator divides the current picture into a predetermined number of current minute pieces each respectively consisting of one or more elements of the set of current pixels, and may divide the previous picture into an identical number of previous minute pieces to the predetermined number, the previous minute pieces each respectively consisting of one or more elements of the set of previous pixels, determines for a respective one of the current minute pieces a corresponding previous minute piece, estimates a relative motion between the respective one of the current minute pieces and the corresponding previous minute piece, and additionally defines each element of the set of current pixels in the respective one of the current minute pieces, by a combination of motion data representative of the relative motion. The image segmentor serves for image-segmenting the current picture into a number of first regions with respect to the combination of image data, the combination of address data and the combination of motion data, while the number of first regions is smaller than the predetermined number, and for image-mosaicking the current picture to obtain a predicted picture thereof so that respective elements of a subset of the set of current pixels associated with a respective one of the first regions have a combination of region-representative image data in place of the combinations of image data thereof. The subtractor subtracts the predicted picture from the current picture to obtain a prediction error picture. The multiplexing encoder codes the predicted picture and the prediction error picture in a compressing manner into a sequence of first codes and a sequence of second codes, respectively, and multiplexes the sequence of first codes and the sequence of second codes to obtain a multiplexed signal. The demultiplexing decoder demultiplexes the multiplexed signal into a combination of a sequence of third codes corresponding to the sequence of first codes and a seqeunce of fourth codes corresponding to the sequence of second codes, and decodes the sequence of third codes and the sequence of fourth codes in a decompressing manner into a decoded prediction picture and a decoded error picture, respectively. The adder adds the decoded error picture to the decoded prediction picture to obtain a decoded picture corresponding to the current picture.

To achieve the second object, another genus of the present invention provides a picture data processing system for processing a set of data on a temporal sequence of two or three dimensional pictures with a time-dependent motion intermittently picked up therein. The set of data includes a set of current data on a current picture in the sequence of pictures and a set of previous data on a previous picture to the current picture in the sequence of pictures. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture.

The picture data processing system comprises a set of data processing measures such as a set of programs, a motion estimator and an image segmentor. The data processing measures serve for having the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data, and for having the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. The motion estimator divides the first picture into a predetermined number of first minute pieces each respectively consisting of one or more elements of the set of first pixels having the first location parameter vectors thereof averaged to obtain a first location representative vector representative of a location of a correspondent one of the first minute pieces in the spatiotemporal field, may divide the second picture into an identical number of second minute pieces to the predetermined number, the second minute pieces each respectively consisting of one or more elements of the set of second pixels having the second location parameter vectors thereof averaged to obtain a second location representative vector representative of a location of a correspondent one of the second minute pieces in the spatiotemporal field, determines for a respective one of the first minute pieces a corresponding second minute piece, estimates a relative motion as part of the time-dependent motion between the respective one of the first minute pieces and the corresponding second minute piece, by subtracting a second location representative vector of the latter from the first location representative vector of the former to determine a motion vector representive of the relative motion in the spatiotemporal field, and adds the motion vector to the first character vector of each element of the set of first pixels in the respective one of the first minute pieces to obtain a dimension-increased character vector The image segmentor is implemented for segmenting the first picture into a number of first regions each respectively composed of a cluster of a variable number of elements of the set of first pixels, so that the dimension-increased character vectors of the variable number of elements are relatively vicinal to each other in terms of a distance defined in the spatiotemporal field.

Still more, to achieve the second object, another genus of the invention provides a motion picture processing method for processing a motion picture by using a reference picture to obtain an image-segmented picture of the motion picture. The motion picture processing method comprises six steps. A first step stores a set of pixel data representative of the motion picture in an accessible manner as a current frame picture having a set of image data of a set of pixels thereof. A second step stores a set of pixel data representative of the reference picture in an accessible manner as a reference frame picture. A third step estimates a set of motion vectors between the current frame picture and the reference frame picture. A fourth step stores a set of motion data representative of the set of motion vectors in an accessible manner. A fifth step generates a series of address signals for the current frame picture to obtain a set of location data of the set of pixels. A sixth step serves for image-segmenting the current frame picture by clustering the set of pixels with respect to the set of image data, the set of motion data and the set of location data.

According to a species of this genus of the invention, the set of pixel data representative of the motion picture comprises the set of image data, and the set of image data comprises a set of color image data. The set of pixel data representative of the reference picture may comprise another set of color image data.

According to another species of this genus of the invention, the clustering is performed in a weighting manner by a factor having a value thereof controlled in correspondence to a character parameter of the current frame picture.

According to another species of this genus of the invention, the motion picture processing method further comprises the step of image-segmenting the current frame picture to obtain an image-segmented picture including a variety of minute regions, and a step of eliminating the minute regions from the image-segmented picture.

According to another species of this genus of the invention, the motion picture processing method further comprises a step of subjecting an arbitrary one of the set of image data, the set of motion data and the set of location data to a noise filter, before the clustering.

Yet more, to achieve the second object, another genus of the present invention provides a motion picture processing system for processing a motion picture by using a reference picture to obtain an image-segmented picture of the motion picture. The motion picture processing system comprises a first memory, a second memory, a motion estimator, a third memory, an address generator and an image segmentor. The first memory stores therein a set of pixel data representative of the motion picture in an accessible manner as a current frame picture having a set of image data of a set of pixels thereof. The second memory stores therein a set of pixel data representative of the reference picture in an accessible manner as a reference frame picture. The motion estimator estimates a set of motion vectors between the current frame picture and the reference frame picture. The third memory stores therein a set of motion data representative of the set of motion vectors in an accessible manner. The address generator generates a series of address signals for the current frame picture to obtain a set of location data of the set of pixels. The image segmentor serves for image-segmenting the current frame picture by clustering the set of pixels with respect to the set of image data, the set of motion data and the set of location data.

According to a species of this genus of the invention, the set of pixel data representative of the motion picture comprises the set of image data, and the set of image data comprises a set of color image data. The set of pixel data representative of the reference picture may comprise another set of color image data.

According to another species of this genus of the invention, the clustering is performed in a weighting manner by a factor having a value thereof controlled in correspondence to a character parameter of the current frame picture.

According to another species of this genus of the invention, the motion picture processing system further comprises the image segmentor for image-segmenting the current frame picture to obtain an image-segmented picture including a variety of minute regions, and an eliminator for eliminating the minute regions from the image-segmented picture.

According to another species of this genus of the invention, the motion picture processing system further comprises a noise filter for filtering an arbitrary one of the set of image data, the set of motion data and the set of location data.

Therefore, according to any genus of the invention for the second object, a flexible clustering of pixels is performed with respect to a set of character parameters including a representative one of a relative motion estimated between a minute piece of a current picture and a corresponding piece of a previous picture, so that in the current picture a pair of pieces different of motion may either have its pixels clustered in a region and the other have its pixels clustered in another region, or a pair of pieces alike in motion may have their pixels clustered all in a single region, with an increased tendency to faithfully or naturally represent an original region connected in a picked-up image, thus resulting in an improved image segmentation.

For example, in a current picture, some piece may represent a certain portion of a moving object, and another. a neighboring portion thereof. An estimated motion of the former should however be identical to that of the latter, thus causing associated pixels to be clustered in a connected region free of an erroneous contour or discontinuity, resulting in a high-grade picture quality.

It is a third object of the present invention to provide a method and a system for processing a set of data on a temporal sequence of two or three dimensional pictures with a time-dependent motion intermittently picked up therein, by using measures for a compensation of the motion in combination with an image segmentation of the pictures, in a feedbacking manner so that a current picture is segmented into a number of regions as clusters of pixels, a relative motion is estimated between a respective one of sub-regions of a respective one of the segmented regions in the current picture and a corresponding sub-region in a previous picture to thereby determine a representative parameter of the relative motion, while any sub-region may comprise one or more pixels, and the current picture is resegmented into a number of regions consisting of pixels reclustered with respect to a set of character parameters including the motion-representative parameter.

To achieve the third object, a genus of the present invention provides a motion picture processing method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing method comprises six steps. A first step image-segments the current picture into a predetermined number of current regions. A second step divides a respective one of the current regions into a variable number of sub-regions each respectively consisting of one or more elements of the set of current pixels. A third step determines for a respective one of the sub-regions of the respective one of the current regions a corresponding small region in the previous picture. A fourth step estimates a relative motion between the respective one of the sub-regions of the respective one of the current regions and the corresponding small region. A fifth step additionally defines each element of the set of current pixels in the respective one of the sub-regions of the respective one of the current regions, by a combination of motion data representative of the relative motion. A sixth step resegments the current picture into a number of first regions with respect to the combination of image data, the combination of address data and the combination of motion data.

According to a species of this genus of the invention, the motion picture processing method further comprises a step of image-mosaicking the current picture to obtain a predicted picture thereof so that respective elements of a subset of the set of current pixels associated with a respective one of the first regions have a combination of region-representative image data in place of the combinations of image data thereof, a step of subtracting the predicted picture from the current picture to obtain a prediction error picture, a step of coding the predicted picture in a compressing manner into a first set of coded data, a step of coding the prediction error picture in a compressing manner into a second set of coded data, a step of decoding the first set of coded data in a decompressing manner into a local decoded prediction picture, a step of decoding the second set of coded data in a decompressing manner into a local decoded error picture, and a step of adding the local decoded error picture to the local decoded prediction picture to obtain a local decoded picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the third object, another genus of the present invention provides a motion picture coding-decoding method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture coding-decoding method comprises fifteen steps. A first step is for image-segmenting the current picture into a predetermined number of current regions. A second step divides a respective one of the current regions into a variable number of sub-regions each respectively consisting of one or more elements of the set of current pixels. A third step determines for a respective one of the sub-regions of the respective one of the current regions a corresponding small region in the previous picture. A fourth step estimates a relative motion between the respective one of the sub-regions of the respective one of the current regions and the corresponding small region. A fifth step additionally defines each element of the set of current pixels in the respective one of the sub-regions of the respective one of the current regions, by a combination of motion data representative of the relative motion. A sixth step resegments the current picture into a number of first regions with respect to the combination of image data, the combination of address data and the combination of motion data. A seventh step is for image-mosaicking the current picture to obtain a predicted picture thereof so that respective elements of a subset of the set of current pixels associated with a respective one of the first regions have a combination of region-representative image data in place of the combinations of image data thereof. An eighth step subtracts the predicted picture from the current picture to obtain a prediction error picture. A ninth step codes the predicted picture in a compressing manner into a sequence of first codes. A tenth step codes the prediction error picture in a compressing manner into a sequence of second codes. An eleventh step multiplexes the sequence of first codes and the sequence of second codes to obtain a multiplexed signal. A twelfth step demultiplexes the multiplexed signal into a combination of a sequence of third codes corresponding to the sequence of first codes and a seqeunce of fourth codes corresponding to the sequence of second codes. A thirteenth step decodes the sequence of third codes in a decompressing manner into a decoded prediction picture. A fourteenth step decodes the sequence of fourth codes in a decompressing manner into a decoded error picture. A fifteenth step adds the decoded error picture to the decoded prediction picture to obtain a decoded picture corresponding to the current picture.

To achieve the third object, another genus of the present invention provides a picture data processing method for processing a set of data on a temporal sequence of two or three dimensional pictures with a time-dependent motion intermittently picked up therein. The set of data includes a set of current data on a current picture in the sequence of pictures and a set of previous data on a previous picture to the current picture in the sequence of pictures. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture. The picture data processing method comprises eight steps. A first step has the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data. A second step has the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. A third step segments the first picture into a predetermined number of segment regions each respectively composed of a first cluster of a variable number of elements of the set of first pixels, so that the first character vectors of the variable number of elements are relatively vicinal to each other in terms of a distance defined in the spatiotemporal field. A fourth step divides a respective one of the segment regions into a variable number of sub-regions each respectively consisting of one or more elements of the set of first pixels having the first location parameter vectors thereof averaged to obtain a first location representative vector representative of a location of a correspondent one of the sub-regions in the spatiotemporal field. A fifth step determines for a respective one of the sub-regions of the respective one of the segment regions a corresponding small region in the second picture, which small region is composed of an identical number of elements of the set of second pixels to the one or more elements of the set of first pixels in the respective one of the sub-regions, so that the second character vectors of the identical number of elements have the second image parameter vectors thereof each respectively relatively vicinal to a representative vector of the first image parameter vectors of the first character vectors in said respective one of said variable number of sub-regions in terms of the distance and the second location parameter vectors thereof averaged to obtain a second location representative vector representative of a location of the corresponding small region in said spatiotemporal field. A sixth step estimates a relative motion as part of the time-dependent motion between the respective one of the sub-regions and the corresponding small region, by subtracting the second location representative vector of the corresponding small region from the first location representative vector of the respective one of the sub-regions to determine a motion vector representive of the relative motion in the spatiotemporal field. A seventh step adds the motion vector to the first character vector of each element of the set of first pixels in the respective one of the sub-regions of the respective one of the segment regions to obtain a dimension-increased character vector. An eighth step resegments the first picture into a number of first regions each respectively composed of a second cluster of a variable number of elements of the set of first pixels, so that the dimension-increased character vectors of the variable number of elements are relatively vicinal to each other in terms of the distance in the spatiotemporal field.

Moreover, to achieve the third object, another genus of the invention provides a motion picture processing system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing system comprises a segmentor, a motion estimator and a resegmentor. The segmentor image-segments the current picture into a predetermined number of current regions. The motion estimator divides a respective one of the current regions into a variable number of sub-regions each respectively consisting of one or more elements of the set of current pixels, determines for a respective one of the sub-regions of the respective one of the current regions a corresponding small region in the previous picture, estimates a relative motion between the respective one of the sub-regions of the respective one of the current regions and the corresponding small region, and additionally defines each element of the set of current pixels in the respective one of the sub-regions of the respective one of the current regions, by a combination of motion data representative of the relative motion. The resegmentor resegments the current picture into a number of first regions with respect to the combination of image data, the combination of address data and the combination of motion data.

According to a species of this genus of the invention, the motion picture processing system further comprises the resegmentor for image-mosaicking the current picture to obtain a predicted picture thereof so that respective elements of a subset of the set of current pixels associated with a respective one of the first regions have a combination of region-representative image data in place of the combinations of image data thereof, a subtractor for subtracting the predicted picture from the current picture to obtain a prediction error picture, a compressing coder for coding the predicted picture and the prediction error picture in a compressing manner into a first set of coded data and a second set of coded data, respectively, a decompressing decoder for decoding the first set of coded data and the second set of coded data in a decompressing manner into a local decoded prediction picture and a local decoded error picture, respectively, and an adder for adding the local decoded error picture to the local decoded prediction picture to obtain a local decoded picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the third object, another genus of the present invention provides a motion picture coding-decoding system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture coding-decoding system comprises a segmentor, a motion estimator, a resegmentor, a subtractor, a multiplexing encoder, a demultiplexing decoder and an adder. The segmentor is for image-segmenting the current picture into a predetermined number of current regions. The motion estimator divides a respective one of the current regions into a variable number of sub-regions each respectively consisting of one or more elements of the set of current pixels, determines for a respective one of the sub-regions of the respective one of the current regions a corresponding small region in the previous picture, estimates a relative motion between the respective one of the sub-regions of the respective one of the current regions and the corresponding small region, and additionally defines each element of the set of current pixels in the respective one of the sub-regions of the respective one of the current regions, by a combination of motion data representative of the relative motion. The resegmentor resegments the current picture into a number of first regions with respect to the combination of image data, the combination of address data and the combination of motion data, and image-mosaicks the current picture to obtain a predicted picture thereof so that respective elements of a subset of the set of current pixels associated with a respective one of the first regions have a combination of region-representative image data in place of the combinations of image data thereof. The subtractor subtracts the predicted picture from the current picture to obtain a prediction error picture. The encoder codes the predicted picture and the prediction error picture in a compressing manner into a sequence of first codes and a sequence of second codes, respectively, and multiplexes the sequence of first codes and the sequence of second codes to obtain a multiplexed signal. The decoder demultiplexes the multiplexed signal into a combination of a sequence of third codes corresponding to the sequence of first codes and a seqeunce of fourth codes corresponding to the sequence of second codes, and decodes the sequence of third codes and the sequence of fourth codes in a decompressing manner into a decoded prediction picture and a decoded error picture, respectively. The adder adds the decoded error picture to the decoded prediction picture to obtain a decoded picture corresponding to the current picture.

To achieve the third object, another genus of the present invention provides a picture data processing system for processing a set of data on a temporal sequence of two or three dimensional pictures with a time-dependent motion intermittently picked up therein. The set of data includes a set of current data on a current picture in the sequence of pictures and a set of previous data on a previous picture to the current picture in the sequence of pictures. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture. The picture data processing system comprises a set of data processing measures such as a set of programs, a segmentor and a motion estimator. The data processing measures serve for having the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data, and for having the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. The segmentor segments the first picture into a predetermined number of segment regions each respectively composed of a first cluster of a variable number of elements of the set of first pixels, so that the first character vectors of the variable number of elements are relatively vicinal to each other in terms of a distance defined in the spatiotemporal field. The motion estimator divides a respective one of the segment regions into a variable number of sub-regions each respectively consisting of one or more elements of the set of first pixels having the first location parameter vectors thereof averaged to obtain a first location representative vector representative of a location of a correspondent one of the sub-regions in the spatiotemporal field, determines for a respective one of the sub-regions of the respective one of the segment regions a corresponding small region in the second picture, which small region is composed of an identical number of elements of the set of second pixels to the one or more elements of the set of first pixels in the respective one of the sub-regions, so that the second character vectors of the identical number of elements have the second image parameter vectors thereof each respectively relatively vicinal to a representative vector of the first image parameter vectors of the first character vectors in said respective one of said variable number of sub-regions in terms of the distance and the second location parameter vectors thereof averaged to obtain a second location representative vector representative of a location of the corresponding small region in said spatiotemporal field, estimates a relative motion as part of the time-dependent motion between the respective one of the sub-regions and the corresponding small region, by subtracting the second location representative vector of the corresponding small region from the first location representative vector of the respective one of the sub-regions to determine a motion vector representive of the relative motion in the spatiotemporal field, and adds the motion vector to the first character vector of each element of the set of first pixels in the respective one of the sub-regions of the respective one of the segment regions to obtain a dimension-increased character vector. The segmentor is implemented to resegment the first picture into a number of first regions each respectively composed of a second cluster of a variable number of elements of the set of first pixels, so that the dimension-increased character vectors of the variable number of elements of the second cluster are relatively vicinal to each other in terms of the distance in the spatiotemporal field.

Therefore, according to any genus of the invention for the third object, a flexible clustering is performed with respect to a set of character parameters including a representative one of a relative motion estimated between a sub-region of a segmented region in a current picture and a corresponding sub-region in a previous picture, with an additionally increased tendency to faithfully or naturally represent an original region connected in a picked-up image.

Accordingly, on the one hand, a number of pixels may be reclustered to be shared among a number of resegmented regions disconnected from each other, if their motions are significantly different from each other, even when their locations, colors and/or luminances are vicinal to each other, thus resulting in a competent representation remarkably faithful to an original motion image. More specifically, for example, when a picture contains a pair of neighboring objects resemblant in color but different in motion, if the difference of motion is significant enough for an image segmentation according to the invention to separate them from each other, they will be distributed between a pair of disconnected regions.

On the other hand, an image region substantially uniform in motion but uneven in color and/or luminance may be connected therein, permitting a desirable local decrease in number of regions to provide an effective allowance for a probable need of a minute segmentation at any other places, resulting in an efficient flexible segmentation despite a restriction from a total number of regions. For example, when a picture contains a sufficiently small set of pixels representing a single object colored with a pair of different colors and moving without revolution, if a resemblance between their motions is significant enough for an image segmentation according to the invention to recluster a subset of the pixel set with either color together with another subset with the other color, the former subset will be found in a region connected with a region including the latter subset.

It is a fourth object of the present invention to provide a method and a system for processing a set of data on a temporal sequence of two or three dimensional pictures with a time-dependent motion intermittently picked up therein, by using measures for a compensation of the motion in combination with an image segmentation of the pictures, in a feedbacking manner so that a relative motion is estimated between a respective one of minute-divided pieces of a current picture and a corresponding minute piece of a previous picture to thereby determine a parameter representative of the relative motion, while any piece may comprise one or more pixels, the current picture is segmented into a number of regions consisting of pixels clustered with respect to a set of character parameters including the motion-representative parameter, and a relative motion is reestimated between a respective one of the segmented regions of the current picture and a correspondent region of the previous picture to thereby determine a motion vector.

To achieve the fourth object, a genus of the present invention provides a motion picture processing method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing method comprises seven or eight steps. A first step divides the current picture into a predetermined number of current minute pieces each respectively consisting of one or more elements of the set of current pixels. A second step may divide the previous picture into an identical number of previous minute pieces to the predetermined number. The previous minute pieces may each respectively consist of one or more elements of the set of previous pixels. A third step determines for a respective one of the current minute pieces a corresponding previous minute piece. A fourth step estimates a first relative motion between the respective one of the current minute pieces and the corresponding previous minute piece. A fifth step additionally defines each element of the set of current pixels in the respective one of the current minute pieces, by a combination of motion data representative of the first relative motion. A sixth step is for image-segmenting the current picture into a number of first regions with respect to the combination of image data, the combination of address data and the combination of motion data, while the number of first regions is smaller than the predetermined number. A seventh step determines for a respective one of the first regions a corresponding second region in the previous picture. An eighth step estimates a second relative motion between the respective one of the first regions and the corresponding second region to determine a motion vector representative of the second relative motion.

According to a species of this genus of the invention, the motion picture processing method further comprises the steps of motion-compensating a local decoded picture of the previous picture in dependence on the motion vector to obtain a predicted picture of the current picture, subtracting the predicted picture from the current picture to obtain a prediction error picture, coding the prediction error picture in a compressing manner into a set of coded data, decoding the set of coded data in a decompressing manner into a local decoded error picture, and adding the local decoded error picture to the predicted picture to obtain a local decoded picture of the current picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the fourth object, another genus of the present invention provides a motion picture coding-decoding method for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture coding-decoding method comprises seventeen or eighteen steps. A first step divides the current picture into a predetermined number of current minute pieces each respectively consisting of one or more elements of the set of current pixels. A second step may divide the previous picture into an identical number of previous minute pieces to the predetermined number, which previous minute pieces may each respectively consist of one or more elements of the set of previous pixels. A third step determines for a respective one of the current minute pieces a corresponding previous minute piece. A fourth step estimates a first relative motion between the respective one of the current minute pieces and the corresponding previous minute piece. A fifth step additionally defines each element of the set of current pixels in the respective one of the current minute pieces, by a combination of motion data representative of the first relative motion. A sixth step is for image-segmenting the current picture into a number of first regions with respect to the combination of image data, the combination of address data and the combination of motion data, while the number of first regions is smaller than the predetermined number. A seventh step determines for a respective one of the first regions a corresponding second region in the previous picture. An eighth step estimates a second relative motion between the respective one of the first regions and the corresponding second region to determine a motion vector representative of the second relative motion. A ninth step is for motion-compensating a local decoded picture of the previous picture in dependence on the motion vector to obtain a predicted picture of the current picture. A tenth step subtracts the predicted picture from the current picture to obtain a prediction error picture. An eleventh step codes the motion vector into a sequence of first codes. A twelfth step codes the prediction error picture in a compressing manner into a sequence of second codes. A thirteenth step multiplexes the sequence of first codes and the sequence of second codes to obtain a multiplexed signal. A fourteenth step demultiplexes the multiplexed signal into a combination of a sequence of third codes corresponding to the sequence of first codes and a seqeunce of fourth codes corresponding to the sequence of second codes. A fifteenth step decodes the sequence of third codes to obtain a decoded vector corresponding to the motion vector. A sixteenth step decodes the sequence of fourth codes to obtain a decoded error picture. A seventeenth step responds to the decoded vector to motion-compensate a previous decoded picture in a sequence of decoded pictures to obtain a decoded prediction picture. An eighteenth step adds the decoded error picture to the decoded prediction picture to obtain a picture subsequent to the previous decoded picture in the sequence of decoded pictures.

To achieve the fourth object, another genus of the present invention provides a picture data processing method for processing a set of data on a temporal sequence of two or three dimensional pictures with a time-dependent motion intermittently picked up therein. The set of data includes a set of current data on a current picture in the sequence of pictures and a set of previous data on a previous picture to the current picture in the sequence of pictures. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture.

The picture data processing method comprises nine or ten steps. A first step has the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data. A second step has the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. A third step divides the first picture into a predetermined number of first minute pieces each respectively consisting of one or more elements of the set of first pixels having the first location parameter vectors thereof averaged to obtain a piece location representative vector representative of a location of a correspondent one of the first minute pieces in the spatiotemporal field. A fourth step may divide the second picture into an identical number of second minute pieces to the predetermined number, which second minute pieces may each respectively consist of one or more elements of the set of second pixels having the second location parameter vectors thereof averaged to obtain a piece location representative vector representative of a location of a correspondent one of the second minute pieces in the spatiotemporal field. A fifth step determines for a respective one of the first minute pieces a corresponding second minute piece. A sixth step estimates a first relative motion as part of the time-dependent motion between the respective one of the first minute pieces and the corresponding second minute piece, by subtracting a piece location representative vector of the corresponding second minute piece from the piece location representative vector of the respective one of the first minute pieces to determine a first motion vector representive of the first relative motion in the spatiotemporal field. A seventh step adds the first motion vector to the first character vector of each element of the set of first pixels in the respective one of the first minute pieces to obtain a dimension-increased character vector. An eighth step segments the first picture into a number of first regions each respectively composed of a cluster of a variable number of elements of the set of first pixels, so that the dimension-increased character vectors of the variable number of elements are relatively vicinal to each other in terms of a distance defined in the spatiotemporal field and have the first location parameter vectors thereof averaged to obtain a region location representative vector representative of a location of a correspondent one of the first regions in the spatiotemporal field. A ninth step determines for a respective one of the first regions a corresponding second region in the second picture, which second region is composed of an identical number of elements of the set of second pixels to the variable number of elements of the set of first pixels, so that the second character vectors of the identical number of elements have the second image parameter vectors thereof each respectively relatively vicinal to a representative vector of the first image parameter vectors of the first character vectors in terms of the distance and the second location parameter vectors thereof averaged to obtain a region location representative vector representative of a location of the corresponding second region in the spatiotemporal field. A tenth step estimates a second relative motion as part of the time-dependent motion between the respective one of the first regions and the corresponding second region, by subtracting the region location representative vector of the corresponding second region from the region location representative vector of the respective one of the first regions to determine a second motion vector representive of the second relative motion in the spatiotemporal field.

Moreover, to achieve the fourth object, another genus of the present invention provides a motion picture processing system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture processing system comprises a first motion estimator, an image segmentor and a second motion estimator. The first motion estimator divides the current picture into a predetermined number of current minute pieces each respectively consisting of one or more elements of the set of current pixels, and may divide the previous picture into an identical number of previous minute pieces to the predetermined number. The previous minute pieces may each respectively consist of one or more elements of the set of previous pixels. The estimator then determines for a respective one of the current minute pieces a corresponding previous minute piece, estimates a first relative motion between the respective one of the current minute pieces and the corresponding previous minute piece, and additionally defines each element of the set of current pixels in the respective one of the current minute pieces, by a combination of motion data representative of the first relative motion. The image segmentor is for image-segmenting the current picture into a number of first regions with respect to the combination of image data, the combination of address data and the combination of motion data, while the number of first regions is smaller than the predetermined number. The second motion estimator determines for a respective one of the first regions a corresponding second region in the previous picture. and estimates a second relative motion between the respective one of the first regions and the corresponding second region to determine a motion vector representative of the second relative motion.

According to a species of this genus of the invention, the motion picture processing system further comprises a motion compensator for motion-compensating a local decoded picture of the previous picture in dependence on the motion vector to obtain a predicted picture of the current picture, a subtractor for subtracting the predicted picture from the current picture to obtain a prediction error picture, a compressing coder for coding the prediction error picture in a compressing manner into a set of coded data, a decompressing decoder for decoding the set of coded data in a decompressing manner into a local decoded error picture, and an adder for adding the local decoded error picture to the predicted picture to obtain a local decoded picture of the current picture.

According to another species of this genus of the invention, the current picture comprises an arbitrary picture in the sequence of motion pictures, and the previous picture comprises a local decoded picture of a picture previous to the arbitrary picture in the sequence of motion pictures.

To achieve the fourth object, another genus of the present invention provides a motion picture coding-decoding system for processing a sequence of motion pictures including a current picture and a previous picture thereto. The current picture consists of a set of current pixels. The previous picture consists of a set of previous pixels. The current and previous pixels are each respectively defined by a combination of image data associated therewith and a combination of address data thereof. The motion picture coding-decoding system comprises a motion estimator, an image segmentor, a motion reestimator, a first motion compensator, a subtractor, a multiplexing encoder, a demultiplexing decoder, a second motion compensator and an adder. The motion estimator divides the current picture into a predetermined number of current minute pieces each respectively consisting of one or more elements of the set of current pixels, and may divide the previous picture into an identical number of previous minute pieces to the predetermined number, which previous minute pieces may each respectively consist of one or more elements of the set of previous pixels, determines for a respective one of the current minute pieces a corresponding previous minute piece, estimates a first relative motion between the respective one of the current minute pieces and the corresponding previous minute piece, and additionally defines each element of the set of current pixels in the respective one of the current minute pieces, by a combination of motion data representative of the first relative motion. The image segmentor is for image-segmenting the current picture into a number of first regions with respect to the combination of image data, the combination of address data and the combination of motion data, while number of first regions is smaller than the predetermined number. The motion reestimator determines for a respective one of the first regions a corresponding second region in the previous picture, and estimates a second relative motion between the respective one of the first regions and the corresponding second region to determine a motion vector representative of the second relative motion. The first motion compensator is for for motion-compensating a local decoded picture of the previous picture in dependence on the motion vector to obtain a predicted picture of the current picture. The subtractor subtracts the predicted picture from the current picture to obtain a prediction error picture. The multiplexing encoder codes the motion vector into a sequence of first codes, codes the prediction error picture in a compressing manner into a sequence of second codes, and multiplexes the sequence of first codes and the sequence of second codes to obtain a multiplexed signal. The demultiplexing decoder demultiplexes the multiplexed signal into a combination of a sequence of third codes corresponding to the sequence of first codes and a seqeunce of fourth codes corresponding to the sequence of second codes, decodes the sequence of third codes to obtain a decoded vector corresponding to the motion vector, and decodes the sequence of fourth codes to obtain a decoded error picture. The second motion compensator responds to the decoded vector to motion-compensate a previous decoded picture in a sequence of decoded pictures to obtain a decoded prediction picture. The adder adds the decoded error picture to the decoded prediction picture to obtain a picture subsequent to the previous decoded picture in the sequence of decoded pictures.

To achieve the fourth object, another genus of the present invention provides a picture data processing system for processing a set of data on a temporal sequence of two or three dimensional pictures with a time-dependent motion intermittently picked up therein. The set of data includes a set of current data on a current picture in the sequence of pictures and a set of previous data on a previous picture to the current picture in the sequence of pictures. The current picture consists of a set of current pixels each respectively defined by a combination of current image data associated therewith and a combination of current address data representing an address thereof in the current picture. The previous picture consists of a set of previous pixels each respectively defined by a combination of previous image data associated therewith and a combination of previous address data representing an address thereof in the previous picture. The picture data processing system comprises a set of data processing measures, a motion estimator and an image segmentor. The data processing measures serves for having the set of current data processed so that the current picture is linearly mapped into a spatiotemporal field, as a first picture consisting of a set of first pixels each respectively represented by a first character vector equivalent to a sum of a first image parameter vector representative of the combination of current image data and a first location parameter vector representative of the combination of current address data, and for having the set of previous data processed so that the previous picture is linearly mapped into the spatiotemporal field, as a second picture consisting of a set of second pixels each respectively represented by a second character vector equivalent to a sum of a second image parameter vector representative of the combination of previous image data and a second location parameter vector representative of the combination of previous address data. The motion estimator divides the first picture into a predetermined number of first minute pieces each respectively consisting of one or more elements of the set of first pixels having the first location parameter vectors thereof averaged to obtain a piece location representative vector representative of a location of a correspondent one of the first minute pieces in the spatiotemporal field, may divide the second picture into an identical number of second minute pieces to the predetermined number, which second minute pieces may each respectively consist of one or more elements of the set of second pixels having the second location parameter vectors thereof averaged to obtain a piece location representative vector representative of a location of a correspondent one of the second minute pieces in the spatiotemporal field, determines for a respective one of the first minute pieces a corresponding second minute piece. estimates a first relative motion as part of the time-dependent motion between the respective one of the first minute pieces and the corresponding second minute piece, by subtracting a piece location representative vector of the corresponding second minute piece from the piece location representative vector of the respective one of the first minute pieces to determine a first motion vector representive of the first relative motion in the spatiotemporal field, and adds the first motion vector to the first character vector of each element of the set of first pixels in the respective one of the first minute pieces to obtain a dimension-increased character vector. The image segmentor segments the first picture into a number of first regions each respectively composed of a cluster of a variable number of elements of the set of first pixels, so that the dimension-increased character vectors of the variable number of elements are relatively vicinal to each other in terms of a distance defined in the spatiotemporal field and have the first location parameter vectors thereof averaged to obtain a region location representative vector representative of a location of a correspondent one of the first regions in the spatiotemporal field. The motion estimator is implemented for determining for a respective one of the first regions a corresponding second region in the second picture, which second region is composed of an identical number of elements of the set of second pixels to the variable number of elements of the set of first pixels, so that the second character vectors of the identical number of elements have the second image parameter vectors thereof each respectively relatively vicinal to a representative vector of the first image parameter vectors of the first character vectors in terms of the distance and the second location parameter vectors thereof averaged to obtain a region location representative vector representative of a location of the corresponding second region in the spatiotemporal field, and for estimating a second relative motion as part of the time-dependent motion between the respective one of the first regions and the corresponding second region, by subtracting the region location representative vector of the corresponding second region from the region location representative vector of the respective one of the first regions to determine a second motion vector representive of the second relative motion in the spatiotemporal field.

Still more, to achieve the fourth object, another genus of the present invention provides a motion picture processing method for processing a sequence of motion pictures including a current picture and a previous picture thereto. by using one of the previous picture and a local decoded picture thereof as a reference picture for an interframe motion compensation to obtain a predicted picture of the current picture. The motion picture processing method comprises four steps. A first step compares a set of current data representative of the current picture with a set of reference data representative of the reference picture to obtain a set of differential data therebetween. A second step is for image-segmenting the current picture with respect to a set of character parameters thereof and the set of differential data, to obtain an image-segmented picture consisting of a number of segment regions. A third step estimates a relative motion of a respective one of the segment regions to a corresponding region of the reference picture. A fourth step is for motion-compensating the corresponding region of the reference picture by the relative motion to obtain a set of motion-compensated data representative of the predicted picture.

According to a species of this genus of the invention, the motion picture processing method further comprises the steps of determining a set of difference data between the set of current data and the set of motion-compensated data, as a set of prediction error data, compressing the set of prediction error data to obtain a set of compressed data, decompressing the set of compressed data to obtain a set of restored error data, and adding the set of restored error data to the set of motion-compensated data to obtain a set of data representative of a local decoded picture of the current picture.

According to another species of this genus of the invention, the motion picture processing method further comprises the steps of determining a set of difference data between the set of current data and the set of motion-compensated data, as a set of prediction error data, compressing the set of prediction error data to obtain a set of compressed data, coding the set of compressed data, a set of data on the image segmentation of the current picture and a set of data representative of the relative motion of the respective one of the segment regions into a first sequence of codes, a second sequence of codes and a third sequence of codes, respectively, decoding the first sequence of codes, the second sequence of codes and the third sequence of codes into a first set of data, a second set of data and a third set of data, respectively, decompressing the first set of data to obtain a set of decompressed data, motion-compensating a decoded picture of the previous picture by using the second set of data and the third set of data to obtain a motion-compensated picture, and error-compensating the motion-compensated picture by said set of decompressed data to obtain a decoded picture of the current picture.

Yet more, to achieve the fourth object, another genus of the present invention provides a motion picture processing system for processing a sequence of motion pictures including a current picture and a previous picture thereto, by using one of the previous picture and a local decoded picture thereof as a reference picture for an interframe motion compensation to obtain a predicted picture of the current picture. The motion picture processing system comprises an image segmentor, a motion estimator and a motion compensator. The image segmentor compares a set of current data representative of the current picture with a set of reference data representative of the reference picture to obtain a set of differential data therebetween, and serves for image-segmenting the current picture with respect to a set of character parameters thereof and the set of differential data, to obtain an image-segmented picture consisting of a number of segment regions. The motion estimator estimates a relative motion of a respective one of the segment regions to a corresponding region of the reference picture. The motion compensator serves for motion-compensating the corresponding region of the reference picture by the relative motion to obtain a set of motion-compensated data representative of the predicted picture.

According to a species of this genus of the invention, the motion picture processing system further comprises a subtractor for determining a set of difference data between the set of current data and the set of motion-compensated data, as a set of prediction error data, a compressing coder for compressing the set of prediction error data to obtain a set of compressed data, a decompressing decoder for decompressing the set of compressed data to obtain a set of restored error data, and an adder for adding the set of restored error data to the set of motion-compensated data to obtain a set of data representative of a local decoded picture of the current picture.

According to another species of this genus of the invention, the motion picture processing method further comprises a subtractor for determining a set of difference data between the set of current data and the set of motion-compensated data, as a set of prediction error data, a compressing coder for compressing the set of prediction error data to obtain a set of compressed data, an encoder for coding the set of compressed data, a set of data on the image segmentation of the current picture and a set of data representative of the relative motion of the respective one of the segment regions into a first sequence of codes, a second sequence of codes and a third sequence of codes, respectively, a decoder for decoding the first sequence of codes, the second sequence of codes and the third sequence of codes into a first set of data, a second set of data and a third set of data, respectively, a decompressing decoder for decompressing the first set of data to obtain a set of decompressed data. another motion compensator for motion-compensating a decoded picture of the previous picture by using the second set of data and the third set of data to obtain a motion-compensated picture, and an error compensator for error-compensating the motion-compensated picture by said set of decompressed data to obtain a decoded picture of the current picture.

Therefore, according to any genus of the invention for the fourth object, a motion vector is determined by reestimating a relative motion of a cluster of pixels in a current picture, which pixels have their character parameter sets each including a motion-representative parameter, to a corresponding region of a previous picture and hence has an additionally increased tendency to faithfully or naturally represent a picked-up motion.

For example, in any segmented region, all pixels should represent a substantially uniform motion, so that a reestimated motion of such a region may provide a motion vector remarkably faithful to an original image, thus permitting an associated prediction error to be decreased.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to the accompanying drawings. Like or corresponding items are designated by like or corresponding characters for brevity.

Figure 7:
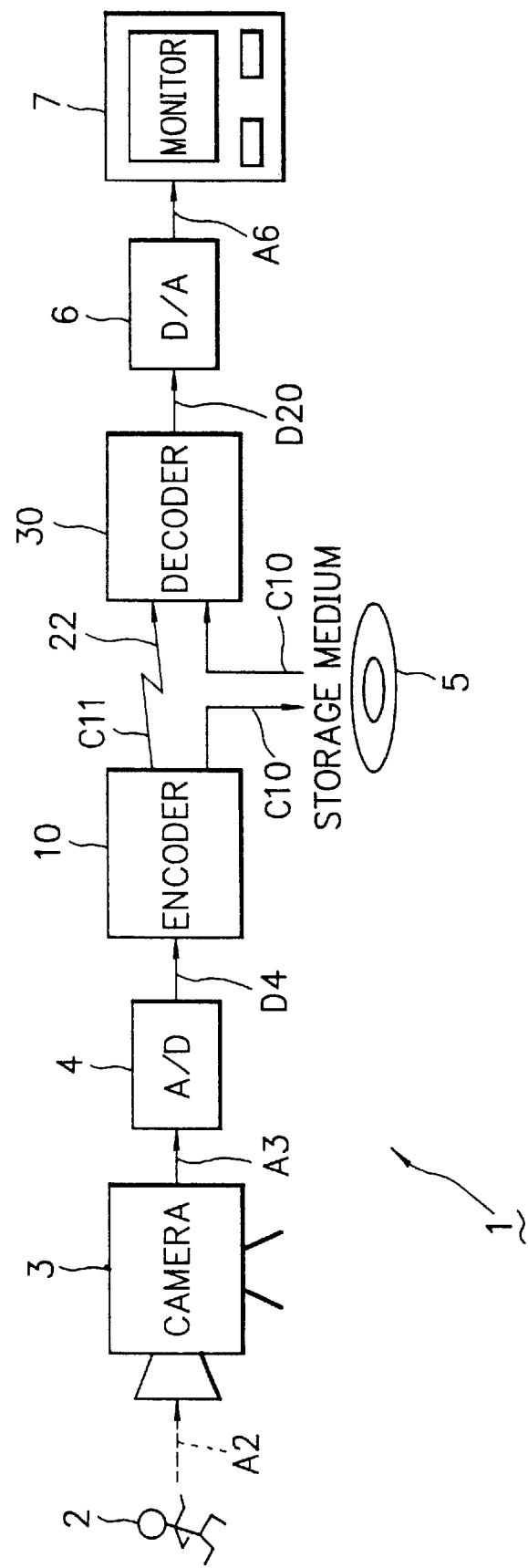
FIG. 7 is a block diagram of a motion picture processing system having four operation modes according to an embodiment of the present invention.

FIG. 7 shows an entirety of a motion picture processing system according to an embodiment of the invention.

In FIG. 7, designated at character 1 is the motion picture processing system. The system 1 serves for processing a temporal sequence of two or three dimensional motion pictures with a time-dependent motion of an object 2 intermittently picked up therein. Any picture in the picture sequence appears in a variety of forms as it is processed, for example, as a set of optical signals A2, a sequence of analog signals A3 or A6, a sequence or set of digital data D4 or D20, or a sequence or set of codes C10 or C11.

The system 1 includes a camera 3 for converting the optical signals A2 to the digital signals A3, an analog to digital converter 4 for converting the analog signals A3 to the digital data D4, and an encoder 10 for converting the digital data D4 to the codes C10 or C11. Some codes C10 are storaged in a storage medium 5, to be read therefrom later. Some codes C11 are transmitted via a transmission line 22. The system 1 further includes a decoder 30 for converting the codes C10 or C11 to the digital data D20, a digital to analog converter 6 for converting the digital data D20 to the analog signals A6 and a monitor 7 for displaying the sequence of pictures.

Figure 8:
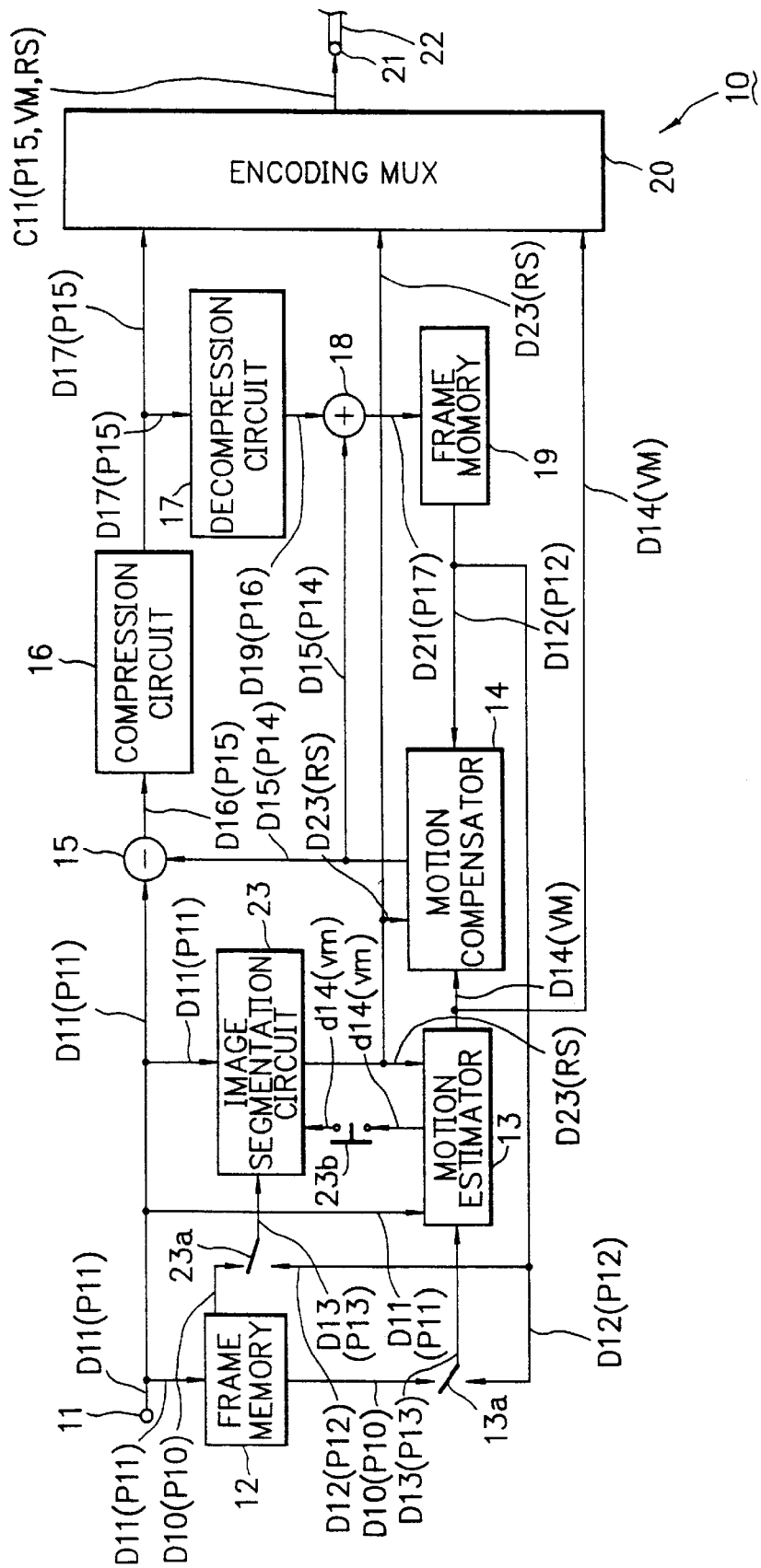
FIG. 8 is a block diagram of an encoder of the system of FIG. 7.
Figure 9:
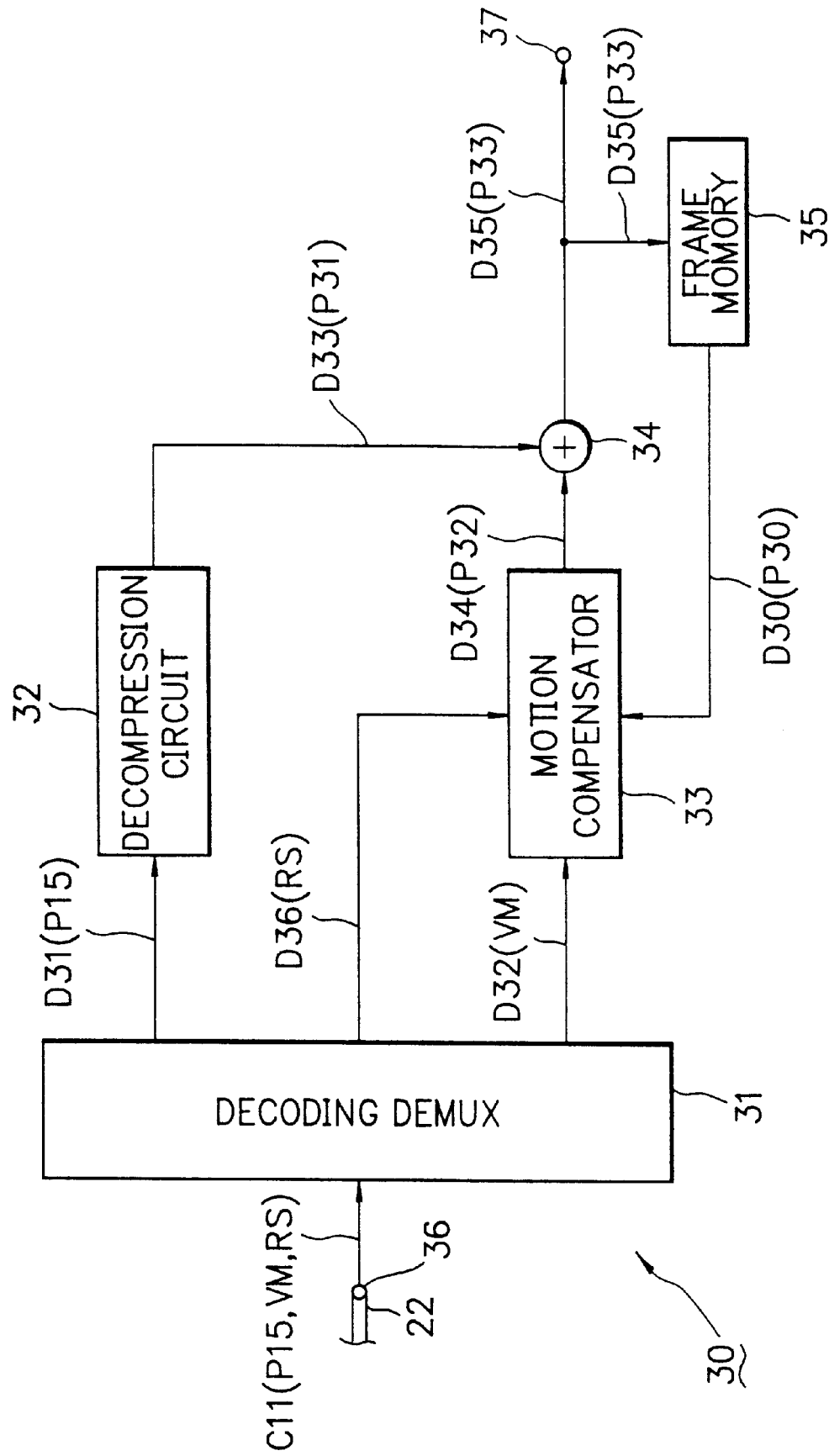
FIG. 9 is a block diagram of a decoder of the system of FIG. 7.

FIG. 8 is a block diagram of the encoder 10, and FIG. 9 is a block diagram of the decoder 30.

As shown in FIG. 8, the encoder 10 comprises an input terminal 11, a frame memory 12, a motion estimator 13, a motion compensator 14, a subtractor 15, a compression circuit 16, a decompression circuit 17, an adder 18, an encoding multiplexer 20, an output terminal 21, and an image segmentation circuit 23 which will be detailed later.

As shown in FIG. 9, the decoder 30 comprises an input terminal 36, a decoding demultiplexer 31, a decompression circuit 32, a motion compensator 33, an adder 34, a frame memory 35 and an output terminal 37.

The encoder 10 as well as the decoder 30 has various unshown data processing programs thereof stored therein or in an unshown controller of the system 1, so that any picture in the picture sequence is mapped in an imaginary spatial field and/or an imaginary spatiotemporal field, when a set of associated data is processed.

Figure 17:
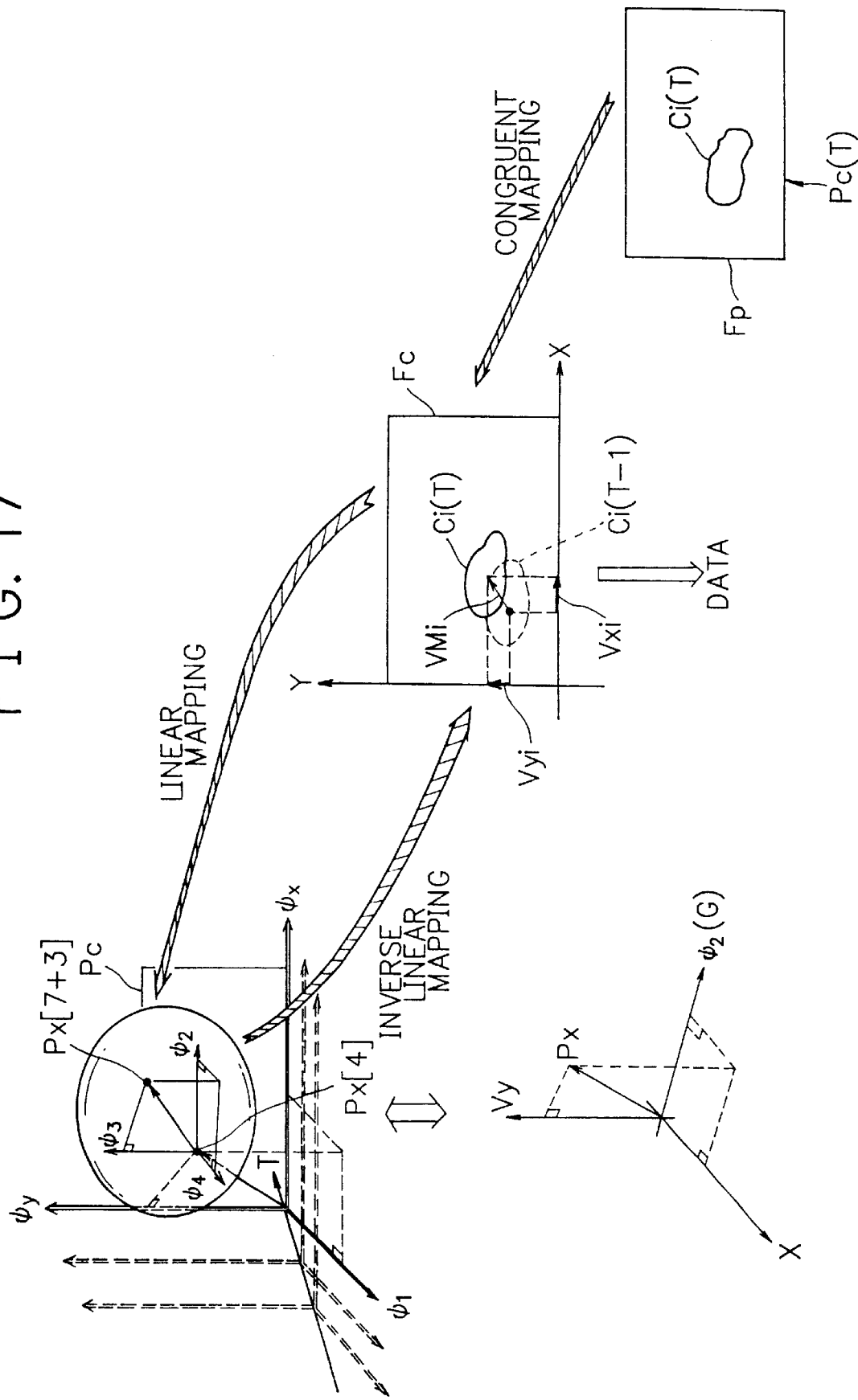
FIG. 17 is an illustration describing a basic concept of a mapping according to the present invention.

Incidentally, FIG. 17 illustrates a basic concept of the mapping.

As shown in FIG. 17, any and all picture Pc at a time t is congruently mapped in a two (or three) dimensional spatial field defined by an X-Y (or X-Y-Z) coordinate system, when a set of associated data is processed by the programs. Any and all picture Pc as a set of pixel character data Px is linearly mapped therefrom to a multi-dimensional spatiotemporal field defined by a $\phi$–T coordinate system, i.e. a $\phi_x$-$\phi_y$-$\phi_a$-T system (or a $\phi_x$-$\phi_y$-$\phi_z$-$\phi_a$-T system), when any and all associated character data is processed by the programs. The spatiotemporal field and its relationship with pixel character parameters will be detailed later. A set of processed results in the spatiotemporal field is inverse linear mapped into the spatial field, wherefrom a set of associated data is inverse mapped or output to a real space in concern.

As shown in FIG. 8, the input terminal 11 of the encoder 10 inputs a sequence of pixel data D11 of a current picture P11. The frame memory 12 stores therein the data D11 of the current input picture P11, besides a set of data D10 of a past input picture P10 it received from the input terminal 11 and stored therein in a last frame. The frame memory 19 has stored therein a set of data D12 of a local decoded picture P12 that is a matrix of restored pixel data of the past input picture P10.

The data D10 of the past input picture P10 is sequentially read from the frame memory 12, and the data D12 of the local decoded picture P12 from the frame memory 19. The data is either selected by a switch 13a as well as by a switch 23a, as a sequence of data D13 representing a reference picture P13 (to be P10 or P12), and input to the motion estimator 13 which concurrently receives the data D11 of the current input picture P11, as well as to the image segmentation circuit 23 which also concurrently receives the data D11 of the current input picture P11.

The image segmentation circuit 23 executes an image segmentation of the current picture P11, and outputs a set of data D23 on a result RS thereof.

The motion estimator 13 estimates, componentwise of a character parameter, a relative motion between the current picture P11 and the reference picture P13 to determine a motion vector VM representative of the relative motion, and outputs a set of data D14 thereon.

For a feedback connection from the motion estimator 13 to the image segmentation circuit 23, a feedback control switch 23b is installed therebetween.

Incidentally, the system 1 has four different modes of operation that are selective thereamong in accordance with a requisite display quality.

In a first mode for an improved intermediate quality, the current picture P11 is segmented into a number of regions as clusters of pixels, and a relative motion is estimated between a respective one of the segmented regions in the current picture P11 and a corresponding region of the reference picture P13 to thereby determine a motion vector.

In a second mode for an increased intermediate quality, a relative motion is estimated between a respective one of minute-divided pieces of the current picture P11 and a corresponding minute piece in the reference picture P13 to thereby determine a parameter representative of the relative motion. Any piece of a picture may comprise one or more pixels. The picture P11 is segmented into a number of regions consisting of pixels clustered with respect to a set of character parameters including the motion-representative parameter.

In a third mode for an improved high quality, the current picture P11 is segmented into a number of regions as clusters of pixels, a relative motion is estimated between a respective one of sub-regions of a respective one of the segmented regions in the current picture P11 and a corresponding small region in the reference picture P13 to thereby determine a representative parameter of the relative motion. Any sub-region may comprise one or more pixels. The current picture P11 is resegmented into a number of regions consisting of pixels reclustered with respect to a set of character parameters including the motion-representative parameter.

In a most complicated fourth mode for an increased high quality, a relative motion is estimated between a respective one of minute-divided pieces of the current picture P11 and a corresponding minute piece of the reference picture P13 to thereby determine a parameter representative of the relative motion. Any piece may comprise one or more pixels. The current picture P11 is segmented into a number of regions consisting of pixels clustered with respect to a set of character parameters including the motion-representative parameter. A relative motion is reestimated between a respective one of the segmented regions of the current picture P11 and a corresponding region of the reference picture P13 to thereby determine a motion vector.

The image segmentation circuit 23, the motion estimator 13 and the feedback control switch 23b as well as other associated circuits in the encoder 10 and the decoder 30 are controlled in accordance with a selected one of the four modes.

The fourth mode will be described. For an intuitive comprehension, the reference picture P13 will be substituted by a previous picture to the current picture P11 in the motion picture sequence, as it is a single-frame delayed picture to the current picture P11. The reference picture P13 is also, as a matter of course, one of the past input pictures. Each minute piece will be constituted by a single pixel.

In the fourth mode, the motion estimator 13 first serves to determine a motion vector representative of a relative motion of a respective one of pixels Px in the current picture P11 to a corresponding pixel in the previous picture P13. The correspondence is determined by comparing an expanded small region of each pixel Px with a respective one of minute-divided regions of the same figure in the previous picture to minimize are ative distance between representative vectors thereof in the spatiotemporal field. Each representative vector may represent a combination of averaged parameter values of colors and/or locations.

Then, the image segmentation circuit 23 clusters the pixels Px into a predetermined number of clusters, by using a combination of image data, a location in the picture P11 and the relative motion of the respective pixel Px as a set of character parameters of that pixel Px. The image segmentation circuit 23 may have an exclusive motion estimator therefor. Respective pixels Px clustered in a cluster have their sets $\phi'$ of character parameters $\phi_b$ elementwise relatively vicinal to each other, including location parameters $\phi_x$, $\phi_y$ (and $\phi_z$), and are neighboring each other, thus constituting a connected region. Each pixel Px is labelled with an identification number of the connected region in the current picture P11. The labelled number is information associated with the pixel Px, as a result RS of image segmentation, which is output to to the motion estimator 13, the motion compensator 14 and the encoding multiplexer 20. The multiplexer 20 encodes the data D14 of motion vectors VM into a sequence of corresponding codes.

The motion estimator 13 receives the data D11 of the current picture P11, the data D13 of the previous picture P13 and the data D23 on the result RS of the image segmentation based thereon, i.e. on the data D11 and D13, and estimates a relative motion of a respective one of image-segmented regions of the current picture P11 to a corresponding region in the previous picture P13 to determine a motion vector VM representative of the relative motion. Any motion is defined in the spatiotemporal field, as a distance between vector-represented points and may be increased with time if either point be fixed, while a signal synchronization or a frame selection permits a normal use of a fixed temporal component.

To determine the motion vector VM as a displacement vector of a region, there may be employed a similar concept to the conventional block matching. The result RS of image segmentation may thus be employed to have an image-segmented region as a criterion in place of an equi-divided block for a matching detection. A matching may be detected by determining a target region at a corresponding location in the previous picture P13, before shifting the target region within a detection area of the previous picture P13 to detect a location at which a character value difference of image data to the current picture P11 is minimized. In that case, a set of X-Y (or X-Y-z) componentwise expressed motion vectors VM will be output from the estimator 13.

In another method of motion estimation, the relative motion may be expressed by an affinity, which may permit a combination of affine transform parameters. For example, a certain pixel Px(T−1) may have a location (x, y) in the previous picture P13, and another pixel Px(T) may have a different location (x',y') in the current picture P11. The locations (x, y) and (x',y') may be each expressed by a 2-line, 1-column vector, respectively, to provide an equation therebetween in which the vector of location (x, y) is affine transformed by a combination of a factor consisting of a 2-line, 2-column vector of four transform parameters and a term consisting of a 2-line, 1-column vector of two transform parameters. As the location (x, y) is shifted within a detection area, the six parameters may be varied so that a prediction error is minimized or decreased from a preset value to a requisite value, with a combination of parameter values to determine a location in concern. In such a case, a combination of affine transform parameters may be output from the estimator 13.

The data D14 of motion vectors VM are sequentially output from the motion estimator 13 to the motion compensator 14 and the encoding multiplexer 20.

The multiplexer 20 encodes the data D14 of motion vectors VM into a sequence of corresponding codes.

At the motion compensator 14, the data D14 of motion vectors VM are processed together with the result RS of image segmentation and the data D12 of the local decoded picture P12 input from the frame memory 19, to make a motion compensation of each segmented region.

In the case of a componentwise represented motion vector of a segmented region, a combination of data of a corresponding pixel in position in the local decoded picture P12 is taken as data of a pixel at a motion compensated location.

In the case of a combination of affine transform parameters, a combination of pixel data at an affine-expressed location in the local decoded picture P12 is taken as data of a pixel at a correspondent location in the current picture P11.

As a result, each pixel data in each region is updated by a data that corresponding pixel in a corresponding region in the local decoded picture P12 had been carrying.

The motion compensator 14 sequentially outputs a set of data D15 of the motion-compensated picture P14 to a subtractor 15 and an adder 108.

The subtractor 15 performs a pixel-mode subtraction of the motion-compensated picture P14 from the current input picture P11, obtaining a set of data D16 representative of a differential picture P15 therebetween. Accordingly the data D11 of the current input picture P11 is converted into a compressed set of data as the data D16 representing prediction errors.

The prediction error data D17 of the differential picture P15 is sequentially input from the subtractor 15 to the compression circuit 16 as a unit 16 adapted for a discrete cosine transformation and quantization process for a data compression. As a result, the error data D16 is further compressed into a set of combinations of data D17 each representative of a quantized coefficient, so that the set of data D17 represents the differential picture P15. In place of DCT-Q, there may be employed a Wavelet transform or an Hadamard transform and a vector quantization, fractal coding or intra-frame prediction coding, alone or in combination.

The compressed data D17 of the differential picture P15 is sequentially output from the compression circuit 16 to the encoding multiplexer 20 and the decompression circuit 17 as a unit is adapted for an inverse quantization and inverse discrete cosine transformation process, for a data decompression.

The multiplexer 20 encodes the compressed data D17 of the differential picture P15 into a sequence of corresponding codes, and multiplexes them together with the codes of the result RS of image segmentation and the codes of the the motion vectors VM, into a sequence of multiplexed codes C11 to be output via the output terminal 21 of the encoder 10.

At the IQ-IDCT unit 17, each input combination of data D17 is inverse quantized into a combination of corresponding cosine coefficients of a cosine series in a related frequency field, which coefficients are then inverse mapped from the frequency field through an inverse discrete cosine transform function into the real measure space, as a set of data D19.

The data D19 of a local decoded or restored differential picture P16 is sequentially output to the adder 18, where it is subjected to a pixel-mode addition with the data D15 of the motion-compensated picture P14 input from the motion compensator 14, to thereby obtain a set of data D21 representative of a local decoded or restored picture P17 equivalent to the current input picture P11.

The data D21 of the restored current picture P17 is sequentially input from the adder 18 to the frame memory 19, where it is are stored at corresponding addressed locations, as a set of data representing a local decoded current picture to be employed, in a subsequent frame, as a subsequent local decoded picture of a subsequent previous picture.

The sequence of output codes C11 is transmitted through the transmission line 22 to the decoder 30.

In the decoder the demultiplexer 31 demultiplexes the codes C11 into a first code sequence representative of the prediction error picture P15, a second code sequence representative of the result RS of image segmentation and a third code sequence representative of motion vectors VM. The demultiplexer also decodes the first code sequence into a sequence of data D31 equivalent to the compressed data D17, the second code sequence into a sequence of data D36 equivalent to the data D23, and the third code sequence into a sequence of data D32 equivalent to the data D14.

The data D31 is input to the decompression circuit 32 as an IQ-IDCT unit, which functions in a similar manner to the IQ-IDCT unit 17, thus sequentially outputting a set of data D33 representative of a differential picture P31 equivalent to the restored differential picture P16.

The data D36 and D32 are input to the motion compensator 33, which concurrently receives a set of data D30 of a decoded picture P30 of the previous picture P13 from the frame memory 35 and compensates this data D30 by those sets of data D36 and D32 in a similar manner to the motion compensator 14. thus sequentially outputting a set of data D34 representative of a motion-compensated picture P32 as a predicted current picture equivalent to the motion-compensated picture P14.

The data D32 of the decoded differential picture P31 and the data D34 of the motion-compensated picture P32 are input to an adder 34, where they are added to each other in a similar manner as with the adder 18, to thereby obtain a set of data D35 representative of a current decoded picture P33 equivalent to the local decoded picture P17. This data is output as a datastream via the output terminal 37 of the decoder 100b. This datastream is branched to be input to the frame memory 35, where it is stored as a set of data representative of the current decoded picture P33 to be employed as a subsequent previous decoded picture in the subsequent frame.

Figure 10:
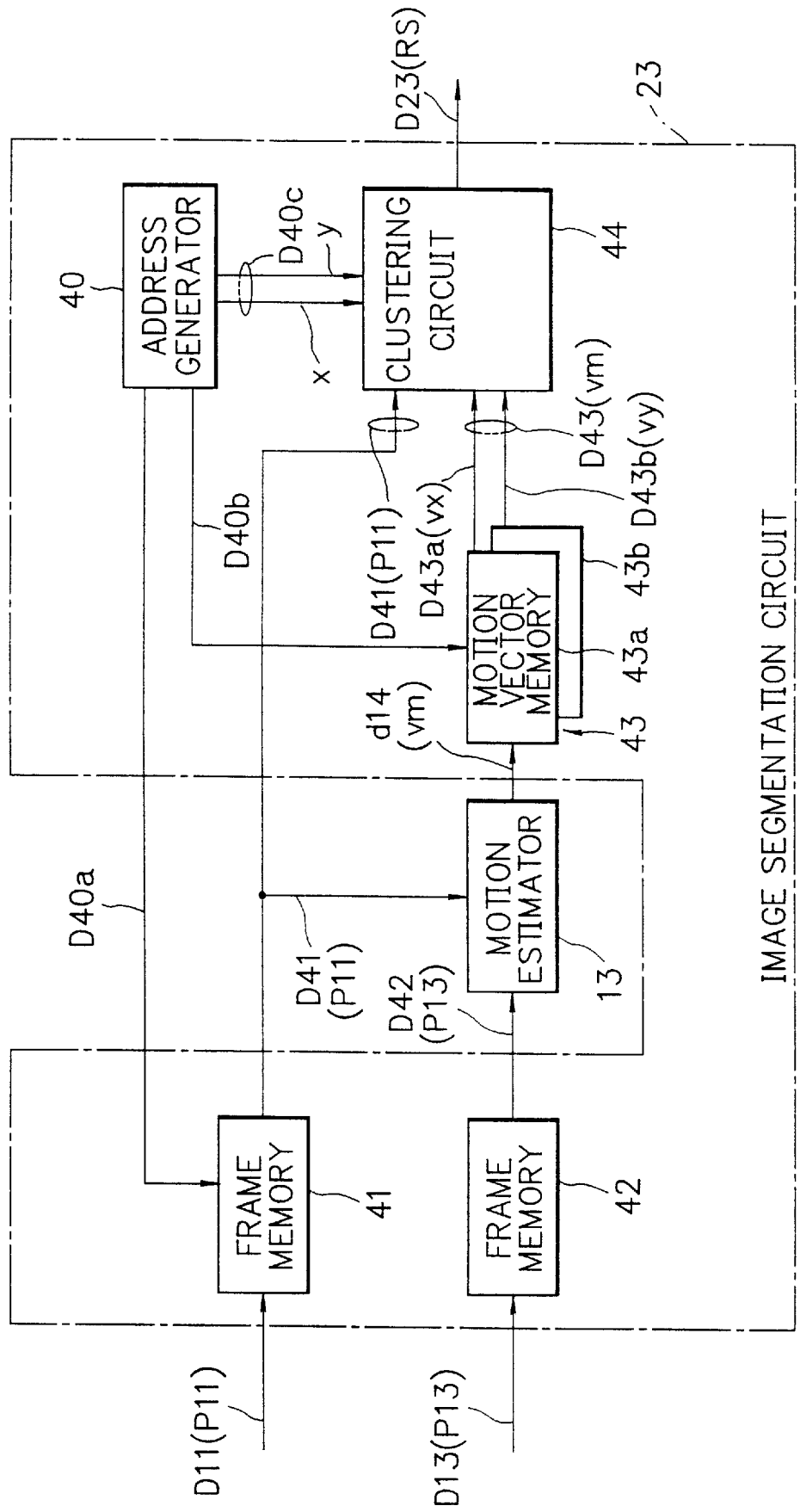
FIG. 10 is a block diagram of an image segmentation circuit of the encoder of FIG. 8.

FIG. 10 shows a block diagram of the image segmentation circuit 23.

The image segmentation circuit 23 comprises an address generator 40, a frame memory 41, another frame memory 42, a motion vector memory 43 and a clustering circuit 44.

The data D11 of the current picture P11 is stored in the frame memory 41, and the data D13 of the previous picture P13 are stored in the frame memory 42.

The data D11 and D13 are sequentially read to be input to the motion estmator 13, where they are employed to determine a motion vector (Vx, Vy) of each pixel Px between frames, i.e. between the current picture P11 and the previous picture P13.

The motion estimation may be by a block matching method. Letting (x, y) be a location of pixel in the curernt frame picture P11 and ±dx and ±dy be horizontal and vertical extensions therefrom to have an expanded square region thereabout, respectively. A difference diff(vx, vy) between the current picture and the previous picture is calculated for a predetermined detection range on the previous picture to determine a motion vector that minimizes the differential. The square region is moved about a corresponding location within the predetermined range, such that:

$$\text{diff}(Vx, Vy) = \sum_{i=-dx}^{dx} \sum_{j=-dy}^{dy} (S_{ref}(x + i + vx, y + j + vy) - S_{cur}(x + i, y + i))^2 \quad (22)$$

where, $S_{ref}(x, y)$ is a pixel image data of the current picture and $S_{cur}(x, y)$ is a pixel mage data of the previous picture.

The difference diff(vx, vy) may be such that:

$$\text{diff}(vx, vy) = \sum_{i=-dx}^{dx} \sum_{j=-dy}^{dy} |S_{ref}(x + i + vx, y + j + vy) - S_{cur}(x + i, y + i)|. \quad (23)$$

The difference is calculated over the predetermined range to determine a location where it is minimized, which location has a directional relative distance to the pixel Px in concern in the current picture P11, which distance is componentwise output to be detected as the motion vector (Vx, Vy).

The motion vector is stored in the motion vector memory 43, or more specifically, componentwise in a memory 43a for a horizontal component Vx and in a memory 43b for a vertical component Vy.

The address generator 40 generates a set of address data D40a and D40b for reading corresponding pixel data D41 from the memory 101 and component data D43a and D43b of a corresponding motion vector VM. The address generator 40 further generates a combination of data D40c on a location (x, y) of a corresponding pixel in the current picture P11.

The clustering circuit 44 serves for a clustering to execute the image segmentation by using the pixel data D41 of the current picture P11 from the memory 41, the component data D43a and D43b from the memory 43 and the location data D40c from the address generator 40.

A number of initial clusters are set by equi-dividing the picture P11 into a number of square blocks, which are represented by a set $\{C_i(i=1, 2, \ldots, n)\}$ of cluster vectors each respectively representing a combination of image data, a combination of location data and the motion vector of a pixel at a geometrically central position of the cluster, $C_i$ is a five-dimensional vector such that $C_i=(Sc_i, xc_i, yc_i, Vxc_i, Vyc_i)$.

Then, a respective one P of the pixels Px in the current picture P11 has a relative distance thereof calculated to a respective one of the clusters, and is clustered to a most vicinal cluster. Letting $(x_p, y_p)$, $S_p$ and $(Vx_p, Vy_p)$ be a location, image data and motion vector of the pixel P, the respective pixel P has a parameter vector $X_p$ representative of a set of character parameters such that $X_p=(S_P, x_p, y_p, Vx_p, Vy_p)$.

The relative distance of the pixel P to a cluster represented by a vector $C_i$ is defined such that:

$$d(X_P, C_i) \text{ in terms of a euclidean distance} = [c_1(S_p - Sc_i)^2 + \quad (24)$$
$$c_4(x_p - xc_i)^2 +$$
$$c_5(y_p - yc_i)^2 +$$
$$c_6(Vx_p - Vxc_i)^2 +$$
$$c_7(Vy_p - Vyc_i)^2]^{1/2}, \text{ or}$$

$$d(X_P, C_i) \text{ in terms of an } L1 \text{ norm distance} = [c_1|S_p - Sc_i|^2 + \quad (25)$$
$$c_4|x_p - xc_i|^2 +$$
$$c_5|y_p - yc_i|^2 +$$
$$c_6|Vx_p - Vxc_i|^2 +$$
$$c_7|Vy_p - Vyc_i|^2]^{1/2},$$

where $c_1$ to $c_6$ are each respectively a weighting factor for a corresponding one of the character parameters.

Then, respective pixels clustered to a respective one of the clusters have image data and location data thereof componentwise averaged to provide the cluster with an updated representative vector $C_i = (Sc_i, xc_i, yc_i, Vxc_i, Vyc_i)$ such that:

$$Sc_i = \left(\sum_m S_m\right) / N_i, \quad (26)$$

$$xc_i = \left(\sum_m x_m\right) / N_i, \quad (27)$$

$$yc_i = \left(\sum_m y_m\right) / N_i, \quad (28)$$

$$Vxc_i = \left(\sum_m Vx_m\right) / N_i, \text{ and} \quad (29)$$

$$Vyc_i = \left(\sum_m Vy_m\right) / N_i, \quad (30)$$

where $N_i$ is a number of the respective pixels, and $S_m$, $x_m$, $y_m$, $Vx_m$ and $Vy_m$ are data values of a respective one of the pixels.

Like clustering is repeated until the representative vector is kept unchanged by the repeating operation. Finally, all the pixels grouped in a cluster are connected thereamong, thus constituting a connected region in which pixels are relatively vicinal to each other in location and in value of image data.

Figure 1:
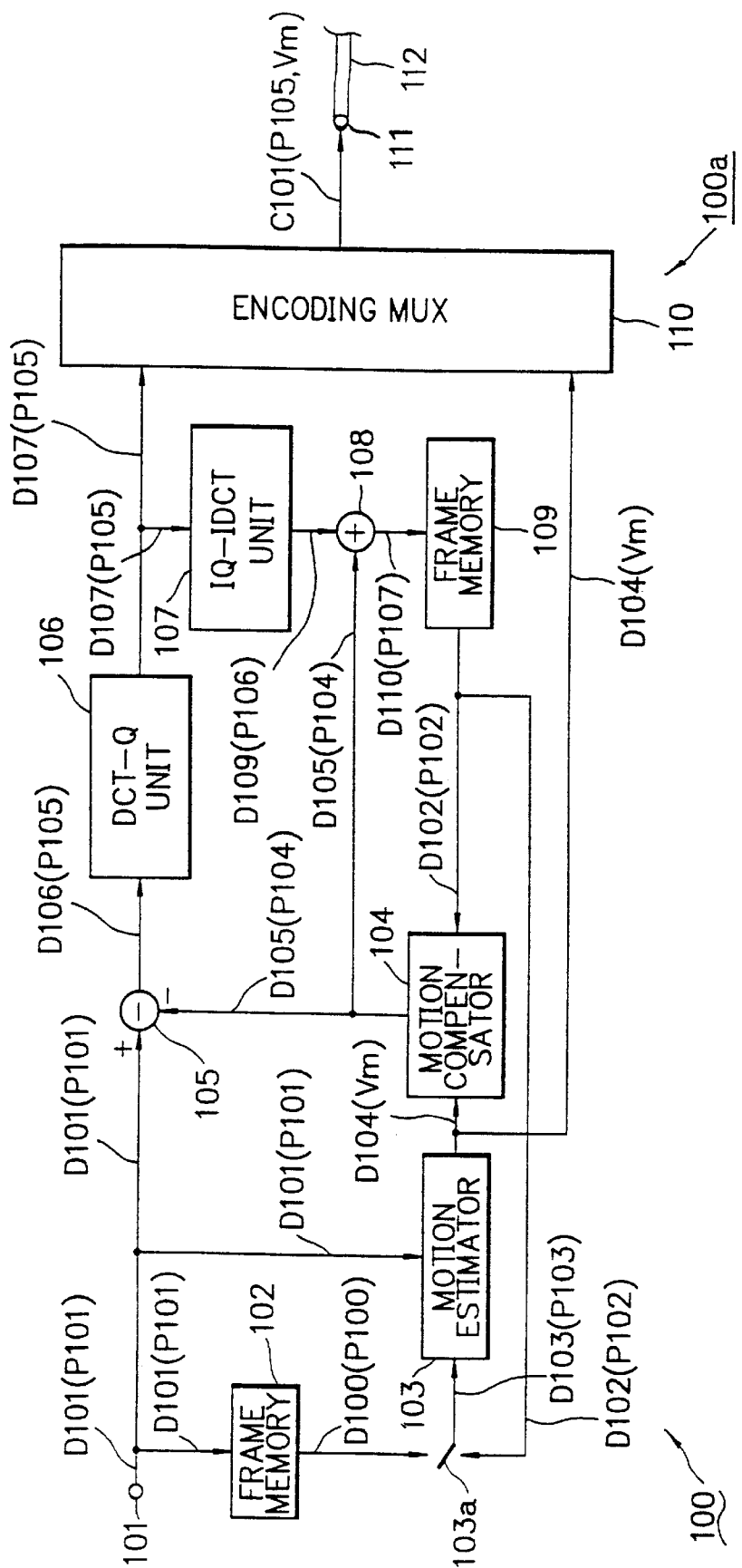
FIG. 1 is a block diagram of an encoder of a conventional motion picture coding-decoding system using a motion compensation interframe prediction.
Figure 2:
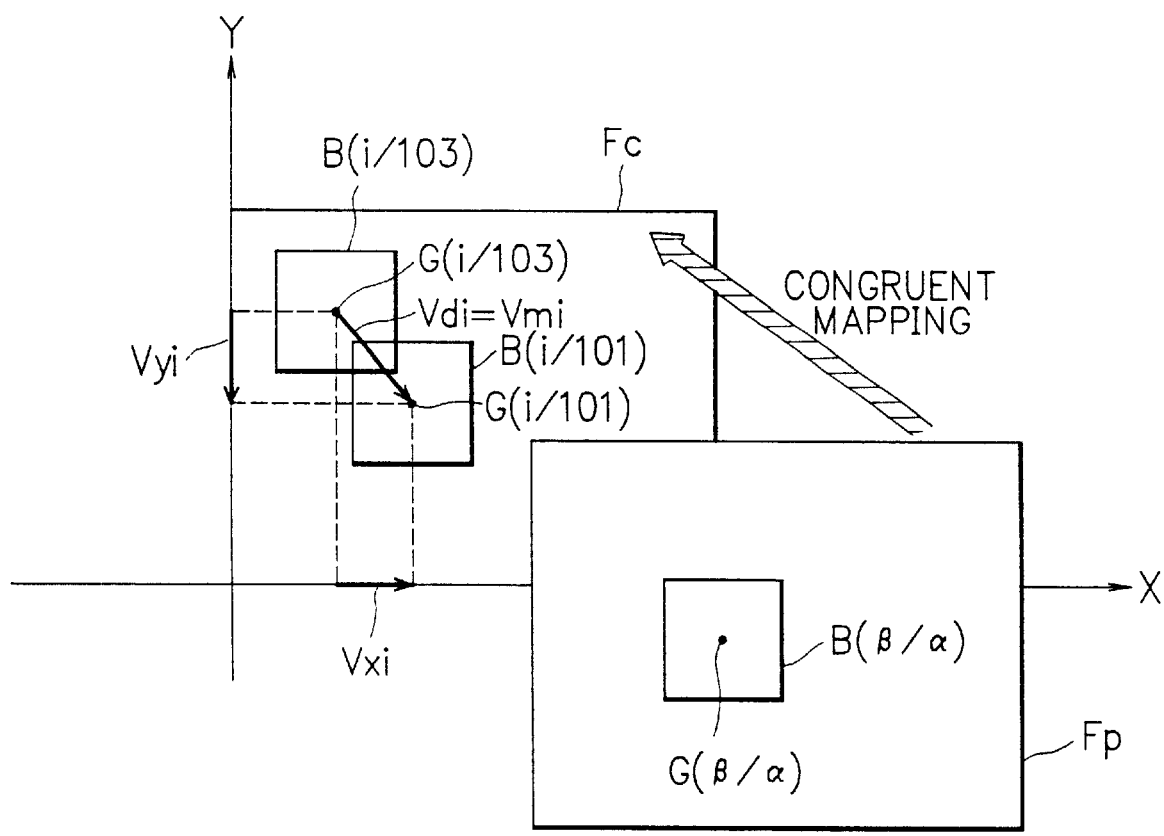
FIG. 2 is an illustration describing an estimation of a motion in an imaginary field defined in the conventional system of FIG. 1.
Figure 3:
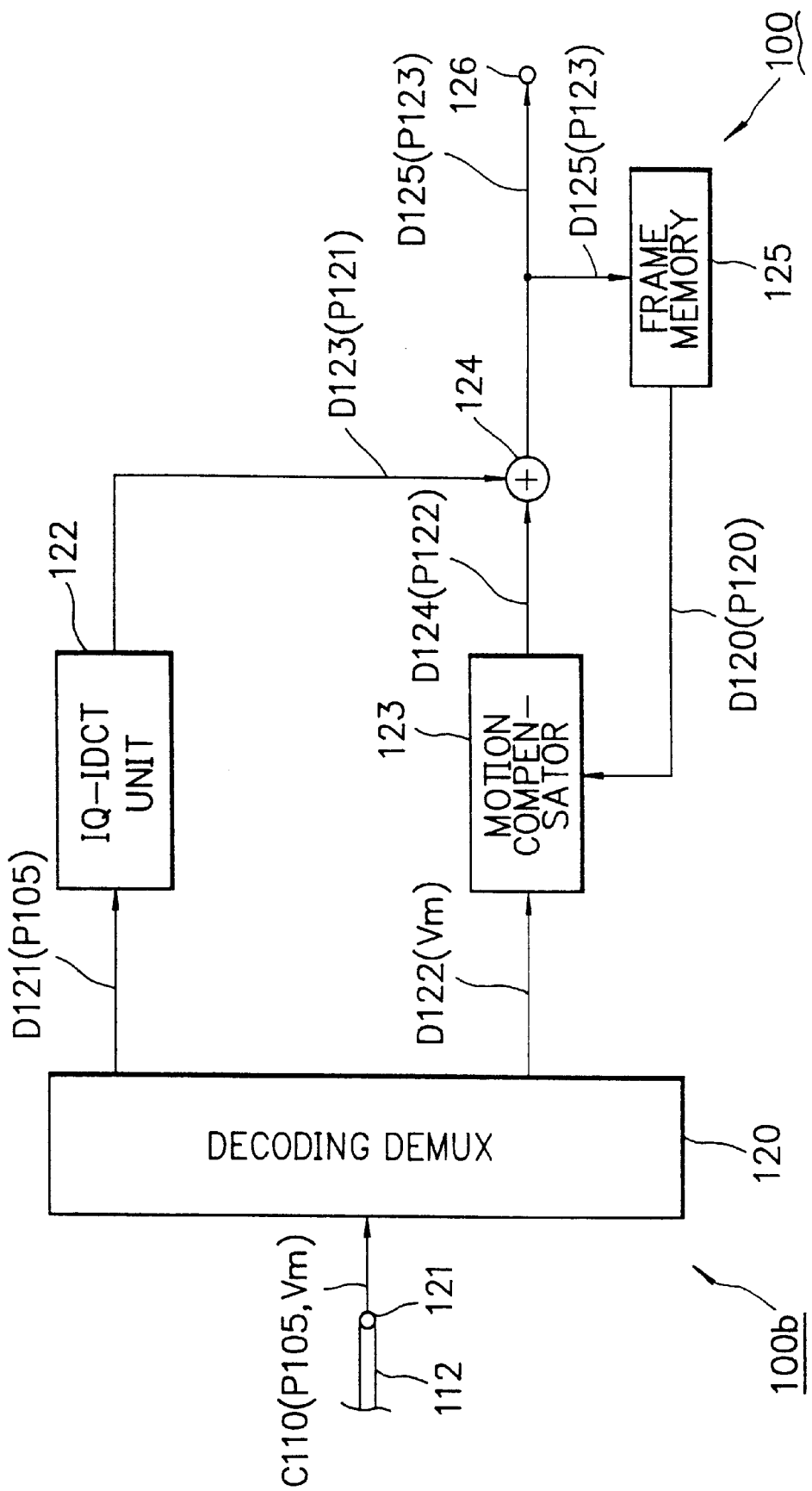
FIG. 3 is a block diagram of a decoder of the conventional system of FIG. 1.
Figure 4:
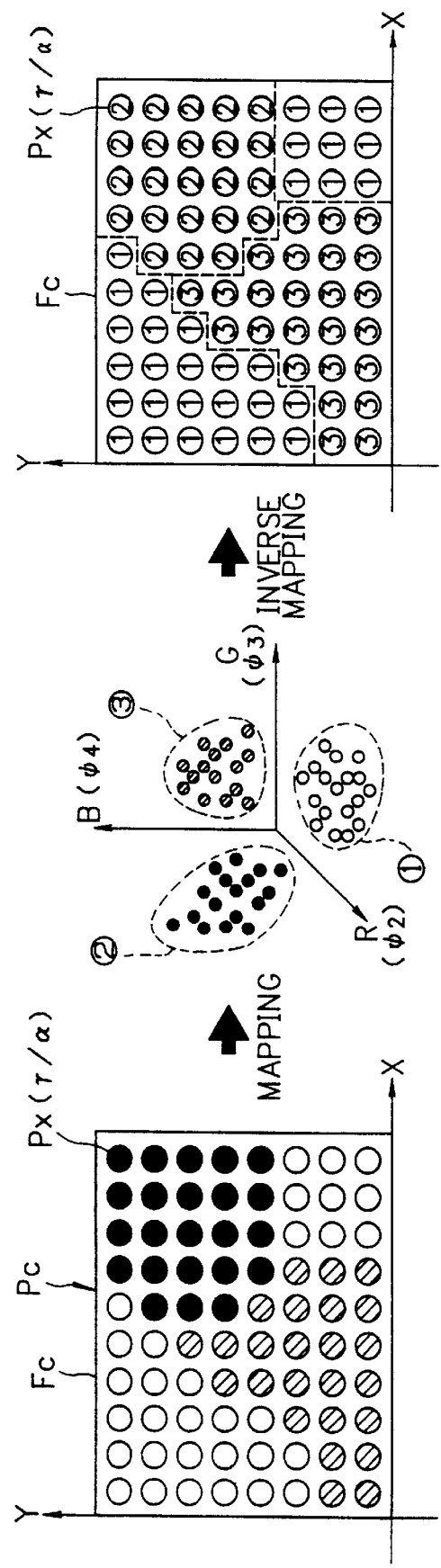
FIG. 4 is an illustration describing a basic concept of a conventional clustering in a dimension-reduced parameter space.
Figure 5:
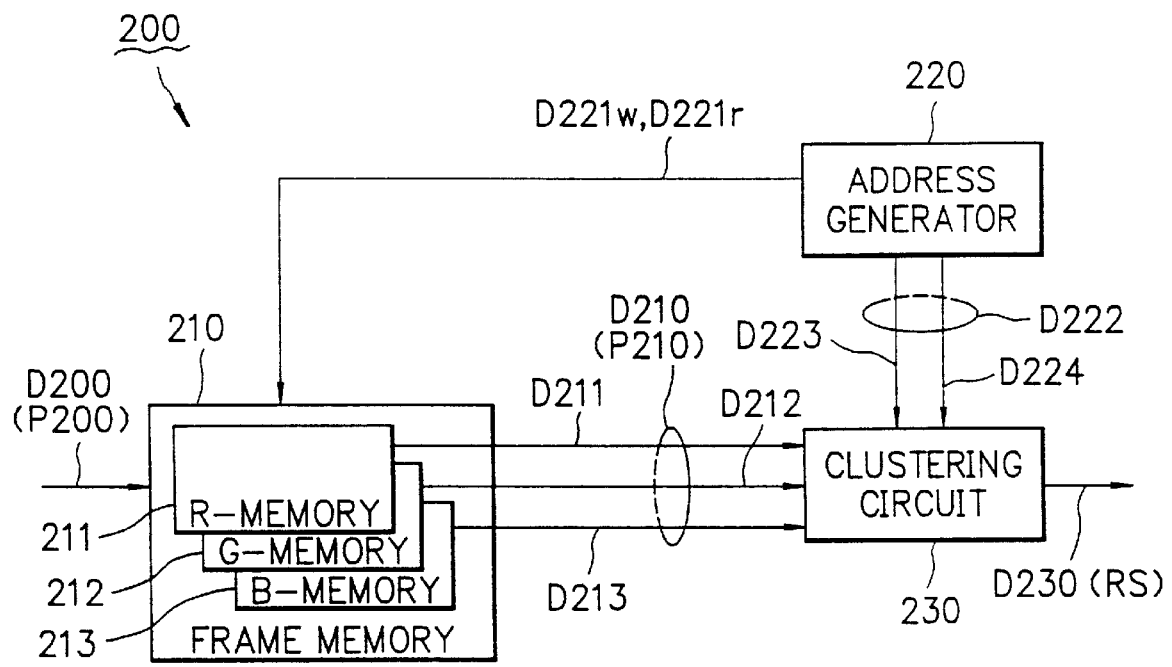
FIG. 5 is a block diagram of an exemplary motion picture processing system for describing a conventional image segmentation using a five-dimensional clustering.
Figure 6:
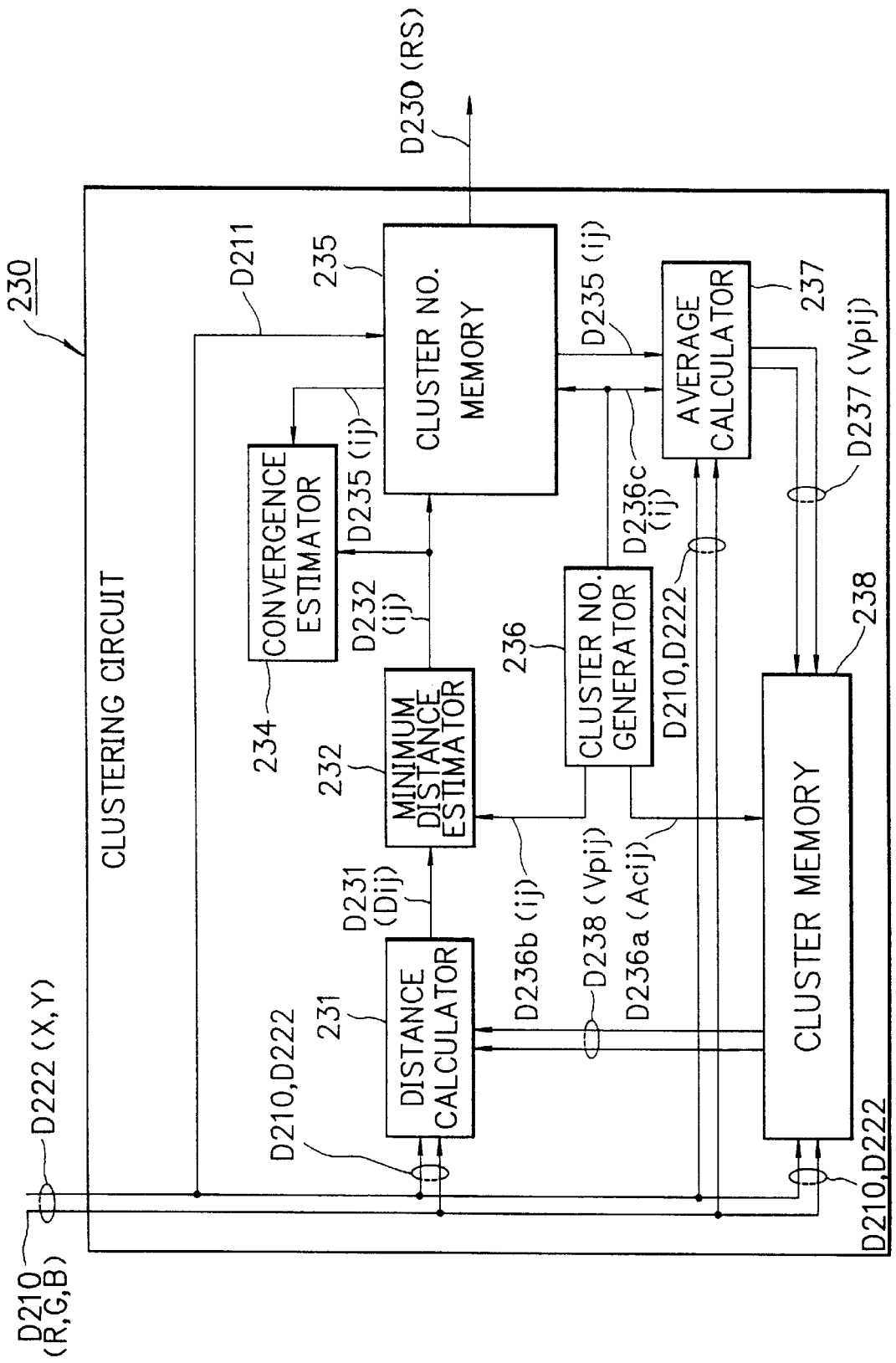
FIG. 6 is a detailed block diagram of a clustering circuit in the block diagram of FIG. 5.

Such clustering may be achieved in a similar manner to the circuit of FIG. 6, subject to the use of a motion vector as a character parameter of pixel. In application to FIG. 6, the distance calculator 231 may employ the expression (24) or (25), and average calculator 237 may employ the expressions (26) to (30).

The weighting factors $c_i$ in the expressions (5) and (6) have their values controlled in dependence on which character parameter is more essential to the clustering. For example, $c_1$ is increased if the image data is relatively important, $c_4$ and $c_5$ if the location data are more important, and $c_6$ and $c_7$ if the motion data is. A dynamic range of signal value may be regulated by a setting. Such values may be all preset. In the mapping to a spatiotemporal field, each weighting factor $c_i$ appears as a square root of a scale factor of coordinate axis.

The relative motion of pixel may be estimated by a gradient method or an optical flow method.

Figure 11:
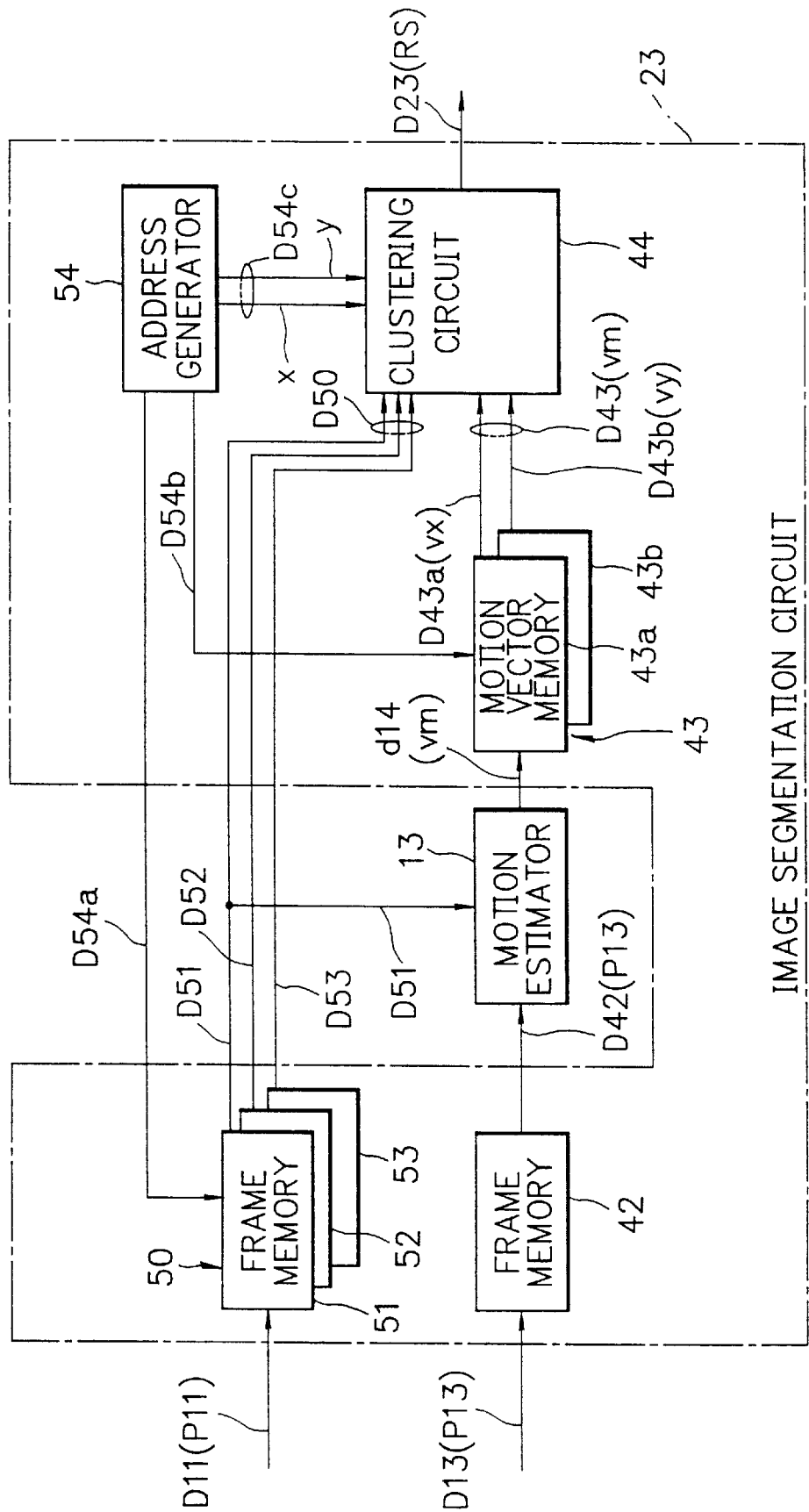
FIG. 11 is a block diagram of an image segmentation circuit according to another embodiment of the present invention.

FIG. 11 shows an image segmentation circuit according to another embodiment of the invention, as a modification of the circuit of FIG. 10. in FIG. 11, each set of image data comprises a combination of color data, i.e. a luminance data Y and a pair of color difference data Cb and Cr.

Data D11 of a current picture P11 is sequentially stored in a frame memory 50, or more specifically, a Y (luminance) data D51, a Cb (color difference) data D52 and a Cr (color difference) data D53 of the picture data D11 are stored in blocks 51, 52 and 53 of the memory 50, respectively. Data D13 of a previous picture P13 is stored in a frame memory 42. The Y data D51 of the current picture P11 and a luminance data D42 of the previous picture P13 are read to be input to a motion estimator 13, where they are employed to determine a horizontal component Vx and a vertical component Vy of a motion vector VM of each pixel Px between frames. A set of data D13 on the motion vector VM is stored in a motion vector memory 43 in a pixel mode and componentwise, so that a data D43a on the horizontal component Vx and a data D43b on the vertical component Vy of each pixel are stored at addresses of the pixel in blocks 43a and 43b of the memory 43, respectively.

An address generator 54 generates a combination of address data D54a for reading image data D50 from the memory 50 and a combination of corresponding address data D54b for reading a set of data D43 on the motion vector VM from the memory 43. The address generator 54 further generates a combination of data D54c on a location (x, y) of a corresponding pixel in the current picture P11.

A clustering circuit 44 receives the Y data D51 and Cb and Cr data D52 and D53 from the memory 50, the Vx and Vy component data D43a and D43b from the memory 43, and the location data D54c from the address generator 54, and serves for a clustering in a seven-dimensional character parameter field.

In the clustering, a relative distance $d(X_i, C_p)$ is calculated between a character parameter vector $Xp = (Y_p, Cb_p, Cr_p, x_p, y_p, Vx_p, Vy_p)$ of a respective one P of pixels Px in the current picture P11 and a representative vector $C_i = (Yc_i, Cbc_i, Crc_i, xc_i, yc_i, Vxc_i, Vyc_i)$ of respective one $C_i$ of clusters, such that:

$$d(X_i, C_p) \text{ in terms of a euclidean distance} = \{c_1(Y_p - Yc_i)^2 + \quad (31)$$
$$c_2(Cb_p - Cbc_i)^2 +$$
$$c_3(Cr_p - Crc_i)^2 +$$
$$c_4(x_p - xc_i)^2 +$$
$$c_5(y_p - yc_i)^2 +$$
$$c_6(Vx_p - Vxc_i)^2 +$$
$$c_7(Vy_p - Vyc_i)^2]^{1/2}, \text{ or}$$

$$d(X_P, C_i) \text{ in terms of an } L1 \text{ norm distance} = [c_1|Y_p - Yc_i|^2 + \quad (32)$$
$$c_2|Cb_p - Cbc_i|^2 +$$
$$c_3|Cr_p - Crc_i|^2 +$$
$$c_4|x_p - xc_i|^2 +$$
$$c_5|y_p - yc_i|^2 +$$
$$c_6|Vx_p - Vxc_i|^2 +$$
$$c_7|Vy_p - Vyc_i|^2]^{1/2},$$

where $c_1$ to $c_7$ are each respectively a weighting factor for a corresponding one of the character parameters.

Then, respective pixels clustered to a respective one of the clusters have image data and location data thereof componentwise averaged to provide the cluster with an updated representative vector $C_i=(Yc_i, Cbc_i, Crc_i, xc_i, yc_i, Vxc_i, Vyc_i)$, such that:

$$Yc_i = \left(\sum_m Y_m\right)/N_i, \quad (33)$$

$$Cbc_i = \left(\sum_m Cb_m\right)/N_i, \quad (34)$$

$$Crc_i = \left(\sum_m Cr_m\right)/N_i, \quad (35)$$

$$xc_i = \left(\sum_m x_m\right)/N_i, \quad (36)$$

$$yc_i = \left(\sum_m y_m\right)/N_i, \quad (37)$$

$$Vxc_i = \left(\sum_m Vx_m\right)/N_i, \text{ and} \quad (38)$$

$$Vyc_i = \left(\sum_m Vy_m\right)/N_i, \quad (39)$$

where N is a number of the respective pixels, and $Y_m$, $Cb_m$, $Cr_m$, $x_m$, $y_m$, $Vx_m$ and $Vy_m$ are data values of a respective one of the pixels.

Like clustering may be achieved in a similar manner to the circuit of FIG. 6, subject to the use of a seven-dimensional character parameter vector. In application to FIG. 6, the distance calculator 231 may employ the expression (31) or (32), and average calculator 237 may employ the expressions (33) to (39).

In the above embodiment, the combination of Y, Cb and Cr data may be replaced by a combination R (red), G (green) and B (blue) color data.

In that case, one of the three color data stands for the Y data. For example, Y data may be substituted by the G data which is most correlevant thereto among the three color data.

In a clustering, a relative distance $d(X_i, C_p)$ may thus be calculated between a character parameter vector $Xp=(R_p, G_p, B_p, x_p, y_p, Vx_p, Vy_p)$ of a respective one P of pixels Px in the current picture P11 and a representative vector $C_i=(Rc_i, Gc_i, Bc_i, xc_i, yc_i, Vxc_i, Vyc_i)$ of respective one $C_i$ of clusters, such that:

$$d(X_i, C_p) \text{ in terms of a euclidean distance} = \{c_1(R_p - Rc_i)^2 + \quad (40)$$
$$c_2(G_p - Gc_i)^2 +$$
$$c_3(B_p - Bc_i)^2 +$$
$$c_4(x_p - xc_i)^2 +$$
$$c_5(y_p - yc_i)^2 +$$
$$c_6(Vx_p - Vxc_i)^2 +$$
$$c_7(Vy_p - Vyc_i)^2\}^{1/2}, \text{ or}$$

-continued $$d(X_P, C_i) \text{ in terms of an } L1 \text{ norm distance} = [c_1|R_p - Rc_i|^2 + \quad (41)$$
$$c_2|G_p - Gc_i|^2 +$$
$$c_3|B_p - Bc_i|^2 +$$
$$c_4|x_p - xc_i|^2 +$$
$$c_5|y_p - yc_i|^2 +$$
$$c_6|Vx_p - Vxc_i|^2 +$$
$$c_7|Vy_p - Vyc_i|^2]^{1/2}.$$

where $c_1$ to $c_7$ are each respectively a weighting factor for a corresponding one of the character parameters.

Then, respective pixels clustered to a respective one of the clusters have image data and location data thereof componentwise averaged to provide the cluster with an updated representative vector $C_i=(Rc_i, Gc_i, Bc_i, xc_i, yc_i, Vxc_i, Vyc_i)$ such that:

$$Rc_i = \left(\sum_m Y_m\right)/N_i, \quad (42)$$

$$Gc_i = \left(\sum_m Cb_m\right)/N_i, \quad (43)$$

$$Bc_i = \left(\sum_m Cr_m\right)/N_i, \quad (44)$$

$$xc_i = \left(\sum_m x_m\right)/N_i, \quad (45)$$

$$yc_i = \left(\sum_m y_m\right)/N_i, \quad (46)$$

$$Vxc_i = \left(\sum_m Vx_m\right)/N_i, \text{ and} \quad (47)$$

$$Vyc_i = \left(\sum_m Vy_m\right)/N_i, \quad (48)$$

where $N_i$ is a number of the respective pixels, and $R_m$, $G_m$, $B_m$, $x_m$, $y_m$, $Vx_m$ and $Vy_m$ are data values of a respective one of the pixels.

Figure 12:
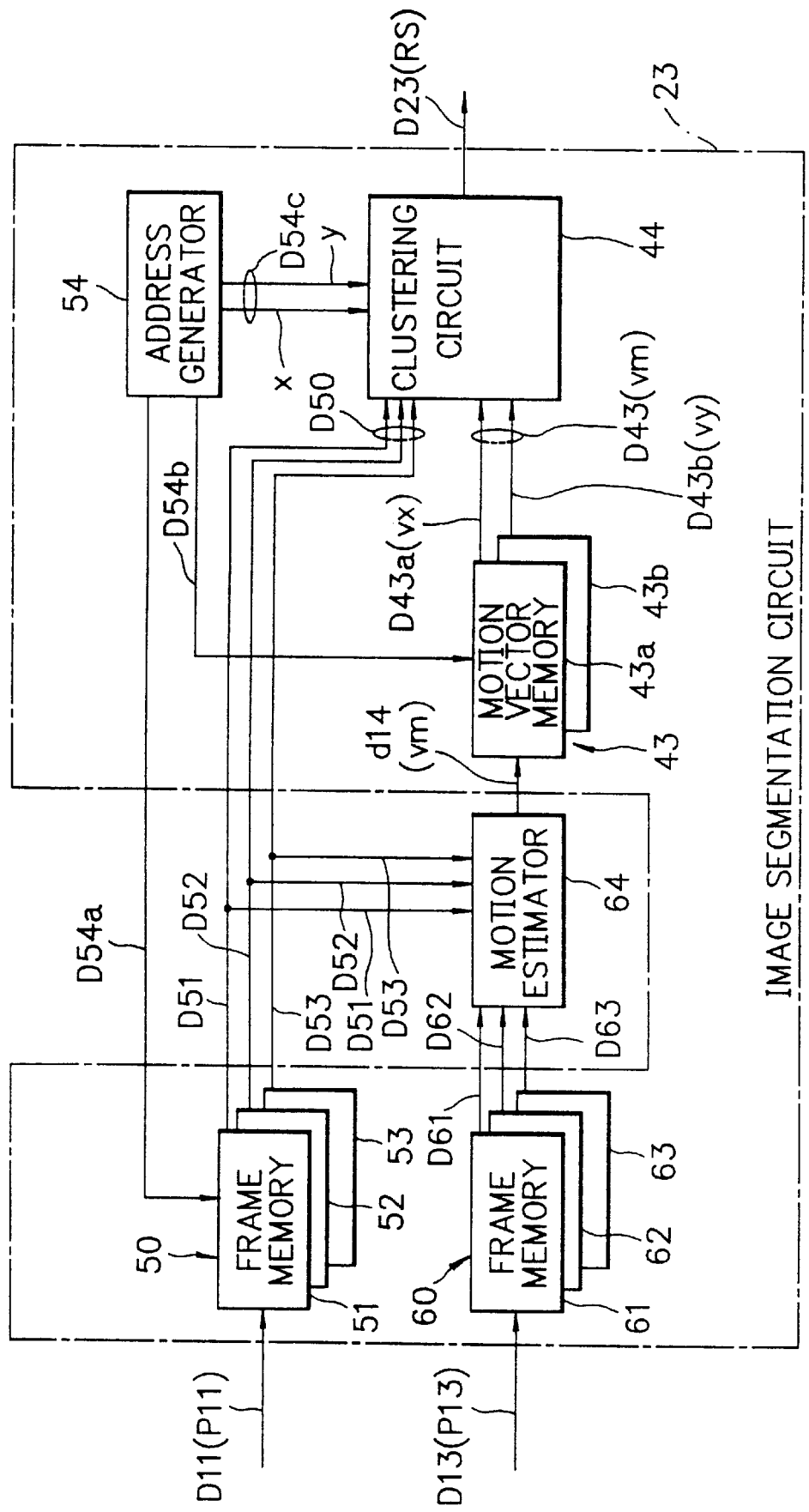
FIG. 12 is a block diagram of an image segmentation circuit according to another embodiment of the present invention.

FIG. 12 shows an image segmentation circuit according to another embodiment of the invention, as a modification of the circuit of FIG. 11.

In FIG. 12, each set of image data comprises a combination of color data, i.e. a luminance data Y and a pair of color difference data Cb and Cr.

Data D11 of a current picture P11 is sequentially stored in a frame memory 50, or more specifically, a Y (luminance) data D51, a Cb (color difference) data D52 and a Cr (color difference) data D53 of the picture data D11 are stored in blocks 51, 52 and 53 of the memory 50, respectively. Data D13 of a previous picture P13 is stored in a frame memory 60. The Y, Cr and Cb data D51, D52 and D53 of the current picture P11 and a Y data D61, Cr data D62 and Cb data D63 of the previous picture P13 are read to be input to a motion estmator 64, where they are employed to determine a motion vector VM of each pixel Px between frames.

In this motion estimation, a block matching is detected between a respective one of current character parameters Y, Cr and Cb and a corresponding one of previous character parameters Y, Cr and Cb, to determine a difference $\text{diff}_y$, $\text{diff}_{cb}$ or $\text{diff}_{cr}$ therebetween. Then, respective differences are added for estimation of a relative motion to determine a combination of horizontal and vertical components of a motion vector VM in accordance with the expression (22) or (23), such that:

$$\text{diff} = \text{diff}_y + \text{diff}_{cb} + \text{diff}_{cr} \quad (49)$$

A precise motion detection is permitted with an increased number of character parameters.

A set of data D64 on the motion vector VM is stored in a motion vector memory 43 in a pixel mode and componentwise. Thereafter, a clustering is performed in a seven-dimensional character parameter field.

In the above embodiment, the combination of Y, Cb and Cr data may be replaced by a combination R (red), G (green) and B (blue) color data.

In that case, three differences $\text{diff}_R$, $\text{diff}_G$ and $\text{diff}_B$ of R, G and B data may be calculated and added for a motion estimation, such that:

$$\text{diff} = \text{diff}_R + \text{diff}_G + \text{diff}_B \quad (50)$$

Figure 13:
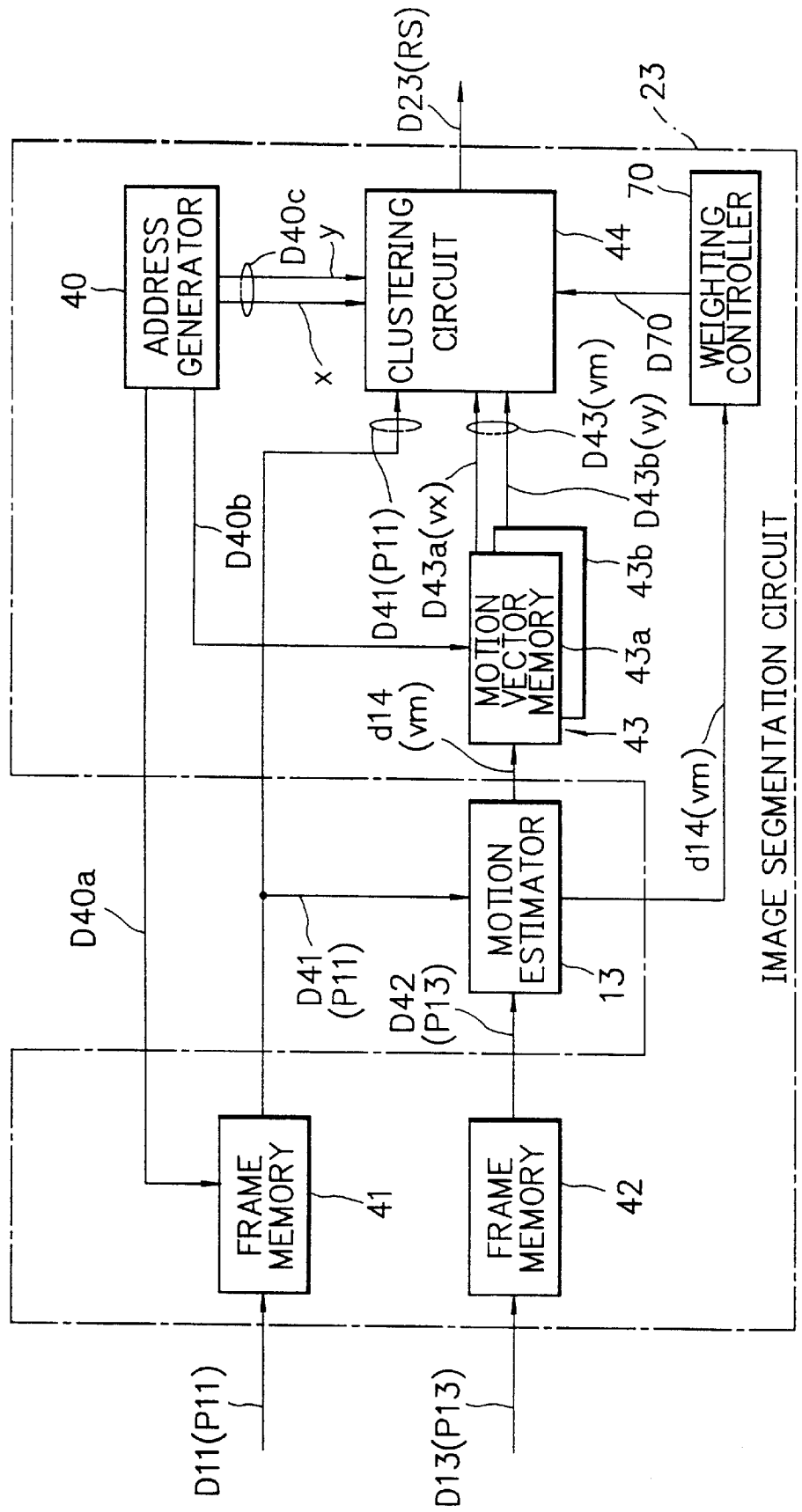
FIG. 13 is a block diagram of an image segmentation circuit according to another embodiment of the present invention.

FIG. 13 shows an image segmentation circuit according to another embodiment of the invention, as a modification of the circuit of FIG. 10.

In the arrangement of FIG. 13, a weighting controller 70 is added. The controller 70 controls a weighting factor for use in a distance calculation in clustering, in dependence on a motion in picture. For example, if a set of measured motions in a picture is relatively significant, the weighting factor is increased for a better structural analysis of the picture. The degree of significance may be determined in terms of an averaged magnitude of motion vector per pixel, such that:

$$V_{av} = \left( \sum_P \sqrt{V x_p^2 + V y_p^2} \right) / N, \quad (51)$$

where, Vav is an average vector, N is a total number of pixels in a picture, and Vx and Vy are components of a motion vector of a pixel P.

Then, a weighting control is performed by using a preset constant $c_{color}$ as a luminance-color weighting constant, such that:

$$c_1 = c_2 = c_3 = c_{color} \quad (52) \text{ and}$$

$$c_6 = c_7 = K \cdot V_{av} \cdot c_{color} \quad (53),$$

where K is a proportion constant responsive for a control strength.

Figure 14:
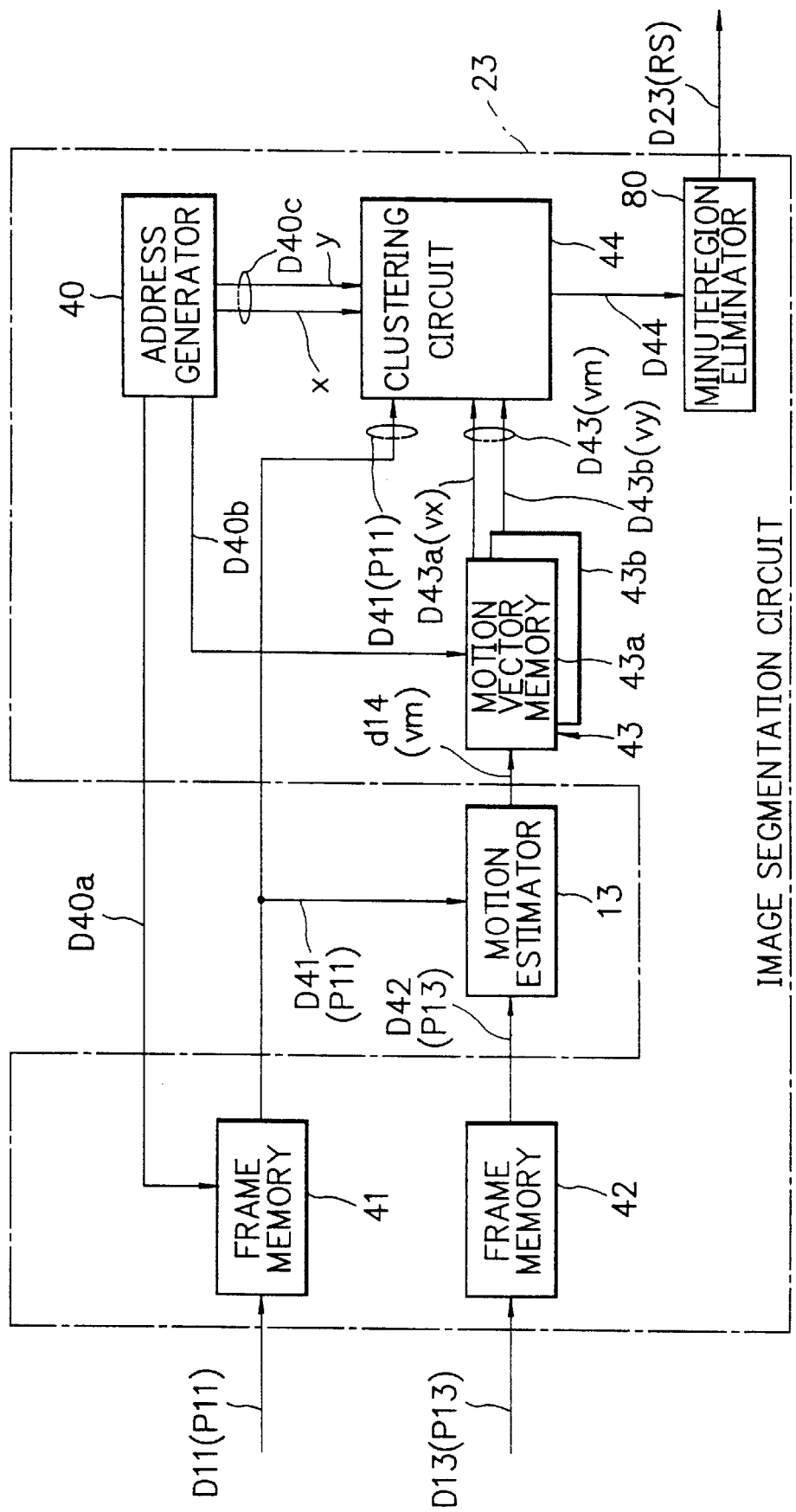
FIG. 14 is a block diagram of an image segmentation circuit according to another embodiment of the present invention.

FIG. 14 shows an image segmentation circuit according to another embodiment of the invention, as a modification of the circuit of FIG. 10.

The circuit of FIG. 14 additionally includes a minute region eliminator 80 for eliminating various minute regions due to a clustering.

Each region segmented by the clustering is checked for the number of pixels to be equal to or larger than a threshold value and for a relation to each neighboring region. If the number of pixels in a region is smaller than the threshold value, the region is judged to be minute and integrated with a resemblant neighboring region. For the judgment of resemblance, a distance is calculated between character parameter vectors representative of regions in concern, by using expressions (24), (31) and (40) or (25), (32) and (41). Any minute region is thus integrated with a region of which the representative vector is most vicinal to the representative vector the minute region.

Figure 15:
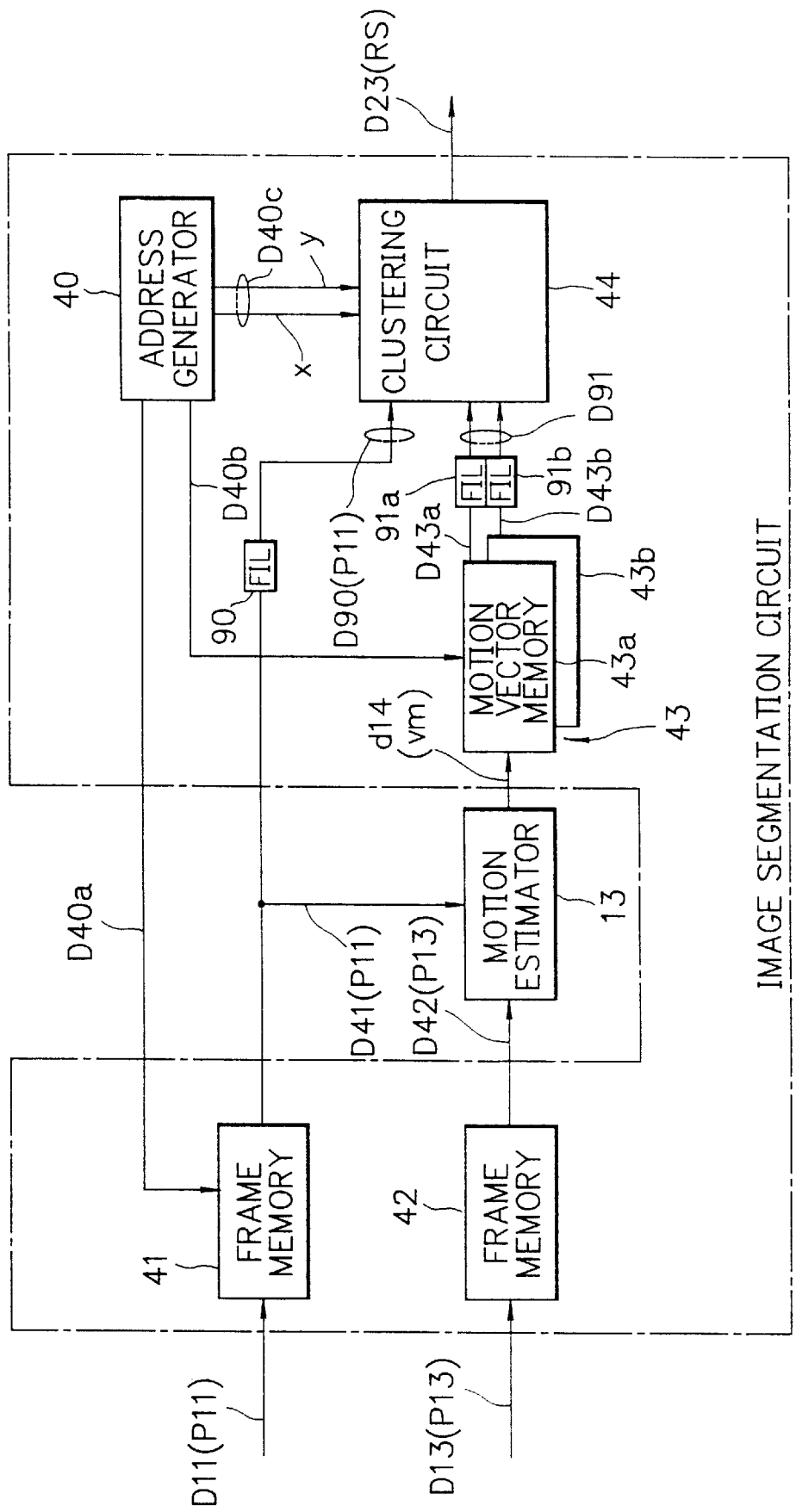
FIG. 15 is a block diagram of an image segmentation circuit according to another embodiment of the present invention.

FIG. 15 shows an image segmentation circuit according to another embodiment of the invention, as a modification of the circuit of FIG. 10.

The circuit of FIG. 15 additionally includes a noise filter 90 for filtering noises from image data D90 of a current picture P11 and a pair of noise filters 91a and 91b for filtering noises from component data D43a and D43b of a motion vector VM. Otherwise, such noises may cause a meaningless segmentation, resulting in unexpected minute regions.

The filters should be effective to pass significant changes along a boundary of each region, and may comprise a median filter or mode filter.

In use of a median filter, a pixel in concern in the picture is covered with a square area extended therearound in a horizontal direction by widths of ±dx and in a vertical direction by widths of ±dy, to determine a central one of data values of pixels in the square area, as they are arranged in an order of magnitude.

In the case of a mode filter, a pixel in concern in the picture is covered with a similar square area, to determine a highest one of occurrence frequencies of data values of pixels in the square area.

Figure 16:
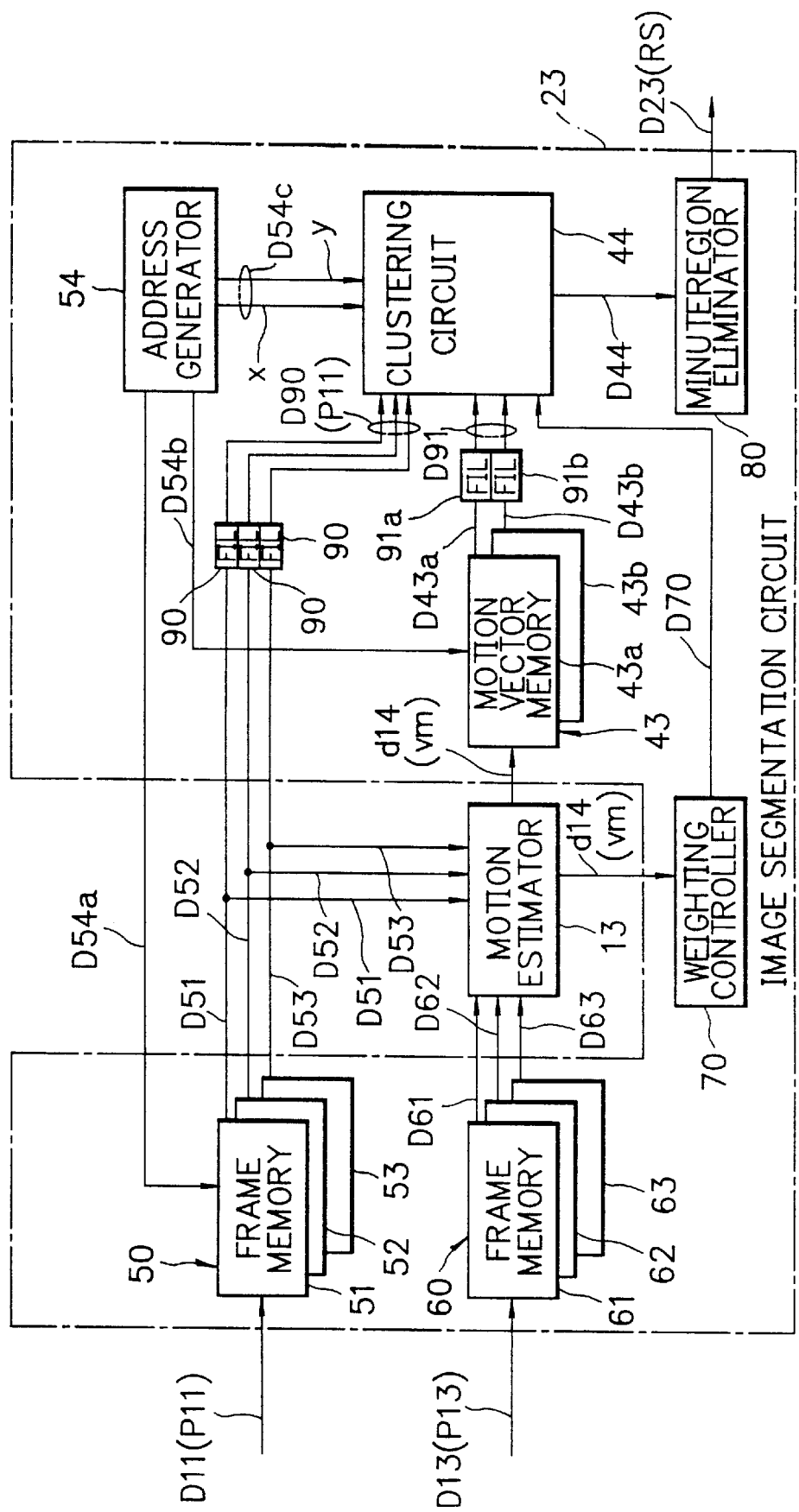
FIG. 16 is a block diagram of an image segmentation circuit according to another embodiment of the present invention.

FIG. 16 shows an image segmentation circuit according to another embodiment of the invention, as a modification of the circuits of FIGS. 10 to 15.

The circuit of FIG. 16 includes respective components employed in the circuits of FIGS. 10 to 15.

In any embodiment described, an image segmentation may be performed by clustering pixels with respect to a combination of image data and motion data, without the use of location data. In such a segmentation, weighting factors $c_4$ and $c_5$ may be set to a null.

As detailed above for the embodiment of FIGS. 8 to 10 and various modifications thereof, the fourth mode includes seven or eight fundamental steps.

A first step divides the current picture P11 into a predetermined number of current minute pieces each respectively consisting of one or more pixels Px. A second step may divide the previous picture P13 into the same number of previous minute pieces each respectively consisting of one or more pixels Px. A third step determines for each current minute piece a corresponding previous minute piece. A fourth step estimates for each current minute piece a relative motion rm thereof to the corresponding previous minute piece.

The second to fourth steps may be concurrently performed in a combined manner. A fifth step provides each pixel in every current minute piece with a combination of motion data d14 representative of the relative motion rm, as additional character data $\phi_i$.

A sixth step image-segments the current picture P11 into a number of regions of pixels Px clustered with respect to the image data, address data and motion data. The number of the regions is smaller than that of the minute pieces.

A seventh step determines for each region of the current picture P11 a corresponding region in the previous picture P13. An eighth step reestimates for each region of the current picture P11 a relative motion RM thereof to the corresponding region in the previous picture P13 to determine a motion vector VM representative of this relative motion RM.

In other words, in the fourth mode, the motion estimator 13 divides the current picture P11 into a predetermined number of current minute pieces each respectively consisting of one or more pixels Px, and in some cases may, divide the previous picture P13 into an identical number of previous minute pieces each respectively consisting of one or more pixels Px.

The estimator 13 then determines for each current minute piece a corresponding previous minute piece, estimates for each current minute piece a relative motion rm thereof to the corresponding previous minute pieces, and provides each pixel Px in the current minute piece with a combination of motion data d14 representative of the relative motion rm, the combination of motion data d14 is output via the mode control switch 23b to the image segmentation circuit 23 together with associated address data (i.e. in synchronizm with an address supplied from an unshown address generator).

In a modified case, the estimator 13 may provide each pixel Px in the previous minute piece with a combination of motion data d14 representative of the relative motion rm, which combination of motion data d14 may be output via the mode control switch 23b to the image segmentation circuit 23 together with associated address data.

The image segmentation circuit 23 serves for image-segmenting the current picture P11 into a number of regions of pixels Px clustered with respect to the image data, address data and motion data, so that each pixel Px in the current picture P11 is labelled with an identification number (hereafter "ID") of an associated region. The region ID is output as the result RS of estimation in a form of data D23 combined with an associated pixel address to the motion estimator 13, motion compensator 14 and encoding multiplexer 20.

In the modified case, the image segmentation circuit 23 may serve for image-segmenting the previous picture P13 into a number of regions of pixels Px clustered with respect to the image data, address data and motion data, so that each pixel Px in the previous picture P13 may be labelled with an ID of an associated region. The region ID may be output as the result RS of estimation in a form of data D23 combined with an associated pixel address.

Then, the motion estimator 13 determines for each region of the current picture P11 a corresponding region in the previous picture P13, and reestimates for that region a relative motion RM thereof to the corresponding region to determine a motion vector VM representative of the reestimated relative motion RM.

In the modified case, the motion estimator 13 may determines for each region of the previous picture P13 a corresponding region in the current picture P11, and reestimates for that region a relative motion RM thereof to the corresponding region to determine a motion vector VM representative of the reestimated relative motion RM.

The motion compensator 14 motion-compensates the local decoded picture P12 of the previous picture P13 by using the result RS of image segmentation and the motion vector VM, to obtain a predicted picture P14 of the current picture P11, so that pixels in the picture P12 are clustered in accordance with the result RS of image segmentation and displaced in accordance with the motion vector VM together with their image data. The local decoded picture P12 may be image-mosaicked so that all pixels in each cluster have a combination of averaged image data, or in some case may be simply equi-divided into blocks to be motion-compensated by using the motion vector VM only.

The subtractor 15 subtracts the predicted picture P14 from the current picture P11 to obtain a prediction error picture P15. The compression circuit 16 codes the prediction error picture P15 in a compressing manner into a set of coded data D17. The decompression circuit 17 decodes the set of coded data D17 in a decompressing manner into a local decoded error picture P16. The adder 18 adds the local decoded error picture P16 to the predicted picture P14 to obtain a local decoded picture P17 of the current picture P11.

The encoding multiplexer 20 codes the data D14 of the motion vector VM and the data D23 of the result RS of the estimation into sequences of compressed codes and the coded data D17 of the prediction error picture P15 into a sequence of compressed codes, and multiplexes those compressed codes to obtain a multiplexed signal C11. The decoding demultipler 31 demultiplexes the multiplexed signal C11 into sequences of compressed codes and a sequence of double compressed codes, and decodes the former into a set of data D36 representative of a decoded segmentation corresponding to the result RS of segmentation and a set of data D32 representative of a decoded vector corresponding to the motion vector VM, and the latter into a set of data D31 representative of a decoded error picture corresponding to the prediction error picture P15. The motion compensator 33 employs the data D36 and D32 to motion-compensate a previous decoded picture P30 in a similar manner to the motion compensation at the motion compensator 14. The decompression circuit 32 decodes the data D31 in a decompressing manner to obtain a set of data D33 representative of a decoded error picture P31 corresponding to the local decoded error picture P16. The adder 34 adds the decoded error picture P31 to the decoded prediction picture P32 to obtain a decoded current picture P33.

In any mode, a set of current data is processed by programs in the system so that the current picture P11 is linearly mapped into the spatiotemporal field $\phi$–T, as a first picture Pc(T) consisting of a set of first pixels Px(T) each respectively represented by a first character vector V1 equivalent to a vector sum of a first image parameter vector V11 representative of the combination of current image data $\phi_a$ and a first location parameter vector V12 representative of the combination of current address data $\phi_x$, $\phi_y$ (and $\phi_z$). Likewise, a set of previous data is processed so that the previous picture P13 is linearly mapped into the spatiotemporal field $\phi$–T, as a second picture Pc(T–1) consisting of a set of second pixels Px(T–1) each respectively represented by a second character vector V2 equivalent to a vector sum of a second image parameter vector V21 representative of the combination of previous image data $\phi_a$ and a second location parameter vector V22 representative of the combination of previous address data $\phi_x$, $\phi_y$ (and $\phi_z$).

Moreover, another set of previous data is processed so that the local decoded previous picture P12 is linearly mapped into the spatiotemporal field $\phi$–T, as a third picture Pc' (T–1) consisting of a set of third pixels Px' (T–1) each respectively represented by a third character vector V3 equivalent to a vector sum of a third image parameter vector V31 representative of a combination of local decoded previous image data $\phi_a$ and a third location parameter vector V32 representative of a combination of local decoded previous address data $\phi_x$, $\phi_y$ (and $\phi_z$).

In the fourth mode, the motion estimator 13 divides the first picture Pc(T) into Mp×Np (×Rp) (Mp, Np, Rp=predetermined integers) first minute pieces Pp(T) each respectively consisting of one or more first pixels Px(T) having the first location parameter vectors V12 thereof averaged to obtain a piece location representative vector V1p representative of a location ($\phi_x$, $\phi_y$ (and $\phi_z$)) of the first minute piece Pp(T) in the spatiotemporal field, and in some cases may divide the second picture Pc(T–1) into Mp×Np (×Rp) second minute pieces Pp(T–1) each respectively consisting of one or more second pixels Px(T–1) having the second location parameter vectors V22 thereof averaged to obtain a piece location representative vector V2p representative of a location ($\phi_x$, $\phi_y$ (and $\phi_z$)) of the second minute piece Pp(T−1) in the spatiotemporal field. The estimator 13 determines for each first minute piece Pp(T) a corresponding second minute piece Pp(T−1), and estimates a difference vector V1p−V2p therebetween, as a first relative motion rm (=d14) that is a combination of components of |V1p−V2p|, to thereby determine a first motion vector vm=V1p−V2p, then adds the first motion vector vm to the first character vector V1($\phi_b$)=V11($\phi_a$)+V12($\phi_x$, $\phi_y$ (and $\phi_z$)) of each first pixel Px(T) in the first minute piece Pp(T) in concern to obtain for each first pixel Px(T) a dimension-increased character vector V1($\phi_b$, rm)=V11($\phi_a$)+V12($\phi_x$, $\phi_y$ (and $\phi_z$))+vm(rm) thereof.

The image segmentation circuit 23 segments the first picture Pc(T) into M×N (×R) first regions (M, N, R=predetermined integers such that M<Mp, N<Np, R<Rp) each respectively composed of a cluster C1i (i=arbitrary integer) of j (j=arbitrary integer) first pixels Px(T), so that the dimension-increased character vectors V1($\phi_b$, rm) of the j first pixels Px(T) are relatively vicinal to each other in terms of a euclidean distance or L1 norm distance defined in the spatiotemporal field and have the first location parameter vectors V12 thereof averaged to obtain a region location representative vector V1r representative of a location ($\phi_x$, $\phi_y$ (and $\phi_z$)) of the first region C1j in concern in the spatiotemporal field.

The motion estimator 13 determines for each first region C1i a corresponding second region C2i in the second picture Pc(T−1), which second region C2i is composed of j second pixels Px(T−1) such that the second character vectors V2 of the j pixels Px(T−1) or the second image parameter vectors V21 thereof are each respectively relatively vicinal to an averaged or representative vector V1r of the first character vectors V1 of the j first pixels Px(T) in the first region C1i or an averaged or representative vector V11r of the first image parameter vectors V11 thereof, respectively, in terms of the euclidean or L1 norm distance. Then, the estimator 13 calculates an average of the second location parameter vectors V22 of the j second pixels Px(T−1) in the second region C2i to obtain a region location representative vector V2r representative of a location ($\phi_x$, $\phi_y$ (and $\phi_z$)) of the second region C2i in the spatiotemporal field, and estimates a difference vector V1r−V2r between the region location representative vector V1r of the first region C1i and the region location representative vector V2r of the second region C2i, as a second relative motion RM (=D14) that is a combination of components of |V1r−V2r|, to thereby determine a second motion vector VM=V1r−V2r.

The motion compensator 14 responds to the result RS of estimation to segment a blank fourth picture Pc' (T) into M×N (×R) regions each respectively composed of a cluster C3i of j fourth pixels Px' (T) each respectively having a fourth character vector V4 equivalent to a vector sum of a fourth image parameter vector V41 (=0) representative of a null set of image data and a fourth location parameter vector V42 equivalent to the first location parameter vector V12 of one of the j pixels Px(T) in a corresponding first region C1i of the first picture Pc(T), and to the motion vector VM associated with the first region C1i to add a reverse vector of the motion vector VM to the fourth location parameter vector V42 of a respective one of the j fourth pixels Px' (T) to thereby determine a corresponding third pixel Px' (T−1) in the third picture Pc' (T−1). The motion-compensation motion-compensates the third picture Pc' (T−1) by adding the motion vector VM to the third location parameter vector V32 of the third vector V3 of the corresponding third pixel Px' (T−1) or alternately by adding the third image parameter vector V31 of this third pixel Px' (T−1) to the fourth image parameter vector V41 of the respective fourth pixel Px' (T), so that the respective fourth pixel Px' (T) has a data-added fourth vector such that V4=V3+VM=(V31+V32)+VM=V31+(V42−VM)+VM=V31+V42. A set of such fourth vectors is linearly inverse converted to obtain the predicted picture P14.

The first mode will be described below.

The first mode includes three fundamental steps. A first step image-segments the current picture P11 into a number of first regions. A second step determines for each first region a corresponding second region in the previous picture P13. A third step estimates for each first region a relative motion RM thereof to the corresponding second region to determine a motion vector VM representative of the relative motion RM.

In other words, the mode control switch 23b is turned off so that the image segmentation circuit 23 directly image-segments the current picture P11 into a number of first regions, and outputs a set of data D23 on a result RS of the segmentation to the motion estimator 13, motion compensator 14 and encoding multiplexer 20. Then, the motion estimator 13 determines for each first region a corresponding second region in the previous picture P13, estimates a relative motion RM therebetween to determine the motion vector VM, and outputs a set of data D14 on the motion vector VM to the motion compensator 14 and encoding multiplexer 20. Thereafter, the first mode proceeds in the same manner as the fourth mode.

In the first mode, therefore, the image segmentation circuit 23 segments the first picture Pc(T) in the spatiotemporal field into M×N (×R) first regions each respectively composed of a cluster C1i of j first pixels Px(T), so that the character vectors V1($\phi_b$) of the j first pixels Px(T) are relatively vicinal to each other in terms of a euclidean distance or L1 norm distance and have the first location parameter vectors V12 thereof averaged to obtain a region location representative vector V1r representative of a location ($\phi_x$, $\phi_y$ (and $\phi_z$)) of the first region C1i in concern. The motion estimator 13 determines for each first region C1i a corresponding second region C2i in the second picture Pc(T−1), which second region C2i is composed of j second pixels Px(T−1) such that the second character vectors V2 of the j pixels Px(T−1) or the second image parameter vectors V21 thereof are each respectively relatively vicinal to an averaged or representative vector V1r of the first character vectors V1 of the j first pixels Px(T) in the first region C1i or an averaged or representative vector V11r of the first image parameter vectors V11 thereof, respectively, in terms of the euclidean or L1 norm distance. Then, the estimator 13 calculates an average of the second location parameter vectors V22 of the j second pixels Px(T−1) in the second region C2i to obtain a region location representative vector V2r representative of a location ($\phi_x$, $\phi_y$ (and $\phi_z$)) of the second region C2i in the spatiotemporal field, and estimates a difference vector V1r−V2r between the region location representative vector V1r of the first region C1i and the region location representative vector V2r of the second region C2i, as a relative motion RM (=D14) that is a combination of components of |V1r−V2r|, to thereby determine a motion vector VM=V1r−V2r.

The second mode will be described below.

The second mode includes five or six fundamental steps. A first step divides the current picture P11 into a predetermined number of current minute pieces each respectively consisting of one or more current pixels Px. A second step may divide the previous picture P13 into an identical number of previous minute pieces each respectively consisting of one or more previous pixels Px. A third step determines for each current minute piece a corresponding previous minute piece. A fourth step estimates for each current minute piece a relative motion rm thereof to the corresponding previous minute piece. A fifth step provides each pixel in every current minute piece with a combination of motion data d14 representative of the relative motion rm, as additional character data. A sixth step image-segments the current picture P11 into a number of first regions with respect to the combination of image data, the combination of address data and the combination of motion data.

In other words, first, the motion estimator 13 divides the current picture P11 into a predetermined number of current minute pieces each respectively consisting of one or more current pixels Px, and in some case may divide the previous picture P13 into an identical number of previous minute pieces each respectively consisting of one or more previous pixels Px. The motion estimator 13 determines for each current minute piece a corresponding previous minute piece, estimates a relative motion rm therebetween so that each current pixel Px is additionally defined by a combination of motion data d14 representative of the relative motion rm, and outputs the motion data d14 via the mode control switch 23b to the image segmentation circuit 23 together with associated address data.

The image segmentation circuit 23 image-segments the current picture P11 into a number of first regions with respect to the combination of image data, the combination of address data and the combination of motion data, and outputs a result RS of the segmentation to the motion compensator 14 and encoding multiplexer 20.

The result RS of segmentation is output also to the motion estimator 13, which however does not respond thereto to perform any reestimation in this second mode. Accordingly, the estimator outputs a set of data D14 representative of a zero motion vector VM=0.

The motion compensator 14 motion compensates the local decoded picture P12 by using the result RS of segmentation and the zero motion vector, so that the picture P12 is image-segmented and image-mosaicked to obtain a predicted picture P14 of the current picture P11, i.e., all pixels in the picture P12 are clustered into a number of regions and respective pixels in each region are equalized thereamong to have a combination of componentwise averaged or region-representative image data. Thereafter, like operations to the fourth mode follow, subject to VM=0 and an image-mosaicking operation of the motion compensator 33 (at the decoding end).

In a modified case of the second mode, an exclusive motion compensator or image-mosaicking circuit may be incorporated in the image-segmentation circuit 23 so that the image-segmentation circuit 23 may further serve for image-mosaicking the current picture P11 to directly obtain an improved prediction picture of the current picture P11, for a compression purpose. In that case, a set of data D23 on the prediction picture may be output as a result RS of segmentation from the image-mosaicking circuit to the subtractor 15. The prediction picture RS may be subtracted from the current picture P11 to obtain a prediction error picture P15 to be processed in a similar manner to the fourth mode, as well as to the encoding multiplexer 20. In such a case the data D23 may be encoded into a sequence of compressed codes, which codes may be multiplexed and transferred to the decoding multiplexer 31, where they may be demultiplexed and decoded into a set of decompressed data D36 directly representative of a coded prediction picture RS, which may be added to a decoded error picture P31 (i.e. a picture decoded by the decompression circuit 32 to represent the prediction error picture P15) to obtain a decoded picture P33 of the current picture P11. Like operations may be employed to obtain a local decoded picture P17 of the current picture P11, by applying the data 23 (in place of the data D15) to the adder 18.

In the modified case, therefore, the motion compensators 14 and 33 (at both encoding and decoding ends) may be cut off together with their associated lines so that in the encoder 10, an image mosaicking circuit of the image segmentation circuit 23 may be connected to the subtractor 15, the adder 18 and the encoding multiplexer 20 and, in the decoder 30, the decoding demultiplexer 31 may be connected directly to the adder 34 as well as to the decompression circuit 32.

In the second mode, like the fourth mode, the motion estimator 13 divides the first picture Pc(T) in the spatiotemporal field into Mp×Np (×Rp) first minute pieces Pp(T) each respectively consisting of one or more first pixels Px(T) having the first location parameter vectors V12 thereof averaged to obtain a piece location representative vector V1p representative of a location ($\phi_x$, $\phi_y$ (and $\phi_z$)) of the first minute piece Pp(T) in the spatiotemporal field. The motion estimator may in some cases divide the second picture Pc(T−1) into Mp×Np (×Rp) second minute pieces Pp(T−1) each respectively consisting of one or more second pixels Px(T−1) having the second location parameter vectors V22 thereof averaged to obtain a piece location representative vector V2p representative of a location ($\phi_x$, $\phi_y$ (and $\phi_z$)) of the second minute piece Pp(T−1) in the spatiotemporal field. The estimator 13 determines for each first minute piece Pp(T) a corresponding second minute piece Pp(T−1), and estimates a difference vector V1p−V2p therebetween, as a first relative motion rm (=d14) that is a combination of components of |V1p−V2p|, to thereby determine a first motion vector vm=V1p−V2p, and then adds the first motion vector vm to the first character vector V1($\phi_b$)=V11($\phi_a$)+V12 ($\phi_x$, $\phi_y$ (and $\phi_z$)) of each first pixel Px(T) in the first minute piece Pp(T) in concern to obtain for each first pixel Px(T) a dimension-increased character vector V1($\phi_b$, rm)=V11($\phi_a$)+V12($\phi_x$, $\phi_y$ (and $\phi_z$))+vm(rm) thereof.

The image segmentation circuit 23 segments the first picture Pc(T) into M×N (×R) first regions each respectively composed of a cluster C1i of j first pixels Px(T), so that the dimension-increased character vectors V1($\phi_b$, rm) of the j first pixels Px(T) are relatively vicinal to each other in terms of a euclidean distance or L1 norm distance defined in the spatiotemporal field and have the first location parameter vectors V12 thereof averaged to obtain a region location representative vector V1r representative of a location ($\phi_x$, $\phi_y$ (and $\phi_z$)) of the first region C1i in concern in the spatiotemporal field.

The third mode will be described below.

The third mode includes six fundamental steps. A first step image-segments the current picture P11 into a predetermined number of current regions. A second step divides each current region into a variable number of sub-regions each respectively consisting of one or more current pixels. A third step determines for each sub-region in every current region a corresponding small region in the previous picture P13. A fourth step estimates for each sub-region a relative motion rm thereof to the corresponding small region. A fifth step provides each pixel in each sub-region of every current region a combination of motion data d14 representative of the relative motion rm. A sixth step resegments the current picture P11 into a number of first regions with respect to the combination of image data, the combination of address data and the combination of motion data.

In other words, first, the image segmentation circuit 23 image-segments the current picture P11 into a predetermined number of current regions. A result of this segmentation is output from the circuit 23 to the motion estimator 13. The motion estimator 13 divides each current region into a variable number of sub-regions each respectively consisting of one or more current pixels Px, determines for each thereof a corresponding small region in the previous picture P13, estimates a relative motion rm therebetween, and additionally defines each current pixel Px by a combination of motion data d14 representative of the relative motion rm. A set of those motion data d14 is input from the estimator 13 via the mode control switch 23b to the image segmentation circuit 23.

Then, the image segmentation circuit 23 resegments the current picture P11 into a number of first regions with respect to the combination of image data, the combination of address data and the combination of motion data d14. Thereafter, like operations to the second mode follows, including the modified case thereof.

Therefore, in a modified case of this third mode, the motion picture processing system 1 may include a resegmentor (as part of the circuit 23) for image-mosaicking the current picture P11 to obtain a prediction picture thereof as a result RS of estimation so that respective current pixels Px associated with a respective one of the first regions have a combination of region-representative image data in place of the combinations of image data thereof. A subtractor 15 subtracts the prediction picture RS from the current picture P11 to obtain a prediction error picture P15. A compressing coder 16 codes the prediction picture RS and the prediction error picture P15 in a compressing manner into a first set of coded data and a second set of coded data, respectively. A decompressing decoder 17 decodes the first set of coded data and the second set of coded data in a decompressing manner into a local decoded prediction picture RS and a local decoded error picture P16, respectively. An adder 18 for adds the local decoded error picture P16 to the local decoded prediction picture RS to obtain a local decoded picture P17. As a matter of course, the prediction picture RS may be directly (i.e. without a coding-decoding operation) added to the local decoded error picture P16 to obtain a local decoded picture P17.

Further, in a modified case of the third mode, the encoder 10 may comprise a segmentor 23 for image-segmenting the current picture P11 into a predetermined number of current regions. A motion estimator 13 divides each current region into a variable number of sub-regions each respectively consisting of one or more current pixels Px, determines for each sub-region of each current region a corresponding small region in the previous picture P13, estimates a relative motion rm therebetween and additionally defines each current pixel by a combination of motion data d14 representative of the relative motion rm. A resegmentor 23 resegments the current picture P11 into a number of first regions with respect to the combination of image data, the combination of address data and the combination of motion data d14 and image-mosaickes the current picture P11 to obtain a prediction picture RS thereof so that respective current pixels associated with a respective one of the first regions have a combination of region-representative image data in place of the combinations of image data thereof. A subtractor 16 subtracts the prediction picture RS from the current picture P11 to obtain a prediction error picture P15. An encoding multiplexer 20 codes the prediction picture RS and the prediction error picture P15 in a compressing manner into a sequence of first codes and a sequence of second codes, respectively, and multiplexes the sequence of first codes and the sequence of second codes to obtain a multiplexed signal C11.

The decoder 30 may comprise a decoding demultiplexer 31 for demultiplexing the multiplexed signal C11 into a combination of a sequence of third codes corresponding to the sequence of first codes and a sequeunce of fourth codes corresponding to the sequence of second codes and decoding the sequence of third codes and the sequence of fourth codes in a decompressing manner into a set of data D36 representative of a decoded prediction picture RS and a set of data D33 representative of a decoded error picture P31. An respectively, adder 34 adds the decoded error picture P31 to the decoded prediction picture RS to obtain a decoded picture P33 corresponding to the current picture P11.

In the third mode, the image segmentation circuit 23 segments the first picture Pc(T) in the spatiotemporal field into M'×N' (×R) (M', N', R'=predetermined integers such that M'<M, N'<N, R'<R) initial regions each respectively composed of a cluster C1i' of k (k=arbitrary integer such that k>j) first pixels Px(T), so that the character vectors V1($\phi_b$) of the k first pixels Px(T) are relatively vicinal to each other in terms of a euclidean distance or L1 norm distance.

The motion estimator 13 divides each region C1i' of the first picture Pc(T) into (Ms/M')×(Ns/N') {×(Rs/R')} (Ms, Ns, Rs=arbitrary integers such that Ms>M, Ns>N, Rs>R) sub-regions Ps(T) each respectively consisting of one or more first pixels Px(T) having the first location parameter vectors V12 thereof averaged to obtain a sub-region location representative vector V1's representative of a location ($\phi_x$, $\phi_y$ (and $\phi_z$)) of the sub-region Ps(T) in the spatiotemporal field, and in some case may divide the second picture Pc(T–1) into Ms×Ns (×Rs) small regions Ps(T–1) each respectively consisting of one or more second pixels Px(T–1) having the second location parameter vectors V22 thereof averaged to obtain a small-region location representative vector V2s representative of a location ($\phi_x$, $\phi_y$ (and $\phi_z$)) of the small region Ps(T–1) in the spatiotemporal field. The estimator 13 determines for each sub-region Ps(T) a corresponding small region Ps(T–1), and estimates a difference vector V1s–V2s therebetween, as a relative motion rm (=d14) that is a combination of components of |V1s–V2s|, to thereby determine a motion vector vm=V1s–V2s, and then adds the motion vector vm to the first character vector V1($\phi_b$)=V11 ($\phi_a$)+V12($\phi_x$, $\phi_y$ (and $\phi_z$)) of each first pixel Px(T) in the sub-region Ps(T) in concern to obtain for each first pixel Px(T) a dimension-increased character vector V1($\phi_b$, rm)= V11($\phi_a$)+V12($\phi_x$, $\phi_y$ (and $\phi_z$))+vm(rm) thereof.

Then, the image segmentation circuit 23 segments the first picture Pc(T) into M×N(×R) first regions each respectively composed of a cluster C1i of j first pixels Px(T) so that the dimension-increased character vectors V1($\phi_b$, rm) of the j first pixels Px(T) are relatively vicinal to each other in terms of a euclidean distance or L1 norm distance defined in the spatiotemporal field and have the first location parameter vectors V12 thereof averaged to obtain a region location representative vector V1r representative of a location ($\phi_x$, $\phi_y$ (and $\phi_z$)) of the first region C1i in concern in the spatiotemporal field.

The foregoing first to fourth modes may be selected in accordance with a result RS of estimation of a past input picture.

Incidentally, in a modified case of the first or fourth mode, a previous picture P13 may be image-segmented with respect to image and location data and/or motion data of pixels thereof to provide a result RS of segmentation and each image-segmented region of the picture P13 may be motion-estimated relative to the current picture P11 to obtain a motion vector VM, before a motion compensation of the local decoded picture P12 in which each region defined in accordance with the result RS of segmentation may have respective pixels thereof displaced in dependence on the motion vector VM together with their image data to obtain a prediction picture P14 of the current picture P11.

Further, in a normal operation flow of each of the second to fourth modes, the previous picture P13 is not divided into minute pieces nor small regions, before the motion estimator 13 determines for each minute piece or sub-region of the current picture P11 a corresponding minute piece or small region in the previous picture P13 such that respective pixels Px(T−1) in this minute piece or small region have their character vectors V2 or image parameter vectors V21 each respectively relatively vicinal to an averaged or representative vector of respective character vectors V1 or image parameter vectors V11r of pixels Px(T) in that minute piece or sub-region.

The spatiotemporal field $\phi$–T and its relationship with pixel character parameters $\phi_b$ will be described.

As used herein, the term "character" or "pixel character" means any and all features that define a pixel to be processed in a method or system according to the invention and are sufficiently significant to be recognized in the method or by the system. For example, in the embodiments described, each pixel is defined by a combination of image data (i.e. a monochromatic luminance signal, three color data R-G-B or three luminance and chrominance data Y-Cr-Cb) and a combination of location data (i.e. two- or three-element address matrix or spatial coordinates X-Y(-Z)) with a sufficient significance when input to the system, and is additionally defined by a combination of motion data (i.e. vx-vy(-vz) or Vx-Vy(-Vz)) with a sufficient significance in the way of an associated process. In a field of a virtual image or para-experience, a pixel may be additionally defined by a combination of incentive data such as on a scent, pressure, temperature or brain wave.

The term "parameters" or "character parameter" means a parameter defined in the method or system, to represent a degree, level or magnitude of the significance of a character.

Accordingly, when a pixel Px is defined by a set $\phi$ of character parameters $\phi_{bi}$, where i is an arbitrary integer as suffix such that $1 \leq i \leq p$ (predetermined integer), any pair of elements $\phi_{bn}$ and $\phi_{bm}$ of the set $\phi$ have an intersection $\phi_{bn} \cap \phi_{bm}$ therebetween always equivalent to a null set $\phi$ if n≠m, where n and m are integers such that $1 \leq n \leq p$ and $1 \leq m \leq p$.

As shown in FIG. 17, any pixel Px, that is fully defined by a unique set $\phi = \{\phi_{bi}(T)\}$, and hence any cluster Ci or small region in a picture frame Fp of a current picture Pc(T) is congruently mapped into an imaginary frame Fc in the spatial field X-Y(-Z), wherefrom it is linearly mapped into the spatiotemporal field $\phi$–T which is a vector field defined by a coordinate system $\phi_{b1}$–$\phi_{b2}$– ... –$\phi_{bi}$– ... –$\phi_{bp}$–T. Thus, letting $D_{iT}$ be a parameter value of $\phi_{bi}(T)$ and $e_i$ and $e_T$ be unit vectors along $\phi_{bi}$-axis and T-axis, respectively, the set $\phi = \{\phi_{bi}(T)\}$ is uniquely mapped as a vector V ($D_{iT}$, T)=$D_{1T}$·$e_1$+$D_{2T}$·$e_2$+ ... +$D_{iT}$·$e_i$+ ... +$D_{pT}$·$e_p$+T·$e_T$. The cluster Ci(T) or small region is uniquely mapped as a set of such vectors {V ($D_{iT}$, T)}. Letting $_{b1}$=x, $_{b2}$=y and $_{b3}$=z, the vector V ($D_{iT}$, T) has a spatial location thereof defined by a location vector V12 with a combination of spatial location components $D_{1T}$, $D_{2T}$ and $D_{3T}$.

Likewise, any pixel Px, that is fully defined by a unique set $\phi = \{\phi_{bi}(T-1)\}$, and hence any cluster Ci(T−1) or small region in a picture frame Fp of a previous picture Pc(T−1) is congruently mapped into the imaginary frame Fc in the spatial field X-Y(-Z), wherefrom it is linearly mapped into the spatiotemporal field $\phi$–T, where the set $\phi = \{\phi_{bi}(T-1)\}$ is uniquely mapped as a vector V ($D_{i(T-1)}$, T−1)=$D_{1(T-1)}$·$e_1$+$D_{2(T-1)}$·$e_2$+ ... +$D_{i(T-1)}$·$e_i$+ ... +$D_{p(T-1)}$·$e_p$+(T−1)·$e_T$. The vector V ($D_{i(T-1)}$, T−1) also has a spatial location thereof defined by a location vector V22 with a combination of spatial location components $D_{1(T-1)}$, $D_{2(T-1)}$ and $D_{3(T-1)}$. The cluster Ci(T−1) or small region is also uniquely mapped as a set of such vectors {V($D_{i(T-1)}$, T−1)}.

In the motion estimation, letting V1r be a representative vector ($D_{1Tr}$, $D_{2Tr}$, $D_{3Tr}$, $D_{4Tr}$, ... $D_{1Tr}$, ... $D_{pTr}$, T) of the vector set {V($D_{iT}$, T)}, each mapped vector (as a j-th identified one) in a vicinity of a spatially co-located vector V ($D_{1Tr}$, $D_{2Tr}$, $D_{3Tr}$, $D_{4(T-1)a}$, ... $D_{i(T-1)a}$, ... $D_{p(T-1)a}$, T−1) (suffix a=arbitrary value) with the vector V1r is checked for a character difference vector $\delta 1 = (D_{4Tr}-D_{4(T-1)j})e_4$+ ... +$(D_{1Tr}-D_{1(T-1)j})e_i$+ ... +$(D_{pTr}-D_{p(T-1)j})e_p$ therebetween to be minimal or relatively small in magnitude. If the cluster Ci(T−1) or small region therein is spatially displaced to constitute the cluster Ci(T) or small region therein, the difference vector $\delta 1$ with respect to any and all pixels in the former will be confirmed to fall within a conforming magnitude range. For each conforming pixel to V1r, a spatial location difference vector Vd is calculated such that Vd=$(D_{1Tr}·e_1+D_{2Tr}·e_2+D_{3Tr}·e_3)$−V22, and is averaged among all conforming pixels to V1r to determine a motion vector VM or vm. As a result, each conforming pixel Px(T) to V1r has an additional character parameter representative of the motion vector VM or vm as partially illustrated in a X–$\phi_2$ (G)–Vy space in FIG. 17.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for processing a set of data expressed by a temporal sequence of two or three dimensional pictures including a time-dependent motion therein, said set of data including a set of current data relating to a current picture in said sequence of pictures and a set of previous data relating to a previous picture previous to said current picture in said sequence of pictures, said current picture including a set of current pixels each respectively defined by a combination of current image data associated therewith and a combination of current address data representing an address in said current picture, said previous picture including a set of previous pixels each respectively defined by a combination of previous image data associated therewith and a combination of previous address data representing an address in said previous picture, said method comprising the steps of:

processing said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data;

processing said set of previous data so that said previous picture is linearly mapped into said spatiotemporal field as a second picture comprising a set of second pixels each respectively represented by a second character vector equivalent to a sum of a second image parameter vector representative of said combination of previous image data and a second location parameter vector representative of said combination of previous address data;

segmenting said first picture into a number of first regions each respectively comprised of a cluster of a variable number of said first pixels, said segmenting being performed so that respective first character vectors of said variable number of pixels are relatively vicinal to each other in terms of a distance defined in said spatiotemporal field;

averaging all first location parameter vectors corresponding to each one of said first regions to obtain respective first location representative vectors representative of locations in said spatiotemporal field that correspond to respective first regions;

determining for a respective region of said first regions a corresponding second region in said second picture, said corresponding second region being comprised of an identical number of said second pixels to said number of said first pixels in said respective first region, said determining being performed so that respective second image parameter vectors corresponding to said number of pixels are each respectively relatively vicinal to a representative vector of a respective first image parameter vector in terms of said distance;

averaging all respective second location parameter vectors to obtain respective second location representative vectors representative of locations in said spatiotemporal field that correspond to respective second regions; and estimating a relative motion between said one of said first regions and said corresponding second region by subtracting said second location representative vector from said first location representative vector to determine a motion vector representative of said relative motion in said spatiotemporal field.

2. A system for processing a set of data expressed by a temporal sequence of two or three dimensional pictures including a time-dependent motion therein, said set of data including a set of current data relating to a current picture in said sequence of pictures and a set of previous data relating to a previous picture previous to said current picture in said sequence of pictures, said current picture including a set of current pixels each respectively defined by a combination of current image data associated therewith and a combination of current address data representing an address in said current picture, said previous picture including a set of previous pixels each respectively defined by a combination of previous image data associated therewith and a combination of previous address data representing an address in said previous picture, said system comprising:

a data processing means which processes said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data, and which processes said set of previous data so that said previous picture is linearly mapped into said spatiotemporal field as a second picture comprising a set of second pixels each respectively represented by a second character vector equivalent to a sum of a second image parameter vector representative of said combination of previous image data and a second location parameter vector representative of said combination of previous address data;

an image segmentor means which segments said first picture into a number of first regions each respectively comprising a cluster of a variable number of said first pixels so that respective first character vectors of said variable number of pixels are relatively vicinal to each other in terms of a distance defined in said spatiotemporal field and said image segmentor means averages respective first location parameter vectors to obtain a first location representative vector representative of a location in said spatiotemporal field that correspond to respective first regions; and a motion estimator means which determines for a respective one of said first regions, a corresponding second region in said second picture, said corresponding second region being comprised of an identical number of pixels as said set of first pixels in said respective one of said first regions, said corresponding second region being determined so that respective second character vectors of said pixels in said corresponding second region include respective second image parameter vectors each respectively relatively vicinal to a respective first image parameter vector in terms of said distance;

said motion estimator averages respective second location parameter vectors to obtain a second location representative vector representative of a location of a correspondent one of said second regions in said spatiotemporal field; and said motion estimator means further estimates a relative motion as part of said time-dependent motion between said respective one of said first regions and said corresponding second region, by subtracting said second location representative vector of said corresponding second region from said first location representative vector of said respective one of said first regions to determine a motion vector representative of said relative motion in said spatiotemporal field.

3. A method for processing a sequence of motion pictures including a current picture and a previous picture previous to said current picture thereto, said current picture comprising a set of current pixels, said previous picture comprising a set of previous pixels, said current and said previous pixels being each respectively defined by a combination of image data and a combination of address data, said method comprising the steps of:

dividing said current picture into a predetermined number of current minute pieces each respectively comprising of one or more of said current pixels;

determining for a respective one of said predetermined number of current minute pieces a corresponding previous minute piece in said previous picture;

estimating a relative motion between said respective one of said current minute pieces and said corresponding previous minute piece;

defining each of said set of current pixels in said respective one of said current minute pieces by a combination of motion data representative of said relative motion;

image-segmenting said current picture into a number of first regions based on said combination of image data, said combination of address data and said combination of motion data, said number of first regions being smaller than said predetermined number of current minute pieces;

image-mosaicking said current picture to obtain a predicted picture so that respective pixels of a subset of said current pixels have a combination of region-representative image data;

subtracting said predicted picture from said current picture to obtain a prediction error picture;

compressing said predicted picture into a sequence of first codes;

compressing said prediction error picture into a sequence of second codes;

multiplexing said sequence of first codes and said sequence of second codes to obtain a multiplexed signal;

demultiplexing said multiplexed signal into a combination of a sequence of third codes corresponding to said sequence of first codes and a sequence of fourth codes corresponding to said sequence of second codes;

decompressing said sequence of third codes into a decoded prediction picture;

decompressing said sequence of fourth codes into a decoded error picture; and adding said decoded error picture to said decoded prediction picture to obtain a decoded picture corresponding to said current picture.

4. A method for processing a set of data expressed by a temporal sequence of two or three dimensional pictures including a time-dependent motion therein, said set of data including a set of current data relating to a current picture in said sequence of pictures and a set of previous data relating to a previous picture previous to said current picture in said sequence of pictures, said current picture including a set of current pixels each respectively defined by a combination of current image data associated therewith and a combination of current address data representing an address in said current picture, said previous picture including a set of previous pixels each respectively defined by a combination of previous image data associated therewith and a combination of previous address data representing an address in said previous picture, said method comprising the steps of:

processing said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data;

processing said set of previous data so that said previous picture is linearly mapped into said spatiotemporal field as a second picture a set of second pixels each respectively represented by a second character vector equivalent to a sum of a second image parameter vector representative of said combination of previous image data and a second location parameter vector representative of said combination of previous address data;

dividing said first picture into a predetermined number of first minute pieces each respectively comprising of one or more elements of said set of first pixels;

averaging respective first location parameter vectors to obtain a first location representative vector representative of a location of a correspondent one of said first minute pieces in said spatiotemporal field;

determining for a respective one of said first minute pieces a corresponding second minute piece in said second picture;

averaging respective second location parameter vectors to obtain a second location representative vector representative of a location of a correspondent one of said second minute pieces in said spatiotemporal field;

estimating a relative motion between said respective one of said first minute pieces and said corresponding second minute piece, by subtracting said second location representative vector representative of a location of said corresponding second minute piece from said first location representative vector of said respective one of said first minute pieces to determine a motion vector representative of said relative motion in said spatiotemporal field;

adding said motion vector to said first character vector of each of said first pixels in said respective one of said first minute pieces to obtain dimension-increased character vectors; and segmenting said first picture into a number of first regions each respectively comprised of a cluster of a variable number of said set of first pixels, so that respective dimension-increased character vectors of said variable number of pixels are relatively vicinal to each other in terms of a distance defined in said spatiotemporal field.

5. A system for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data thereof, said system comprising:

a motion estimator means which divides said current picture into a predetermined number of current minute pieces each respectively comprising one or more of said current pixels, said motion estimator means determines for a respective one of said current minute pieces a corresponding previous minute piece in said previous picture, said motion estimator estimates a relative motion between said respective one of said current minute pieces and said corresponding previous minute piece, and said motion estimator means defines each of said current pixels in said respective one of said current minute pieces, by a combination of motion data representative of said relative motion;

an image segmentor means which image-segments said current picture into a number of first regions based on said combination of image data, said combination of address data and said combination of motion data, said number of first regions being smaller than said predetermined number of current minute pieces, and said image segmentor image-mosaics said current picture to obtain a predicted picture so that respective elements of said current pixels associated with a respective one of said first regions have a combination of region-respective image data in place of respective combinations of image data;

a subtractor means which subtracts said predicted picture from said current picture to obtain a prediction error picture;

a multiplexing encoder means which compresses said predicted picture into a sequence of first codes, compresses said prediction error picture into a sequence of second codes, and multiplexes said sequence of first codes and said sequence of second codes to obtain a multiplexed signal;

a demultiplexing decoder means which de-multiplexes said multiplexed signal into a combination of a sequence of third codes corresponding to said sequence of first codes and a sequence of fourth codes corresponding to said sequence of second codes, decompresses said sequence of third codes into a decoded prediction picture, and decompresses said sequence of fourth codes into a decoded error picture; and an adder means which adds said decoded error picture to said decoded prediction picture to obtain a decoded picture corresponding to said current picture.

6. A system for processing a set of data expressed by a temporal sequence of two or three dimensional pictures with a time-dependent motion therein, said set of data including a set of current data relating to a current picture in said sequence of pictures and a set of previous data relating to a previous picture previous to said current picture in said sequence of pictures, said current picture comprising a set of current pixels each respectively defined by a combination of current image data associated therewith and a combination of current image data associated therewith and a combination of current address data representing an address in said current picture, said previous picture comprising a set of previous pixels each respectively defined by a combination of previous image data associated therewith and a combination of previous address data representing an address in said previous picture, said system comprising:

a data processor means which processes said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data, said data processor processes said set of previous data so that said previous picture is linearly mapped into said spatiotemporal field, as a second picture comprising a set of second pixels each respectively represented by a second character vector equivalent to a sum of a second image parameter vector representative of said combination of previous image data and a second location parameter vector representative of said combination of previous address data;

a motion estimator means which divides said first picture into a predetermined number of first minute pieces each respectively comprising one or more of said first pixels, said motion estimator means averages respective first location parameter vectors to obtain a first location representative vector representative of a location of a correspondent one of said first minute pieces in said spatiotemporal field, said motion estimator means determines for a respective one of said predetermined number of first minute pieces a corresponding second minute piece in said second picture, said motion estimator means averages respective second location parameter vectors to obtain a second location representative vector representative of a location of a correspondent one of said second minute pieces in said spatiotemporal field, said motion estimator means estimates a relative motion as part of said time-dependent motion between said respective one of said first minute pieces and said corresponding second minute piece by subtracting said second location representative vector from said first location representative vector to determine a motion vector representative of said relative motion in said spatiotemporal field, and said motion estimator means adds said motion vector to said first character vector of each of said first pixels in said respective one of said first minute pieces to obtain dimension-increased character vectors; and an image segmentor means which segments said first picture into a number of first regions each respectively comprised of a cluster of a variable number of elements of said first pixels, so that respective dimension-increased character vectors of said variable number of elements are relatively vicinal to each other in terms of a distance defined in said spatiotemporal field.

7. A method for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data thereof, said method comprising the steps of:

image-segmenting said current picture into a predetermined number of current regions;

dividing a respective one of said current regions into a variable number of sub-regions each respectively comprising one or more of said current pixels;

determining for a respective one of said sub-regions a corresponding small region in said previous picture;

estimating a relative motion between said respective one of said sub-regions and said corresponding small region;

defining each of said current pixels in said respective one of said sub-regions by a combination of motion data representative of said relative motion; and resegmenting said current picture into a number of first regions based on said combination of image data, said combination of address data and said combination of motion data.

8. A method according to claim 7, further comprising the steps of:

image-mosaicking said current picture to obtain a predicted picture so that respective elements of a subset of said set of current pixels associated with a respective one of said first regions have a combination of region-representative image data;

subtracting said predicted picture from said current picture to obtain a prediction error picture;

compressing said predicted picture into a first set of coded data;

compressing said prediction error picture into a second set of coded data;

decompressing said first set of coded data into a local decoded prediction picture;

decompressing said second set of coded data into a local decoded error picture; and adding said local decoded error picture to said local decoded prediction picture to obtain a local decoded picture.

9. A method according to claim 7, wherein said current picture comprises an arbitrary picture in said sequence of motion pictures; and wherein said previous picture comprises a local decoded picture of a picture previous to said arbitrary picture in said sequence of motion pictures.

10. A method for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data said method comprising the steps of:

image-segmenting said current picture into a predetermined number of current regions;

dividing a respective one of said current regions into a variable number of sub-regions each respectively comprising one or more elements of said current pixels;

determining for a respective one of said sub-regions a corresponding small region in said previous picture;

estimating a relative motion between said respective one of said sub-regions and said corresponding small region;

defining each of said current pixels in said respective one of said sub-regions current region, by a combination of motion data representative of said relative motion;

resegmenting said current picture into a number of first regions based on said combination of image data, said combination of address data and said combination of motion data;

image-mosaicking said current picture to obtain a predicted picture so that respective elements of a subset of said set of current pixels associated with a respective one of said first regions have a combination of region-representative image data;

subtracting said predicted picture from said current picture to obtain a prediction error picture;

compressing said predicted picture into a sequence of first codes;

compressing said prediction error picture into a sequence of second codes;

multiplexing said sequence of first codes and said sequence of second codes to obtain a multiplexed signal;

demultiplexing said multiplexed signal into a combination of a sequence of third codes corresponding to said sequence of first codes and a sequence of fourth codes corresponding to said sequence of second codes;

decompressing said sequence of third codes into a decoded prediction picture;

decompressing said sequence of fourth codes into a decoded error picture; and adding said decoded error picture to said decoded prediction picture to obtain a decoded picture corresponding to said current picture.

11. A method for processing a set of data expressed by a temporal sequence of two or three dimensional pictures with a time-dependent motion therein, said set of data including a set of current data relating to a current picture in said sequence of pictures and a set of previous data relating to a previous picture previous to said current picture in said sequence of pictures, said current picture comprising a set of current pixels each respectively defined by a combination of current image data associated therewith and a combination of current address data representing an address in said current picture, said previous picture comprising a set of previous pixels each respectively defined by a combination of previous image data associated therewith and a combination of previous address data representing an address in said previous picture, said method comprising the steps of:

processing said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data;

processing said set of previous data so that said previous picture is linearly mapped into said spatiotemporal field as a second picture comprising a set of second pixels each respectively represented by a second character vector equivalent to a sum of a second image parameter vector representative of said combination of previous image data and a second location parameter vector representative of said combination of previous address data;

segmenting said first picture into a predetermined number of segment regions each respectively comprised of a first cluster of a variable number of said first pixels, so that respective first character vectors of said variable number of pixels are relatively vicinal to each other in terms of a distance defined in said spatiotemporal field:

dividing a respective one of said segment regions into a variable number of sub-regions each respectively comprising one or more elements of said set of first pixels;

averaging respective first location parameter vectors to obtain a first location representative vector representative of a location of a correspondent one of said sub-regions in said spatiotemporal field;

determining for a respective one of said sub-regions a corresponding small region in said second picture, said corresponding small region being comprised of an identical number of said second pixels as said first pixels in said respective one of said sub-regions so that respective second character vectors have respective second image parameter vectors each respectively relatively vicinal to respective first image parameter vectors of said respective first character vectors in said respective sub-regions in terms of said distance;

averaging respective second location parameter vectors to obtain a second location representative vector representative of a location of said corresponding small region in said spatiotemporal field;

estimating a relative motion between said respective one of said sub-regions and said corresponding small region by subtracting said second location representative vector from said first location representative vector to determine a motion vector representative of said relative motion in said spatiotemporal field;

adding said motion vector to said first character vector of each of said first pixels in said respective one of said sub-regions to obtain dimension-increased character vectors; and resegmenting said first picture into a number of first regions each respectively comprised of a second cluster of a variable number of said first pixels, so that respective dimension-increased character vectors of said variable number of pixels of said second cluster are relatively vicinal to each other in terms of said distance in said spatiotemporal field.

12. A system for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data, said system comprising:

a segmentor means which image-segments said current picture into a predetermined number of current regions;

a motion estimator means which divides a respective one of said current regions into a variable number of sub-regions each respectively comprising one or more of said current pixels, said motion estimator means determines for a respective one of said sub-regions a corresponding small region in said previous picture, said motion estimator means estimates a relative motion between said respective one of said sub-regions and said corresponding small region, and said motion estimator defines each of said current pixels in said respective one of said of sub-regions by a combination of motion data representative of said relative motion; and a resegmentor means which resegments said current picture into a number of first regions based on said combination of image data, said combination of address data and said combination of motion data.

13. A system according to claim 12, wherein:

said resegmentor means image-mosaics said current picture to obtain a predicted picture so that respective elements of a subset of said current pixels associated with a respective one of said first regions have a combination of region-representative image data and said system further comprises;

a subtractor means which subtracts said predicted picture from said current picture to obtain a prediction error picture;

a compressing coder means which compresses said predicted picture and said prediction error picture into a first set of coded data and a second set of coded data, respectively;

a decompressing decoder means which decompresses said first set of coded data and said second set of coded data into a local decoded prediction picture and a local decoded error picture, respectively; and an adder means which adds said local decoded error picture to said local decoded prediction picture to obtain a local decoded picture.

14. A system according to claim 12, wherein said current picture comprises an arbitrary picture in said sequence of motion pictures; and wherein said previous picture comprises a local decoded picture of a picture previous to said arbitrary picture in said sequence of motion pictures.

15. A system for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data, said system comprising:

a segmentor means which image-segments said current picture into a predetermined number of current regions;

a motion estimator which divides a respective one of said current regions into a variable number of sub-regions each respectively comprising one or more of said current pixels, said motion estimator determines for a respective one of said sub-region a corresponding small region in said previous picture, said motion estimator estimates a relative motion between said respective one of said sub-regions and said corresponding small region, said motion estimator defines each of said current pixels in said respective one of said sub-regions by a combination of motion data representative of said relative motion;

a resegmentor means which resegments said current picture into a number of first regions based on said combination of image data, said combination of address data and said combination of motion data, and said resegmentor means image-mosaics said current picture to obtain a predicted picture so that respective elements of a subset of said current pixels associated with a respective one of said first regions have a combination of region-representative image data;

a subtractor means which subtracts said predicted picture from said current picture to obtain a prediction error picture;

a multiplexing encoder means which compresses said predicted picture and said prediction error picture into a sequence of first codes and a sequence of second codes, respectively, and which multiplexes said sequence of first codes and said sequence of second codes to obtain a multiplexed signal;

a demultiplexing decoder means which demultiplexes said multiplexed signal into a combination of a sequence of third codes corresponding to said sequence of first codes and a sequence of fourth codes corresponding to said sequence of second codes, and which decompresses said sequence of third codes and said sequence of fourth codes into a decoded prediction picture and a decoded error picture, respectively; and an adder means which adds said decoded error picture to said decoded prediction picture to obtain a decoded picture corresponding to said current picture.

16. A system for processing a set of data expressed by a temporal sequence of two or three dimensional pictures with a time-dependent motion therein, said set of data including a set of current data relating to a current picture in said sequence of pictures and a set of previous data relating to a previous picture previous to said current picture in said sequence of pictures, said current picture comprising a set of current pixels each respectively defined by a combination of current image data associated therewith and a combination of current address data representing an address in said current picture, said previous picture comprising a set of previous pixels each respectively defined by a combination of previous image data associated therewith and a combination of previous address data representing an address in said previous picture, said system comprising:

a data processing means which processes said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data, and said data processing means processes said set of previous data so that said previous picture is linearly mapped into said spatiotemporal fieldas a second picture comprising a set of second pixels each respectively represented by a second character vector equivalent to a sum of a second image parameter vector representative of said combination of previous image data and a second location parameter vector representative of said combination of previous address data;

a segmentor means which segments said first picture into a predetermined number of segment regions each respectively comprised of a first cluster of a variable number of said first pixels, so that respective first character vectors of said variable number of pixels are relatively vicinal to each other in terms of a distance defined in said spatiotemporal field; and a motion estimator means which divides a respective one of said segment regions into a variable number of sub-regions each respectively comprising one or more of said first pixels, said motion estimator means averages respective first location parameter vectors to obtain a first location representative vector representative of a location of a correspondent one of said sub-regions in said spatiotemporal field, said motion estimator determines for a respective one of said sub-regions a corresponding small region in said second picture, said corresponding small region being comprised of an identical number of said second pixels to said first pixels in said respective one of said sub-regions, so that respective second character vectors have respective second image parameter vectors each respectively relatively vicinal to respective first image parameter vectors of said respective first character vectors in said respective sub-regions in terms of said distance said motion estimator means averages respective second location parameter vectors to obtain a second region location representative vector representative of a location of a correspondent one of said corresponding small region in said spatiotemporal field, said motion estimator means estimates a relative motion between said respective one of said sub-regions and said corresponding small region by subtracting said second location representative vector from said first location representative vector to determine a motion vector representative of said relative motion in said spatiotemporal field, and said motion estimator means adds said motion vector to said first character vector of each of said first pixels in said respective one of said of sub-regions to obtain dimension-increased character vectors; and said segmentor means resegments said first picture into a number of first regions each respectively comprised of a second cluster of a variable number of elements of said first pixels, so that respective dimension-increased character vectors are relatively vicinal to each other in terms of said distance in said spatiotemporal field.

17. A method for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data, said method comprising the steps of:

dividing said current picture into a predetermined number of current minute pieces each respectively comprising one or more of said current pixels;

determining for a respective one of said predetermined number of current minute pieces a corresponding previous minute piece in said previous picture;

estimating a first relative motion between said respective one of said of current minute pieces and said corresponding previous minute piece;

defining each of said current pixels in said respective one of said current minute pieces by a combination of motion data representative of said first relative motion;

image-segmenting said current picture into a number of first regions based on said combination of image data, said combination of address data and said combination of motion data, said number of first regions being smaller than said predetermined number of current minute pieces;

determining for a respective one of said first regions a corresponding second region in said previous picture;

estimating a second relative motion between said respective one of said first regions and said corresponding second region to determine a motion vector representative of said second relative motion;

motion-compensating a local decoded picture of said previous picture based on said motion vector to obtain a predicted picture of said current picture;

subtracting said predicted picture from said current picture to obtain a prediction error picture;

coding said motion vector into a sequence of first codes;

compressing said prediction error picture into a sequence of second codes;

multiplexing said sequence of first codes and said sequence of second codes to obtain a multiplexed signal;

demultiplexing said multiplexed signal into a combination of a sequence of third codes corresponding to said sequence of first codes and a sequence of fourth codes corresponding to said sequence of second codes;

decoding said sequence of third codes to obtain a decoded vector corresponding to said motion vector;

decoding said sequence of fourth codes to obtain a decoded error picture;

using said decoded vector to motion-compensate a previous decoded picture in a sequence of decoded pictures to obtain a decoded prediction picture; and adding said decoded error picture to said decoded prediction picture to obtain a picture subsequent to said previous decoded picture in said sequence of decoded pictures.

18. A method for processing a set of data expressed by a temporal sequence of two or three dimensional pictures therein, said set of data including a set of current data relating to a current picture in said sequence of pictures and a set of previous data relating to a previous picture previous to said current picture in said sequence of pictures, said current picture comprising a set of current pixels each respectively defined by a combination of current image data associated therewith and a combination of current address data representing an address in said current picture, said previous picture comprising a set of previous pixels each respectively defined by a combination of previous image data associated therewith and a combination of previous address data representing an address in said previous picture, said method comprising the steps of:

processing said set of current data so that said current picture is linearly mapped into a spatiotemporal field as a first picture comprising a set of first pixels each respectively represented by a first character vector equivalent to a sum of a first image parameter vector representative of said combination of current image data and a first location parameter vector representative of said combination of current address data;

processing said set of previous data so that said previous picture is linearly mapped into said spatiotemporal field as a second picture comprising a set of second pixels each respectively represented by a second character vector equivalent to a sum of a second image parameter vector representative of said combination of previous image data and a second location parameter vector representative of said combination of previous address data;

dividing said first picture into a predetermined number of first minute pieces each respectively comprising one or more of said first pixels;

averaging respective first location parameter vectors to obtain a first piece location representative vector representative of a location of a correspondent one of said first minute pieces in said spatiotemporal field;

determining for a respective one of said first minute pieces a corresponding second minute piece in said second picture;

averaging respective second location parameter vectors to obtain a second piece location representative vector representative of a location of a correspondent one of said second minute pieces in said spatiotemporal field;

estimating a first relative motion between said respective one of said first minute pieces and said corresponding second minute piece, by subtracting said second piece location representative vector from said first piece location representative vector to determine a first motion vector representative of said first relative motion in said spatiotemporal field;

adding said first motion vector to said first character vector of each of said first pixels in said respective one of said first minute pieces to obtain dimension-increased character vectors;

segmenting said first picture into a number of first regions each respectively comprised of a cluster of a variable number of of said first pixels, so that respective dimension-increased character vectors of said variable number of elements are relatively vicinal to each other in terms of a distance defined in said spatiotemporal fields;

averaging respective first location parameter vectors to obtain a region location representative vector representative of a location of a correspondent one of said first regions in said spatiotemporal field;

determining for a respective one of said first regions a corresponding second region in said second picture, said corresponding second region being comprised of an identical number of second pixels to said variable number first pixels, so that respective second character vectors of said identical number of pixels have respective second image parameter vectors thereof each respectively relatively vicinal to a representative vector of respective first image parameter vectors of said respective first character vectors in said respective one of said number of first regions in terms of said distance;

averaging respective second location parameter vectors to obtain a region location representative vector representative of a location of said corresponding second region in said spatiotemporal field; and estimating a second relative motion between said respective one of said first regions and said corresponding second region, by subtracting said region location representative vector of said corresponding second region from said region location representative vector of said respective one of said first regions to determine a second motion vector representative of said second relative motion in said spatiotemporal field.

19. A system for processing a sequence of motion pictures including a current picture and a previous picture previous to said current picture, said current picture comprising a set of current pixels, said previous picture comprising a set of previous pixels, said current and said previous pixels being each respectively defined by a combination of image data associated therewith and a combination of address data said system comprising:

a motion estimator means which divides said current picture into a predetermined number of current minute pieces each respectively comprising one or more elements of said current pixels, said motion estimator means determines for a respective one of said current minute pieces a corresponding previous minute piece in said previous picture, said motion estimator means estimates a first relative motion between said respective one of said current minute pieces and said corresponding previous minute piece, and said motion estimator means defines each of said current pixels in said respective one of said current minute pieces by a combination of motion data representative of said first relative motion;

an image segmentor means which image-segments said current picture into a number of first regions based on said combination of image data, said combination of address data and said combination of motion data, said number of first regions being smaller than said predetermined number of current minute pieces;

a motion reestimator means which determines for a respective one of said first regions a corresponding second region in said previous picture, and said motion reestimator means estimates a second relative motion between said respective one of said first regions and said corresponding second region to determine a motion vector representative of said second relative motion;

a first motion compensator means which motion compensates a local decoded picture of said previous picture based on said motion vector to obtain a predicted picture of said current picture;

a subtractor means which subtracts said predicted picture from said current picture to obtain a prediction error picture;

a multiplexing encoder means which codes said motion vector into a sequence of first codes, said multiplexing encoder means compresses said prediction error picture into a sequence of second codes, and said multiplexing encoder means multiplexer said sequence of first codes and said sequence of second codes to obtain a multiplexed signal;

a demultiplexing decoder means which demultiplexes said multiplexed signal into a combination of a sequence of third codes corresponding to said sequence of first codes and a sequence of fourth codes corresponding to said sequence of second codes, said demultiplexing decoder means decodes said sequence of third codes to obtain a decoded vector corresponding to said motion vector, and said demultiplexing decoder means decompresses said sequence of fourth codes to obtain a decoded error picture;

a second motion compensator means which uses said decoded vector to motion-compensate a previous decoded picture in a sequence of decoded pictures to obtain a decoded prediction picture; and an adder means which adds said decoded error picture to said decoded prediction picture to obtain a picture subsequent to said previous decoded picture in said sequence of decoded pictures.

20. A system for processing a set of data expressed by a temporal sequence of two or three dimensional pictures with a time-dependent motion therein, said set of data including a set of current data relating to a current picture in said sequence of pictures and a set of previous data relating to a previous picture previous to said current picture in said sequence of pictures, said current picture comprising a set of current pixels each respectively defined by a combination of current image data associated therewith and a combination of current address data representing an address in said current picture, said previous picture comprising a set of previous pixels each respectively defined by a combination of previous image data associated therewith and a combination of previous address data representing an address in said previous picture, said system comprising:

a data processing means which processes said set of current data so that said current picture is linearly mapped into a spatiotemporal fieldas a first picture comprising a set of first pixels each respectively represented by a first character vector equivalent to a sum of a first image parameter vector representative of said combination of current image data and a first location parameter vector representative of said combination of current address data, and said data processing means processes said set of previous data so that said previous picture is linearly mapped into said spatiotemporal field as a second picture comprising a set of second pixels each respectively represented by a second character vector equivalent to a sum of a second image parameter vector representative of said combination of previous image data and a second location parameter vector representative of said combination of previous address data;

a motion estimator means which divides said first picture into a predetermined number of first minute pieces each respectively comprising one or more elements of said first pixels, said motion estimator means averages respective first location parameter vectors to obtain a first piece location representative vector representative of a location of a correspondent one of said first minute pieces in said spatiotemporal field, said motion estimator means determines for a respective one of said first minute pieces a corresponding second minute piece in said second picture, said motion estimator means averages respective second location parameter vectors to obtain a second piece location representative vector representative of location of a correspondent one of said second minute pieces in said spatiotemporal fields said motion estimator means estimates a first relative motion between said respective one of said first minute pieces and said corresponding second minute piece by subtracting said second piece location representative vector from said first piece location representative vector to determine a first motion vector representative of said first relative motion in said spatiotemporal field, and said motion estimator means adds said first motion vector to said first character vector of each of said first pixels in said respective one of said first minute pieces to obtain dimension-increased character vectors; and an image segmentor means which segments said first picture into a number of first regions each respectively comprised of a cluster of a variable number of said first pixels, so that respective dimension-increased character vectors of said variable number of pixels are relatively vicinal to each other in terms of a distance defined in said spatiotemporal field, said image segmentor means averages respective first location parameter vectors of said dimension-increased character vectors to obtain a region location representative vector representative of a location of a correspondent one of said first regions in said spatiotemporal field;

said motion estimator determines for a respective one of said first regions a corresponding second region in said second picture, said corresponding second region being comprised of an identical number of said second pixels to said variable number of said first pixels, so that respective second dimension-increased character vectors of said identical number of pixels have respective second image parameter vectors each respectively relatively vicinal to a representative vector of respective first image parameter vectors of said respective first dimension-increased character vectors in said respective one of said first regions in terms of said distance said motion estimator averages respective second location parameter vectors of said second dimension-increased character vectors to obtain a region location representative vector representative of a location of said corresponding second region in said spatiotemporal field, said motion estimator estimates a second relative motion between said respective one of said first regions and said corresponding second region by subtracting said region location representative vector of said corresponding second region from said region location representative vector of said respective one of said first regions to determine a second motion vector representative of said second relative motion in said spatiotemporal field.

* * * * *